United States Patent
Asano et al.

(10) Patent No.: US 12,545,643 B2
(45) Date of Patent: Feb. 10, 2026

(54) 3,5-DIAMINOBENZOIC ACID COMPOUND, AND Pin1 INHIBITOR AND THERAPEUTIC AGENT FOR INFLAMMATORY DISEASES USING SAME

(71) Applicant: Amenis Bioscience, Inc., Seoul (KR)

(72) Inventors: Tomoichiro Asano, Higashihiroshima (JP); Yusuke Nakatsu, Higashihiroshima (JP); Hisanaka Ito, Hachioji (JP); Takayoshi Okabe, Tokyo (JP)

(73) Assignee: Amenis Bioscience, Inc, Seoul (KR)

( * ) Notice: Subject to any disclaimer, the term of this patent is extended or adjusted under 35 U.S.C. 154(b) by 652 days.

(21) Appl. No.: 17/905,953

(22) PCT Filed: Mar. 9, 2021

(86) PCT No.: PCT/JP2021/009233
§ 371 (c)(1),
(2) Date: Sep. 9, 2022

(87) PCT Pub. No.: WO2021/182457
PCT Pub. Date: Sep. 16, 2021

(65) Prior Publication Data
US 2023/0133581 A1     May 4, 2023

(30) Foreign Application Priority Data
Mar. 12, 2020   (JP) ................ 2020-043237

(51) Int. Cl.
| | | |
|---|---|---|
| *C07D 209/86* | (2006.01) |
| *A61P 1/16* | (2006.01) |
| *A61P 3/04* | (2006.01) |
| *A61P 29/00* | (2006.01) |
| *A61P 31/14* | (2006.01) |
| *C07C 237/48* | (2006.01) |
| *C07C 275/42* | (2006.01) |
| *C07D 215/48* | (2006.01) |
| *C07D 319/16* | (2006.01) |
| *C07D 319/20* | (2006.01) |
| *C07D 401/12* | (2006.01) |
| *C07D 403/12* | (2006.01) |
| *C07D 405/12* | (2006.01) |

(52) U.S. Cl.
CPC .............. *C07D 209/86* (2013.01); *A61P 1/16* (2018.01); *A61P 3/04* (2018.01); *A61P 29/00* (2018.01); *A61P 31/14* (2018.01); *C07C 237/48* (2013.01); *C07C 275/42* (2013.01); *C07D 215/48* (2013.01); *C07D 319/16* (2013.01); *C07D 319/20* (2013.01); *C07D 401/12* (2013.01); *C07D 403/12* (2013.01); *C07D 405/12* (2013.01); *C07C 2601/16* (2017.05); *C07C 2602/10* (2017.05)

(58) Field of Classification Search
None
See application file for complete search history.

(56) References Cited

U.S. PATENT DOCUMENTS

| | | |
|---|---|---|
| 2020/0383967 A1 | 12/2020 | Asano et al. |
| 2020/0383987 A1 | 12/2020 | Asano et al. |

FOREIGN PATENT DOCUMENTS

| | | |
|---|---|---|
| DE | 10309005 A1 | 9/2004 |
| WO | WO 2019/031470 A1 | 2/2019 |
| WO | WO 2019/031472 A1 | 2/2019 |
| WO | WO 2021/182457 A1 | 9/2021 |

OTHER PUBLICATIONS

Intl. Search Report PCT/JP2021/009233 (2021) 4 pages.
Intl. Search Report PCT/JP2021/009233 (2021) 3 pages (English Translation).
Written Opinion PCT/JP2021/009233 (2021) 4 pages.

*Primary Examiner* — Brian J Davis
(74) *Attorney, Agent, or Firm* — Medler Ferro Woodhouse & Mills PLLC

(57) ABSTRACT

The present invention provides: a compound represented by the following Formula (I) or a salt thereof, as well as a Pin1 inhibitor, a pharmaceutical composition, a therapeutic or prophylactic agent for inflammatory diseases, a therapeutic or prophylactic agent for fatty liver diseases, a therapeutic or prophylactic agent for obesity, and a therapeutic or prophylactic agent for COVID-19 that utilize the aforementioned compounds or the salts thereof to develop a group of novel compounds with an inhibitory activity against the function of Pin1 so as to use them as candidate compounds for medicaments.

22 Claims, 5 Drawing Sheets

(A)

(B)

(A)

(B)

(A)

(B)

(A)

Control (B)

HFD (C)

HFD + H-686

3,5-DIAMINOBENZOIC ACID COMPOUND, AND Pin1 INHIBITOR AND THERAPEUTIC AGENT FOR INFLAMMATORY DISEASES USING SAME

CROSS-REFERENCE TO RELATED APPLICATIONS

This application is a § 371 Application of, and claims priority to, PCT/JP2021/009233 (filed on Mar. 9, 2021), which application claims priority to Japanese Patent Application 2020-043237 (filed on Mar. 12, 2020), each of which applications is incorporated herein by reference in its entirety.

TECHNICAL FIELD

The present invention relates to novel low-molecular-weight organic 3,5-diaminobenzoic acid-based compounds, and further relates to Pin1 inhibitors, pharmaceutical compositions, therapeutic or prophylactic agents for inflammatory diseases including non-alcoholic steatohepatitis (NASH), inflammatory bowel disease, and pulmonary fibrosis, for fatty liver disease, and for obesity, which are prepared using the compounds. The present invention further relates to therapeutic or prophylactic agents for viral diseases caused by viruses that infect humans, such as coronavirus infection, particularly coronavirus infection caused by beta-coronavirus and, more particularly coronavirus infection caused by SARS coronavirus 2 (SARS-CoV-2) (COVID-19), which are prepared using the compounds.

BACKGROUND ART

Pin1 is a kind of peptidyl-prolyl cis-trans isomerase (PPIase) that catalyzes cis/trans isomerization of proline residues in proteins, and is characterized in that the enzyme specifically acts on proline residues immediately preceded by phosphorylated serine or threonine to change the conformation of those proline residues. Accordingly, Pin1 is a molecule that couples phosphorylation of a protein to conformational change of the protein, and is considered to play an important role in intracellular signal transduction. In respect of Pin1, it is reported that Pin1 inhibitors have ability to suppress cancer cell growth (Non-Patent Documents 1 and 2).

Additionally, the inventors have previously reported that Pin1, a kind of cis-trans isomerase, associates with IRS-1, a protein playing a central role in insulin signaling, and enhances insulin signaling (Non-Patent Document 3).

As compounds that inhibit Pin1, a phenylalaninol-phosphate derivative, an indole- or benzimidazole-alanine derivative, a fredericamycin A compound, a phenyl-imidazole derivative, a naphthyl-substituted amino acid derivative, a glutamate or aspartate derivative, and the like have been reported (Patent Documents 1 to 4 and Non-Patent Documents 1, 2, and 4).

The inventors previously found that a Pin1 knock-out mice are resistant to development of NASH and obesity induced by high-fat diet (Non-Patent Document 5). Then the inventors found that administration of the compound Juglone having the following structure, which has Pin1 inhibitory activity, to NASH-induced mice ameliorates the development of NASH (Non-Patent Documents 6 and 7).

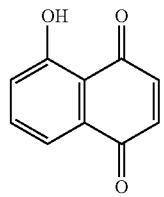 [SMILES: O=C1C=CC(=O)c2c(O)cccc21]

The inventors also found that when a well-known Pin1 inhibitor is administered to mice with induction of colitis, colitis development is suppressed (Non-Patent Document 8).

The inventors further developed novel ester-based compounds, amide-based compounds and anthranilic acid-based compounds which may act as Pin1 inhibitors, and the inventors found that these compounds can be used as therapeutic or prophylactic agents for inflammatory diseases including non-alcoholic steatohepatitis (NASH) and inflammatory bowel disease, as therapeutic or prophylactic agents for fatty liver disease, as therapeutic or prophylactic agents for obesity, and as therapeutic or prophylactic agents for cancer (Patent Documents 5-8).

Coronaviruses are viruses that infect not only human but also other animals and cause various diseases. Coronaviruses specific to each animal (animal coronaviruses) have been detected for not only domestic animals such as dogs, cats, cows, pigs, chicken, horses, alpacas and camels, but also belugas whales, giraffes, ferrets, suncues, bats and sparrows. Coronaviruses exhibit high species-specificity and rarely jump the species barrier to infect other species. As coronaviruses that infect humans: four kinds of ordinarily infectable coronaviruses (Human Coronavirus: HCoV), HCoV-229E, HCoV-OC43, HCoV-NL63 and HCoV—HKU1; and two kinds of serious pneumonia-causing coronaviruses contracted from animals, Severe Acute Respiratory Syndrome-associated Coronavirus (SARS-CoV) and Middle East Respiratory Syndrome Coronavirus (MERS-CoV) have been known.

Around December 2019, infection of SARS coronavirus 2 (SARS-CoV-2: Severe Acute Respiratory Syndrome CoronaVirus 2) was confirmed as a novel coronavirus and rapidly then spread around the world, resulting in a global pandemic, and now there is still no sign of its ending. An infectious disease caused by SARS coronavirus 2 (COVID-19) mainly spreads with human-to-human transmission through airborne droplets expelled by coughs and sneezes of an infected person. COVID-19 causes fever, respiratory symptoms, headache, fatigue and the like and can also cause olfactory or taste disorders. In particular, the elderly and patients with a underlying medical condition (cardiovascular disease, diabetes, chronic respiratory disease, chronic kidney disease, hypertension, or obesity) have higher mortality from COVID-19. In such a situation, effective therapeutic and prophylactic drugs for COVID-19 are highly desired.

Coronaviruses belong to one type of RNA viruses (single-stranded RNA virus) having RNA as its genetic material and have a lipid bilayer membrane called envelope on the outmost of their viral particles. These are spherical particles having average diameter of approximately 100 nm and having projections on the surface, giving their appearance like a crown. Coronaviruses cannot proliferate by themselves, but they adhere to and enter cells such as cells of human mucous membranes to proliferate. Virologically, coronaviruses are classified into the order Nidovirales, the subfamily Coronavirinae, and the family Coronaviridae, and according to their genetic characteristics, they are classified into the four groups, alpha, beta, gamma and delta. HCoV-229E and HCoV-NL63 are classified as alpha-coronaviruses, and MERS-CoV, SARS-CoV, SARS-CoV-2, HCoV-OC43 and HCoV—HKU1 are classified as beta-coronaviruses.

PRIOR ART REFERENCES

Patent Documents

Patent Document 1: WO 2004/087720
Patent Document 2: WO 2006/040646
Patent Document 3: WO 2005/007123
Patent Document 4: WO 2002/060436
Patent Document 5: WO 2018/101329
Patent Document 6: WO 2019/031470
Patent Document 7: WO 2019/031471
Patent Document 8: WO 2019/031472

Non-Patent Documents

Non-Patent Document 1: Andrew Potter, and 16 other authors, Bioorganic & Medicinal Chemistry Letters (Bioorg. Med. Chem. Lett.), Published: Nov. 15, 2010 (Epub: Sep. 17, 2010), Vol. 20, No. 22, pp. 6483-6488.
Non-Patent Document 2: Andrew Potter, and 14 other authors, Bioorganic & Medicinal Chemistry Letters (Bioorg. Med. Chem. Lett.), Published: Jan. 15, 2010 (Epub: Nov. 22, 2009), Vol. 20, No. 2, pp. 586-590.
Non-Patent Document 3: Yusuke Nakatsu, Tomoichiro Asano, and 21 other authors, The Journal of Biological Chemistry (J. Biol. Chem.), Published: Jun. 10, 2011 (Epub: Mar. 17, 2011), Vol. 286, No. 23, pp. 20812-20822.
Non-Patent Document 4: Liming Dong, and 11 other authors, Bioorganic & Medicinal Chemistry Letters (Bioorg. Med. Chem. Lett.), Published: Apr. 1, 2010 (Epub: Feb. 14, 2010), Vol. 20, No. 7, pp. 2210-2214.
Non-Patent Document 5: Yusuke Nakatsu, and 20 other authors, The Journal of BiologicalChemistry (J Biol Chem.), Published: Dec. 28, 2012 (Epub: Oct. 29, 2012), vol. 287, No. 53, pp. 44526-44535.
Non-Patent Document 6: Tomoichiro Asano, Journal of Japan Foundation for Applied Enzymology, Published: Mar. 1, 2014, No. 48, pp. 39-40.
Non-Patent Document 7: Hiroki Yamazaki et al., Journal of the Japan Diabetes Society, Published: Apr. 25, 2014, Vol. 57 Supplement 1, S-456.
Non-Patent Document 8: Tomoichiro Asano, "Novel treatment of inflammatory bowel diseases by Pin1 inhibitors", presentation for the DSANJ Biz Meeting Categorized by Target Diseases (gastrointestinal diseases) sponsored by the Osaka Chamber of Commerce and Industry, Published: Jan. 30, 2015.

DISCLOSURE OF INVENTION

Problems to be Solved by the Invention

In view of the current conditions as described above, an object of the present invention is to develop a group of novel compounds with inhibitory activity against the function of Pin1 so as to use them as candidate compounds for medicaments.

Means for Solving the Problems

The inventors intensively studied to solve the above-described problem, and consequently developed a group of novel compounds by synthesizing many 3,5-diaminobenzoic acid derivatives, and found that these novel compounds have a potential to be therapeutic agents for inflammatory diseases such as non-alcoholic steatohepatitis and for fatty liver disease and obesity, as well as have an inhibitory activity against the function of Pin1, and finally completed the present invention. Considering the facts that COVID-19 is associated with high mortality in obese patients and that Pin1 expression level is significantly increased in livers of human subjects having steatosis and other facts, as a result of the inventors' intensive studies on the effect of Pin1 on proliferation of SARS-CoV-2, the inventors found that proliferation of SARS-CoV-2 can be suppressed using a Pin1 inhibitor, and consequently have accomplished the present invention.

That is, the present invention provides the following first invention relating to novel compounds or salts thereof, the following second invention relating to Pin1 inhibitors, the following third invention relating to pharmaceutical compositions, the following fourth invention relating to therapeutic or prophylactic agents for inflammatory diseases, the following fifth invention relating to therapeutic or prophylactic agents for fatty liver disease, the following sixth invention relating to therapeutic or prophylactic agents for obesity, and the following seventh invention relating to therapeutic or prophylactic agents for COVID-19.

The first invention provides compounds represented by the following Formula (I), or salts thereof:

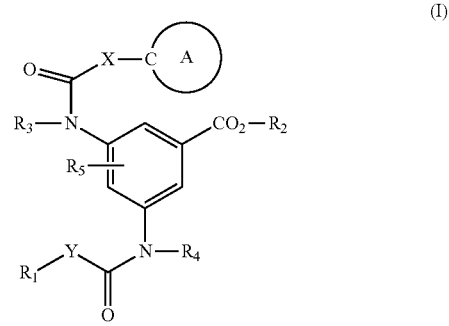

(wherein: a ring A represents an optionally substituted monocyclic or polycyclic aromatic ring or heterocycle;

$R_1$ represents a group represented by any of the following Formulae (II) to (V):

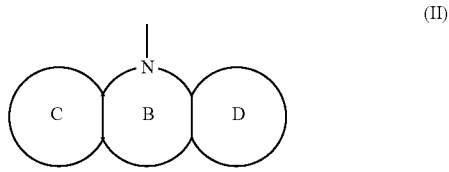

(wherein a ring B represents an optionally substituted monocyclic heterocycle, rings C and D independently represent an optionally substituted monocyclic or polycyclic aromatic ring, heterocycle or cyclic hydrocarbon, and the rings B, C and D form a condensed ring)

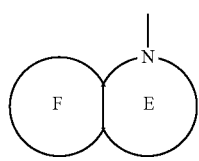

(III)

(wherein a ring E represents an optionally substituted monocyclic heterocycle, a ring F represents an optionally substituted monocyclic or polycyclic aromatic ring, heterocycle or cyclic hydrocarbon, and the rings E and F form a condensed ring)

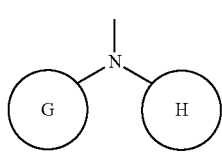

(IV)

(wherein rings G and H independently represent an optionally substituted monocyclic or polycyclic aromatic ring or heterocycle)

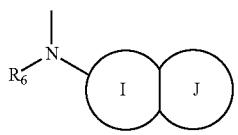

(V)

(wherein a ring I represents an optionally substituted monocyclic aromatic ring or heterocycle, a ring J represents an optionally substituted monocyclic or polycyclic aromatic ring, heterocycle or cyclic hydrocarbon, the rings I and J form a condensed ring, and $R_6$ represents a hydrogen atom, an optionally substituted hydrocarbon group, or an optionally substituted heterocyclic group);

$R_2$ represents a hydrogen atom, an optionally substituted hydrocarbon group, an optionally substituted heterocyclic group, or an optionally substituted amino group;

$R_3$ represents a hydrogen atom, an optionally substituted hydrocarbon group, or an optionally substituted heterocyclic group;

$R_4$ represents a hydrogen atom, an optionally substituted hydrocarbon group, or an optionally substituted heterocyclic group;

$R_5$ represents 0 to 3 identical or different substituents attached to a benzene ring;

X represents a single bond, $C_{1-2}$ alkylene group, —O— group, —CH$_2$—O— group, —CH$_2$—NH—CO— group, or —CH$_2$—NH—CO—O—CH$_2$— group; and Y represents a single bond or $C_{1-2}$ alkylene group.)

In the compounds and salts thereof according to the first invention, the ring A preferably represents an optionally substituted polycyclic aromatic ring or heterocycle.

In this case, the ring A preferably represents a ring represented by the following Formula (VI):

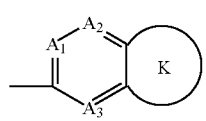

(VI)

(wherein $A_1$, $A_2$, and $A_3$ independently represent a carbon atom or a nitrogen atom, and a ring K represents an optionally substituted monocyclic or polycyclic aromatic ring, heterocycle or cyclic hydrocarbon.)

In the Formula (VI), all of $A_1$, $A_2$, and $A_3$ preferably represent a carbon atom.

In any aforementioned compound or a salt thereof, $R_1$ preferably represents a group represented by the following Formula (II):

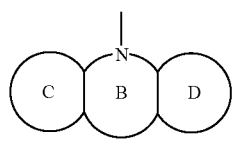

(II)

(wherein a ring B represents an optionally substituted monocyclic heterocycle, rings C and D independently represent an optionally substituted monocyclic or polycyclic aromatic ring, heterocycle or cyclic hydrocarbon, and the rings B, C and D form a condensed ring.)

In any aforementioned compound or a salt thereof, $R_2$ preferably represents a hydrogen atom.

In any aforementioned compound or a salt thereof, $R_3$ preferably represents a hydrogen atom.

In any aforementioned compound or a salt thereof, $R_4$ preferably represents a hydrogen atom.

In any aforementioned compound or a salt thereof, X preferably represents a single bond.

In any aforementioned compound or a salt thereof, Y preferably represents a single bond.

The second invention provides Pin1 inhibitors comprising any aforementioned compound or a salt thereof.

The third invention provides pharmaceutical compositions having any aforementioned compound or a pharmaceutically acceptable salt thereof and a pharmaceutically acceptable carrier.

The fourth invention provides therapeutic or prophylactic agents for inflammatory diseases, which comprise any of the aforementioned compounds or a pharmaceutically acceptable salt thereof as an active ingredient.

The therapeutic or prophylactic agent for an inflammatory disease according to the fourth invention may be a combination of any of the aforementioned compounds or the pharmaceutically acceptable salt thereof with active ingredients in at least one or more drugs selected from the group of other drugs classified as therapeutic or prophylactic agents for the inflammatory disease.

Moreover, the therapeutic or prophylactic agent for an inflammatory disease according to the fourth invention may be used in combination with at least one or more drugs selected from the group of other drugs classified as therapeutic or prophylactic agents for the inflammatory disease.

The therapeutic or prophylactic agents for the inflammatory disease according to the fourth invention can be directed to non-alcoholic steatohepatitis, inflammatory bowel disease, or pulmonary fibrosis.

The fifth invention provides therapeutic or prophylactic agents for fatty liver diseases, which comprise any of the aforementioned compounds or a pharmaceutically acceptable salt thereof as an active ingredient.

The therapeutic or prophylactic agent for a fatty liver disease according to the fifth invention may be a combination of any of the aforementioned compounds or the pharmaceutically acceptable salt thereof with active ingredients in at least one or more drugs selected from the group of drugs classified as therapeutic or prophylactic agents for the fatty liver disease.

Moreover, the therapeutic or prophylactic agent for a fatty liver disease according to the fifth invention may be used in combination with at least one or more drugs selected from the group of other drugs classified as therapeutic or prophylactic agents for the fatty liver disease.

The sixth invention provides therapeutic or prophylactic agents for obesity, which comprise any of the aforementioned compounds or a pharmaceutically acceptable salt thereof as an active ingredient.

The therapeutic or prophylactic agent for obesity according to the sixth invention may be a combination of any of the aforementioned compounds or the pharmaceutically acceptable salt thereof with active ingredients in at least one or more drugs selected from the group of drugs classified as therapeutic or prophylactic agents for obesity.

Moreover, the therapeutic or prophylactic agent for obesity according to the sixth invention may be used in combination with at least one or more drugs selected from the group of other drugs classified as therapeutic or prophylactic agents for obesity.

The seventh invention provides therapeutic or prophylactic agents for COVID-19, which comprise any of the aforementioned compounds or a pharmaceutically acceptable salt thereof as an active ingredient.

The therapeutic or prophylactic agent for COVID-19 according to the seventh invention may be a combination of any of the aforementioned compounds or the pharmaceutically acceptable salt thereof with active ingredients in at least one or more drugs selected from the group of drugs classified as therapeutic or prophylactic agents for coronaviruses.

Moreover, the therapeutic or prophylactic agent for COVID-19 according to the seventh invention may be used in combination with at least one or more drugs selected from the group of other drugs classified as therapeutic or prophylactic agents for coronavirus.

Effects of the Invention

The compound or the salt thereof according to the first invention may become a compound with inhibitory activity against the function of Pin1, or a precursor thereof, or may become a therapeutic or prophylactic agent or a prodrug thereof for inflammatory disease, fatty liver disease or obesity, and therefore can be effectively used for development of a Pin1 inhibitor, a medicament, and the like.

The Pin1 inhibitor according to the second invention exerts an inhibitory activity against the function of Pin1.

The pharmaceutical compositions according to the third invention have an effect based on inhibition of Pin1 function as a mechanism of action to treat or prevent diseases.

The therapeutic or prophylactic agents for inflammatory diseases according to the fourth invention have an effect to suppress inflammation and thereby to alleviate the conditions of inflammatory diseases such as non-alcoholic steatohepatitis, inflammatory bowel disease, and pulmonary fibrosis, or thereby to prevent development of inflammatory diseases.

The therapeutic or prophylactic agents for fatty liver disease according to the fifth invention have an effect to suppress accumulation of body fat and thereby to alleviate the conditions of fatty liver disease or thereby to prevent development of fatty liver disease.

The therapeutic or prophylactic agents for obesity according to the sixth invention have an effect to suppress accumulation of body fat and thereby to treat or prevent obesity.

The therapeutic or prophylactic agents for COVID-19 according to the seventh invention have an effect to treat or prevent coronavirus infection caused by SARS-CoV-2.

BRIEF DESCRIPTION OF THE DRAWINGS

FIG. 1 (A) is a graph depicting the result of measurement of mouse body weight, and FIG. 1 (B) is a graph depicting the result of measurement of mouse liver weight. In FIGS. 1 (A) and (B), graph bars represent the measurement results in control mice, mice given an HFD, and mice given the HFD and H-686, from left to right.

FIG. 2 (A) is a graph depicting the result of measurement of blood AST concentration in mice, and FIG. 2 (B) is a graph depicting the result of the measurement of blood ALT concentration in mice. In FIGS. 2 (A) and (B), graph bars represent the measurement results in the control mice, the mice given the HFD, and the mice given the HFD and H-686, from left to right.

FIG. 3 (A) is a graph depicting the result of measurement of mRNA expression level of Col1a1 (collagen, type I, alpha 1 chain), and FIG. 3 (B) is a graph depicting the result of measurement of mRNA expression level of Col1a2 (collagen, type I, alpha 2 chain). In FIGS. 3 (A) and (B), graph bars represent the measurement results in the control mice, the mice given the HFD, and the mice given the HFD and H-686, from left to right. The measurement values represent the ratio of the expression level based on the expression level of Control which is set to "1".

FIG. 4 (A) is a photograph depicting the result of observation of liver tissue from the control mice, and FIG. 4 (B) is a photograph depicting the result of observation of liver tissue from the mice given the HFD, and FIG. 4 (C) is a photograph depicting the result of observation of liver tissue from the mice given the HFD and H-686.

DESCRIPTION OF EMBODIMENTS

Figure 1:
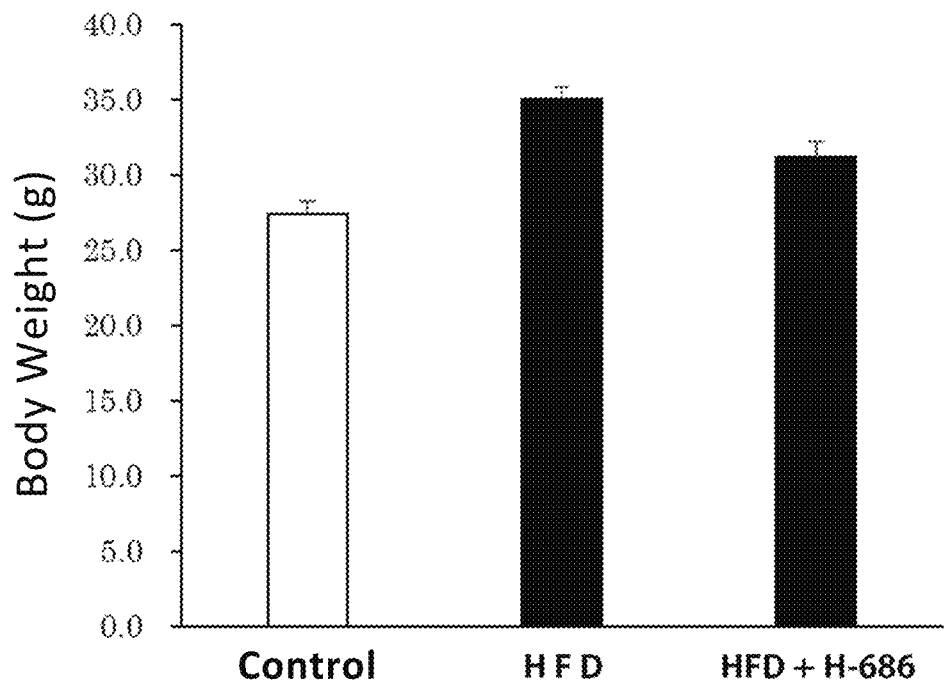
FIG. 1 shows graphs depicting the results of measurements of body weight and liver weight of mice in a NASH treatment study.
Figure 1:
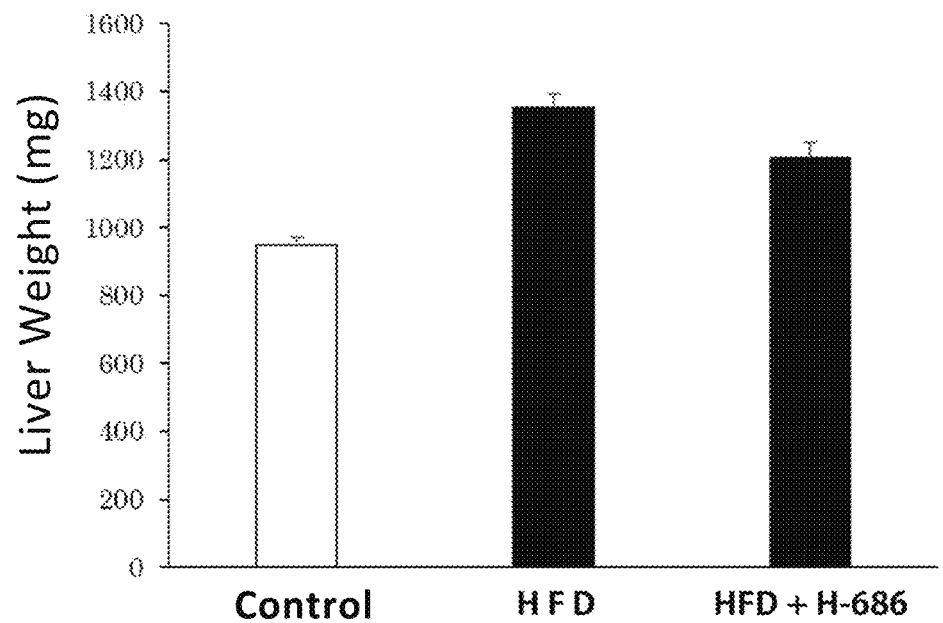

1. Compounds or Salts Thereof 1-1. Structure of Compounds 1-1-1. General Formula of Compounds A compound according to the present invention has a chemical structure represented by the following Formula (I):

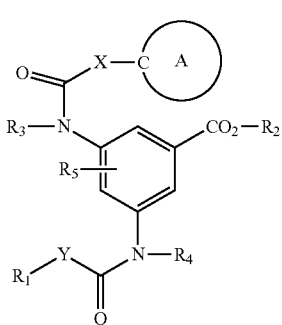

(I)

1-1-2. Ring A

In the Formula (I), a ring A represents an optionally substituted monocyclic or polycyclic aromatic ring or heterocycle.

C in the ring A represents a carbon atom and the ring A is attached to X via a carbon atom. In cases where X is a single bond, the ring A is attached to a carbonyl group (—CO—) via a carbon atom.

In the present invention, the "aromatic ring" is an unsaturated carbon organic compound composed of carbon and hydrogen in a form of a ring. Examples of a monocyclic aromatic ring include, but are not limited to, a benzene ring, a cyclopentadiene ring and the like. Examples of a polycyclic aromatic ring include, but are not limited to, a naphthalene ring, an indene ring, an azulene ring, a fluorene ring, a phenanthrene ring, an anthracene ring, a tetracene ring, a pentacene ring, a benzopyrene ring, a chrysene ring, a pyrene ring, a triphenylene ring and the like.

In the present invention, the "heterocycle" refers to an organic compound composed of carbon, hydrogen and other atoms in a form of a single ring. Examples of a monocyclic heterocycle include, but are not limited to, a pyrrole ring, an imidazole ring, a pyrrolidine ring, a furan ring, a tetrahydrofuran ring, a 1,3-dioxolane ring, a thiophene ring, a pyridine ring, a pyrazine ring, a pyrimidine ring, a piperazine ring, a pyran ring, a 1,4-dioxane ring and the like. Examples of a polycyclic aromatic ring include, but are not limited to, an indole ring, a quinoline ring, a quinoxaline ring, a quinazoline ring, a purine ring, an isobenzofuran ring, a chroman ring, a benzodioxane ring, a benzodioxole ring, a carbazole ring, an acridine ring, a phenoxazine ring, a 4H-pyrido [2,3-c] carbazole ring and the like.

In the present invention, the "cyclic hydrocarbon" refers to a saturated carbon organic compound composed of carbon and hydrogen in a form of a ring. Examples of a monocyclic hydrocarbon include, but are not limited to, cyclopentane, cyclohexane, cycloheptane and the like. Examples of a polycyclic hydrocarbon include, but are not limited to, tricycloheptane, tricyclodecane, perhydro-1,4-ethanoanthracene and the like.

In the present invention, the "substituent" refers to a halogen (such as, for example, fluorine, chlorine, bromine, or iodine), an alkyl group (for example, a $C_{1-6}$ alkyl group, such as methyl group, ethyl group, propyl group, isopropyl group, butyl group, isobutyl group, sec-butyl group, tert-butyl group, pentyl group, or hexyl group), a cycloalkyl group (for example, a $C_{3-6}$ cycloalkyl group, such as cyclopropyl group, cyclobutyl group, cyclopentyl group, or cyclohexyl group), an alkynyl group (for example, a $C_{2-6}$ alkynyl group, such as ethynyl group, 1-propynyl group, or propargyl group), an alkenyl group (for example, a $C_{2-6}$ alkenyl group, such as vinyl group, allyl group, isopropenyl group, butenyl group, or isobutenyl group), an aralkyl group (for example, a $C_{7-11}$ aralkyl group, such as benzyl group, α-methylbenzyl group, or phenethyl group), an aryl group (for example, a $C_{6-10}$ aryl group, such as phenyl group or naphthyl group; preferably phenyl group), an alkoxy group (for example, a $C_{1-6}$ alkoxy group, such as methoxy group, ethoxy group, propoxy group, isopropoxy group, butoxy group, isobutoxy group, sec-butoxy group, or tert-butoxy), an aryloxy group (for example, a $C_{6-10}$ aryloxy group, such as phenoxy), an alkanoyl group (for example, a $C_{1-6}$ alkyl-carbonyl group, such as formyl group, acetyl group, propionyl group, butyryl group, or isobutyryl group), an arylcarbonyl group (for example, a $C_{6-10}$ aryl-carbonyl group, such as benzoyl group or naphthoyl group), an alkanoyloxy group (for example, a $C_{1-6}$ alkyl-carbonyloxy group, such as formyloxy group, acetyloxy group, propionyloxy group, butyryloxy group, or isobutyryloxy group), an arylcarbonyloxy group (for example, a $C_{6-10}$ aryl-carbonyloxy group, such as benzoyloxy group or naphthoyloxy group), carboxyl group, an alkoxycarbonyl group (for example, a $C_{1-6}$ alkoxycarbonyl group, such as methoxycarbonyl group, ethoxycarbonyl group, propoxycarbonyl group, isopropoxycarbonyl group, butoxycarbonyl group, isobutoxycarbonyl group, or tert-butoxycarbonyl), an aralkyloxycarbonyl group (for example, a $C_{7-11}$ aralkyloxycarbonyl group, such as benzyloxycarbonyl group), carbamoyl group, a halogenated alkyl group (for example, a mono-, di-, or tri-halogenated —$C_{1-4}$ alkyl group, such as chloromethyl group, dichloromethyl group, trifluoromethyl group, or 2,2,2-trifluoroethyl group), oxo group, amidino group, imino group, amino group, an alkylamino group (for example, a mono-$C_{1-4}$ alkylamino group, such as methylamino group, ethylamino group, propylamino group, isopropylamino group, or butylamino group), a dialkylamino group (for example, a di-$C_{1-4}$ alkylamino group, such as dimethylamino group, diethylamino group, dipropylamino group, diisopropylamino group, dibutylamino group, or methylethylamino group), an alkoxycarbonylamino group (for example, a $C_{1-6}$ alkoxycarbonylamino group, such as methoxycarbonylamino group, isoproxycarbonylamino group, or tert-butoxycarbonylamino group), a cyclic amino group (a 3- to 6-membered cyclic amino group containing carbon atoms and one nitrogen atom and further containing one to three heteroatoms selected from oxygen, sulfur, and nitrogen; such as, for example, aziridinyl group, azetidinyl group, pyrrolidinyl group, pyrrolinyl group, pyrrolyl group, imidazolyl group, pyrazolyl group, imidazolidinyl group, piperidyl group, morpholinyl group, dihydropyridyl group, pyridyl group, N-methylpiperazinyl group, or N-ethylpiperazinyl group), alkylenedioxy group (for example, a $C_{1-3}$ alkylenedioxy group, such as methylenedioxy group or ethylenedioxy group), hydroxy group, cyano group, mercapto group, sulfo group, sulfino group, phosphono group, sulfamoyl group, a monoalkylsulfamoyl group (for example, a mono-$C_{1-6}$ alkylsulfamoyl group, such as N-methylsulfamoyl, N-ethylsulfamoyl, N-propylsulfamoyl, N-isopropylsulfamoyl, or N-butylsulfamoyl), a dialkylsulfamoyl group (for example, a di-$C_{1-6}$ alkylsulfamoyl group, such as N,N-dimethylsulfamoyl group, N,N-diethylsulfamoyl group, N,N-dipropylsulfamoyl group, or N,N-dibutylsulfamoyl group), an alkylthio group (for example, a $C_{1-6}$ alkylthio group, such as methylthio group, ethylthio group, propylthio group, isopropylthio group, butylthio group, sec-butylthio group, or tert-butylthio group), an arylthio group (for example, a $C_{6-10}$ arylthio group, such as phenylthio group or naphthylthio group), an alkylsulfinyl group (for example, a $C_{1-6}$ alkylsulfinyl group, such as methylsulfinyl group, ethylsulfinyl group, propylsulfinyl group, or butylsulfinyl group), an alkylsulfonyl group (for example, a $C_{1-6}$ alkylsulfonyl group, such as methylsulfonyl group, ethylsulfonyl group, propylsulfonyl group, or butylsulfonyl group), or an arylsulfonyl group (for example, a $C_{6-10}$ arylsulfonyl group, such as phenylsulfonyl group or naphthylsulfonyl group).

In the present invention, the phrase "optionally substituted" means that a substituent as described above is present or absent. In cases where a moiety is substituted, two or more substituents may be present within the moiety, and the substituents may be identical to or different from each other. In cases where a compound according to the present invention is "optionally substituted," the number of substituents within the compound is preferably from 0 to 3, and more preferably 0.

For the "substituent", the substituent containing 0 to 12 carbon atoms is preferred. The substituent containing 0 to 6 carbon atoms is more preferred.

For the "substituent", the substituent containing 1 to 10 atoms is preferred. Examples of such substituent include, but are not limited to, halogen atom, methyl group, ethyl group, vinyl group, methoxy group, ethoxy group, acetyl group, carboxyl group, methoxycarbonyl group, chloromethyl group, amino group, methylamino group, hydroxy group, sulfo group, and methylthio group.

The ring A in the Formula (I) is an optionally substituted monocyclic or polycyclic aromatic ring or heterocycle as described above, and preferably an optionally substituted polycyclic aromatic ring or heterocycle.

More preferably, the ring A represents a group represented by the following Formula (VI):

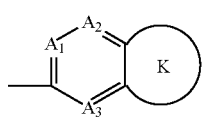

(VI)

In the Formula (VI), $A_1$, $A_2$, and $A_3$ independently represent a carbon atom or a nitrogen atom, and a ring K represents an optionally substituted monocyclic or polycyclic aromatic ring, heterocycle or cyclic hydrocarbon.

Examples of the group represented by the Formula (VI) include, but are not limited to, groups having the following structure:

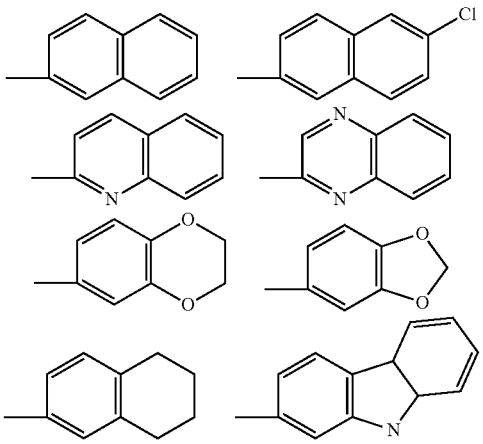

The group represented by the Formula (VI) is preferably a group in which all of $A_1$, $A_2$, and $A_3$ represent a carbon atom. Moreover, the group represented by the Formula (VI) is preferably a group in which the ring K is an optionally substituted monocyclic or polycyclic aromatic ring.

More preferably, a naphtyl group may be used as the group represented by the Formula (VI).

1-1-3. $R_1$

In the Formula (I), $R_1$ represents a group represented by any of the Formulae (II)-(V).

The group represented by the Formula (II) is a group having the following structure:

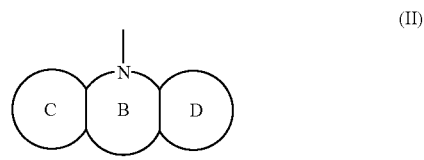

(II)

In the Formula (II), a ring B represents an optionally substituted monocyclic heterocycle, rings C and D independently represent an optionally substituted monocyclic or polycyclic aromatic ring, heterocycle or cyclic hydrocarbon. The rings B, C and D form a condensed ring.

N in the ring B represents a nitrogen atom, and the ring B is attached to Y via a nitrogen atom. In cases where Y is a single bond, the ring B is attached to a carbonyl group (—CO—) via a nitrogen atom.

Examples of the group represented by the Formula (II) include, but are not limited to, groups having the following structure:

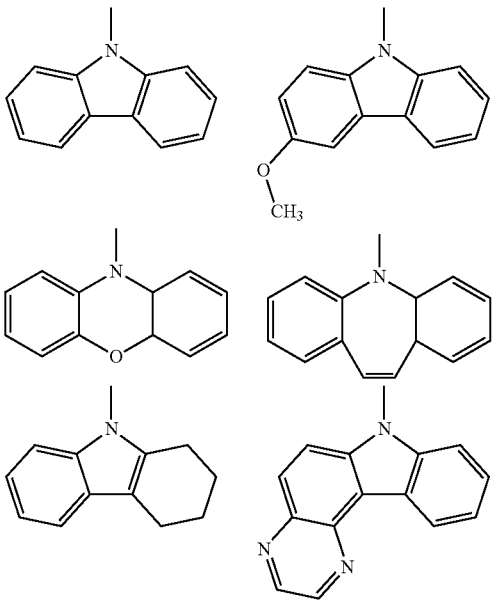

Preferably, rings C and D are optionally substituted monocyclic aromatic rings or heterocycles, and more preferably, both of them are optionally substituted monocyclic aromatic rings. In these cases, the group represented by the Formula (II) is a heterocycle having three rings.

The group represented by the Formula (II) is preferably an optionally substituted carbazolyl group.

The group represented by the Formula (III) is a group having the following structure:

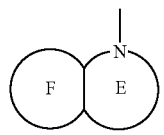

(III)

In the Formula (III), a ring E represents an optionally substituted monocyclic heterocycle, and a ring F represents an optionally substituted monocyclic or polycyclic aromatic ring, heterocycle or cyclic hydrocarbon. The rings E and F form a condensed ring.

N in the ring E represents a nitrogen atom, and the ring E is attached to Y via a nitrogen atom. In cases where Y is a single bond, the ring E is attached to a carbonyl group (—CO—) via a nitrogen atom.

Examples of the group represented by the Formula (III) include, but are not limited to, groups having the following structure:

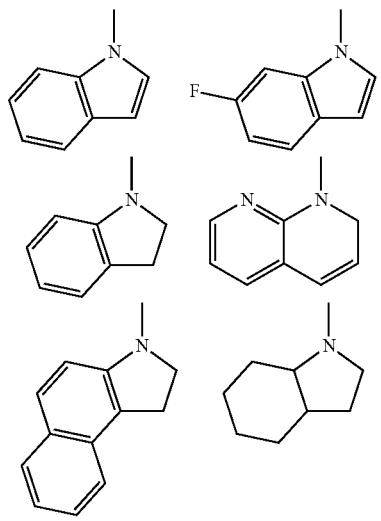

A ring F is preferably an optionally substituted monocyclic aromatic ring or a heterocycle, and more preferably an optionally substituted monocyclic aromatic ring. In these cases, the group represented by the Formula (III) is a heterocycle having two rings.

The group represented by the Formula (IV) is a group having the following structure:

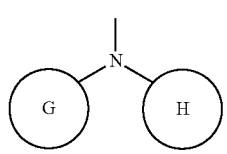

(IV)

In the Formula (IV), rings G and H independently represent an optionally substituted monocyclic or polycyclic aromatic ring or heterocycle.

Examples of the group represented by the Formula (IV) include, but are not limited to, groups having the following structure:

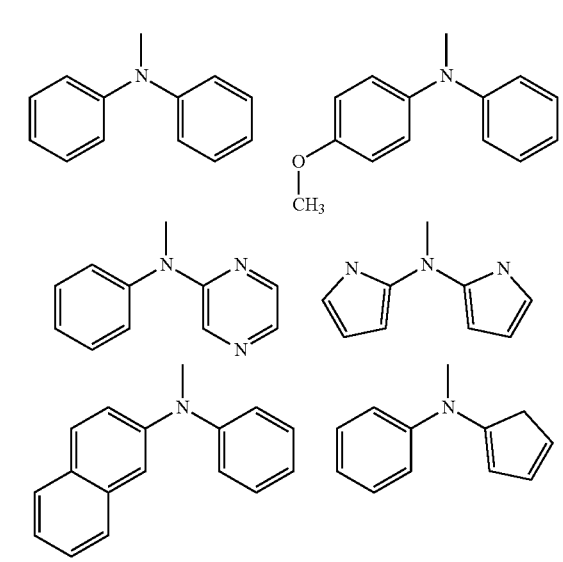

In the Formula (IV), rings G and H are preferably optionally substituted monocyclic aromatic rings or heterocycles. The group represented by the Formula (IV) is preferably an optionally substituted diphenylamino group.

The group represented by the Formula (V) is a group having the following structure:

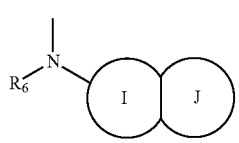

(V)

In the Formula (V), a ring I represents an optionally substituted monocyclic aromatic ring or heterocycle, and a ring J represents an optionally substituted monocyclic or polycyclic aromatic ring, heterocycle or cyclic hydrocarbon. The rings I and J form a condensed ring.

In the Formula (V), $R_6$ represents a hydrogen atom, an optionally substituted hydrocarbon group, or an optionally substituted heterocyclic group.

In the present invention, the "hydrocarbon group" means a group derived from a compound composed of carbon and hydrogen atoms. Examples of the hydrocarbon group can include, but are not limited to, aliphatic hydrocarbon, monocyclic saturated hydrocarbon, and aromatic hydrocarbon groups, and preferably contain 1 to 16 carbon atoms. Specific examples of the hydrocarbon group include, but are not limited to, alkyl groups, alkenyl groups, alkynyl groups, cycloalkyl groups, and aryl groups.

In this respect, examples of "alkyl group" include methyl group, ethyl group, propyl group, isopropyl group, butyl group, isobutyl group, sec-butyl group, tert-butyl group, pentyl group, and hexyl group. Examples of "alkenyl group" include vinyl group, 1-propenyl group, allyl group, isopropenyl group, butenyl group, and isobutenyl group. Examples of "alkynyl group" include ethynyl group, propargyl group, and 1-propynyl group. Examples of "cycloalkyl group"

include cyclopropyl group, cyclobutyl group, cyclopentyl group, and cyclohexyl group. Examples of "aryl group" include phenyl group, indenyl group, naphthyl group, fluorenyl group, anthryl group, biphenylenyl group, phenanthrenyl group, as-indacenyl group, s-indacenyl group, acenaphthylenyl group, phenalenyl group, fluoranthenyl group, pyrenyl group, naphthacenyl group, and hexacenyl group.

In addition, in the present invention, the "heterocyclic group" refers to a group derived from a cyclic compound composed of atoms of carbon and some other elements. In the present invention, the "heterocyclic group" can be, but is not limited to, for example, any of 5- to 14-membered monocyclic to pentacyclic heterocyclic groups each having carbon atoms and further having one to four heteroatoms of one or two elements selected from nitrogen, oxygen, and sulfur. Specific examples of the heterocyclic group can include but are not limited to 2- or 3-thienyl group, 2- or 3-furyl group, 1-, 2- or 3-pyrrolyl group, 1-, 2- or 3-pyrrolidinyl group, 2-, 4- or 5-oxazolyl group, 3-, 4- or 5-isooxazolyl group, 2-, 4- or 5-thiazolyl group, 3-, 4- or 5-isothiazolyl group, 3-, 4- or 5-pyrazolyl group, 2-, 3- or 4-pyrazolidinyl group, 2-, 4- or 5-imidazolyl group, 1,2,3-triazolyl group, 1,2,4-triazolyl group, and 1H- or 2H-tetrazolyl group as 5-membered cyclic groups each having carbon atoms and further having one to four heteroatoms selected from oxygen, sulfur, and nitrogen. Moreover, specific examples of the heterocyclic group can include but are not limited to 2-, 3- or 4-pyridyl group, N-oxide-2-, 3- or 4-pyridyl group, 2-, 4- or 5-pyrimidinyl group, N-oxide-2-, 4- or 5-pyrimidinyl group, thiomorpholinyl group, morpholinyl group, piperidino group, 2-, 3- or 4-piperidyl group, thiopyranyl group, 1,4-oxazinyl group, 1,4-thiazinyl group, 1,3-thiazinyl group, piperazinyl group, triazinyl group, 3- or 4-pyridazinyl group, pyrazinyl group, and N-oxide-3- or 4-pyridazinyl group as 6-membered cyclic groups each having carbon atoms and further having one to four heteroatoms selected from oxygen, sulfur, and nitrogen. Moreover, specific examples of the heterocyclic group can include but are not limited to indolyl group, benzofuryl group, benzothiazolyl group, benzoxazolyl group, xanthenyl group, benzimidazolyl group, quinolyl group, isoquinolyl group, phthalazinyl group, quinazolinyl group, quinoxalinyl group, indolizinyl group, quinolizinyl group, 1,8-naphthyridinyl group, dibenzofuranyl group, carbazolyl group, acridinyl group, phenanthridinyl group, perimidinyl group, phenazinyl group, chromanyl group, phenothiazinyl group, phenoxazinyl group, and 7H-pirazino[2,3-c]carbazolyl group as bicyclic to tetracyclic condensed ring groups each having carbon atoms and further having one to four heteroatoms selected from oxygen, sulfur, and nitrogen.

Examples of the group represented by the Formula (V) can include, but are not limited to, groups having the following structure:

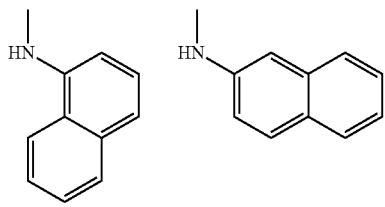

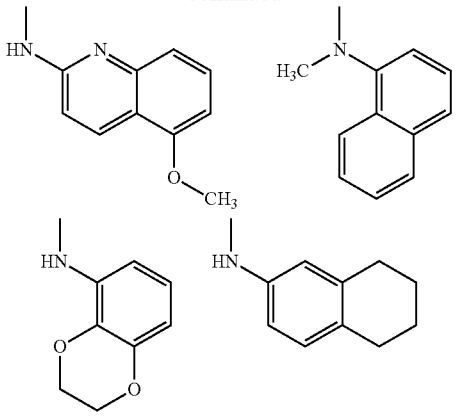

In the Formula (V), a ring J is preferably an optionally substituted monocyclic aromatic ring or a heterocycle. $R_6$ is preferably a hydrogen atom.

Any groups represented by the Formulae (II)-(V) have two or more rings and are characterized by their attachment to Y via a nitrogen atom.

In the present invention, from the viewpoint of activity of the compounds, it is preferable to use the compound having the group represented by the Formula (II) or (IV), and more preferable to use the group represented by the Formula (II), among the groups represented by the Formulae (II)-(V).

1-1-4. $R_2$-$R_5$

In the Formula (I), $R_2$ represents a hydrogen atom, an optionally substituted hydrocarbon group, an optionally substituted heterocyclic group, or an optionally substituted amino group.

In the present invention, the "optionally substituted amino group" is a primary amino group, a secondary amino group, or a tertiary amino group. The secondary amino group may be an amino group having one substituent, and may include, but are not limited to, for example, alkylamino group, arylamino group, alkoxycarbonylamino group and the like. The tertiary amino group may be an amino group having identical or different two substituents, and may include, but not limited to, for example, dialkylamino group, diarylamino group and the like.

In the present invention, from the viewpoint of activity of the compounds, the compound in which $R_2$ is a hydrogen atom or a methyl group is preferably used, and in particular, the compound in which $R_2$ is a hydrogen atom and —$CO_2R_2$ group is a carboxyl group (—$CO_2H$) is preferably used. However, even if $R_2$ is an optionally substituted hydrocarbon group, an optionally substituted heterocycle group or an optionally substituted amino group, and the activity of the compound is low, the compound may be subject to hydrolysis and easily become a carboxyl group by substitution by hydrogen atoms so that the activity of the compound may be increased. Thus, such a compound can be also used as a prodrug.

In the Formula (I), $R_3$ represents a hydrogen atom, an optionally substituted hydrocarbon group, or an optionally substituted heterocyclic group.

Moreover, $R_4$ represents a hydrogen atom, an optionally substituted hydrocarbon group, or an optionally substituted heterocyclic group.

In the present invention, from the viewpoint of activity of the compounds, the compound in which $R_3$ and $R_4$ are hydrogen atoms is preferably used. Such a compound can be represented by the following general formula (VII):

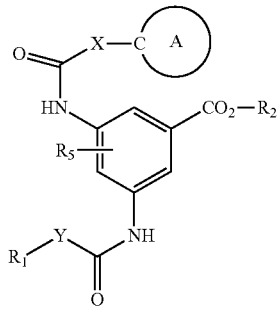

(VII)

In the Formula (VII), rings $A_1$, $R_1$, $R_2$, $R_5$, X and Y are the same as defined in the Formula (I).

In the Formula (I), $R_5$ represents 0 to 3 identical or different substituents attached to a benzene ring. In this context, "different" also includes the case in which only one of three substituents is different. In the present invention, the compound having no $R_5$, namely, the compound having hydrogen atoms at positions 2, 4, and 6 of the benzene ring is preferably used.

1-1-5. X and Y

In the Formula (I), X represents a single bond, $C_{1-2}$ alkylene group, —O— group, —$CH_2$—O— group, —$CH_2$—NH—CO— group, or —$CH_2$—NH—CO—O—$CH_2$— group.

In the present invention, from the viewpoint of activity of the compounds, preferably the compound in which X is a single bond, —$CH_2$—O— group or —$CH_2$—NH—CO— group may be used, and more preferably the compound in which X is a single bond may be used.

In the Formula (I), Y represents a single bond or $C_{1-2}$ alkylene group.

In the present invention, from the viewpoint of activity of the compounds, preferably the compound in which Y is a single bond or $C_1$ alkylene group (methylene group) may be used, and more preferably the compound in which Y is a single bond may be used.

In this context, the "single bond" refers to the state that the groups on both sides of X (or Y) are attached directly without any linking groups.

In the present invention, from the viewpoint of activity of the compounds, in the compound represented by the Formula (I), $R_3$ and $R_4$ are preferably hydrogen atoms, and more preferably X and Y are single bonds. Such compounds can be represented by the following general formula (VIII):

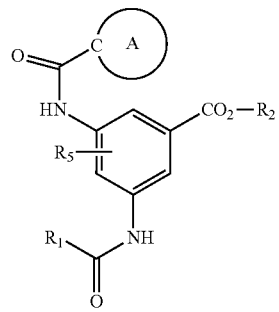

(VIII)

In the Formula (VIII), rings A, $R_1$, $R_2$, and $R_5$ are the same as defined in the Formula (I).

1-2. Salts of Compounds

A salt of a compound according to the present invention may be a salt with, for example, an inorganic or organic base, an inorganic or organic acid, or an acidic or basic amino acid. In cases where a compound represented by the Formula (I) according to the present invention has an acidic functional group, a salt of the compound can be formed with an inorganic base, an organic base, or a basic amino acid. Additionally, in cases where a compound represented by the Formula (I) according to the present invention has a basic functional group, a salt of the compound can be formed with an inorganic acid, an organic acid, or an acidic amino acid.

Examples of the salt with an inorganic base include, but are not limited to, sodium, potassium, and ammonium salts. Examples of the salt with an organic base include, but are not limited to, trimethylamine, ethanolamine, and cyclohexylamine salts. Examples of the salt with an inorganic acid include, but are not limited to, hydrochloride and phosphate salts. Examples of the salt with an organic acid include, but are not limited to, acetate, phthalate, fumarate, and oxalate salts. Examples of the salt with an acidic amino acid include, but are not limited to, salts with aspartic acid and with glutamic acid, while examples of the salt with a basic amino acid include salts with arginine and with lysine.

1-3. Methods for Compound Production

A compound according to the present invention can be synthesized by, for example, but not limited to, using a diaminobenzoate ester, according to the scheme shown in the following reaction flow chart (A):

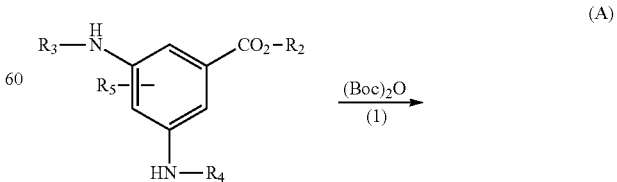

(A)

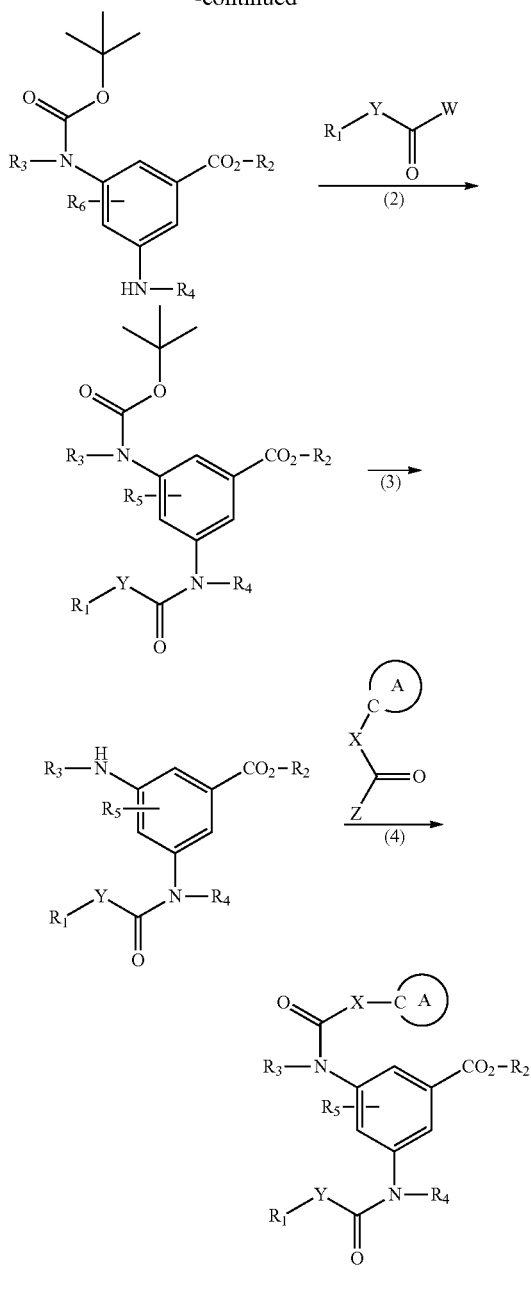

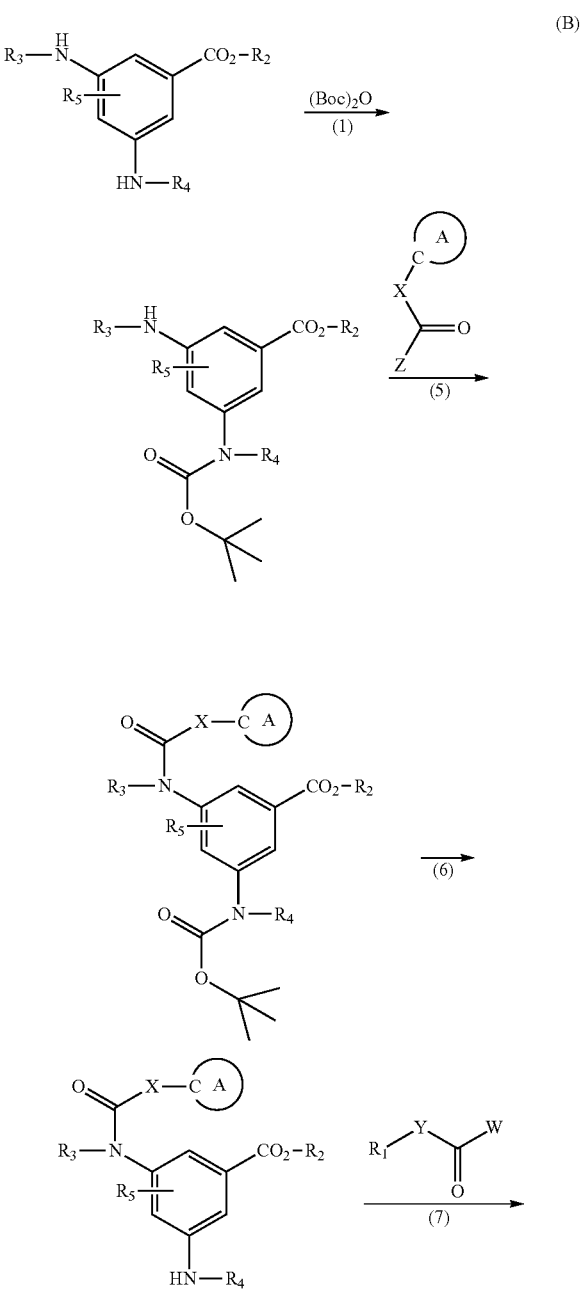

The compound obtained from the reaction flow chart (A) is the compound represented by the Formula (I), and moreover, in the case of $R_2$ being not a hydrogen atom, $R_2$ may be detached in a basic condition to obtain a carboxylic acid in which $R_2$ is substituted with a hydrogen atom.

Furthermore, in the case of $R_2$ being not a hydrogen atom, $R_2$ may also be detached after the reaction (3), followed by performing the reaction (4) to obtain a carboxylic compound.

The compound according to the present invention can also be synthesized by using a diaminobenzoate ester according to the scheme shown in the following reaction flow chart (B):

In the reaction flow chart (A), rings A, $R_1$-$R_5$, X and Y are the same as defined in the Formula (I). W and Z independently represent a halogen atom or a hydroxy group.

In the reaction flow chart (A), the reaction (1) is a reaction for Boc-protecting amines, in which one amine in diaminobenzoate ester is reacted with $(Boc)_2O$ (di-tert-butyl dicarbonate) in the presence of a base. Then, the reaction (2) is a reaction in which the unreacted other amine in the diaminobenzoate ester is reacted with an acyl halide or a carboxylic acid having $R_1$ and Y to attach a group having $R_1$ and Y to the amine via an amide bond. The reaction (3) is a reaction for deprotection in which a Boc group is detached under an acidic condition. Then, the reaction (4) is a reaction in which the deprotected amine is reacted with an acyl halide or a carboxylic acid having rings A and X to attach a group having the rings A and X to the amine via an amide bond.

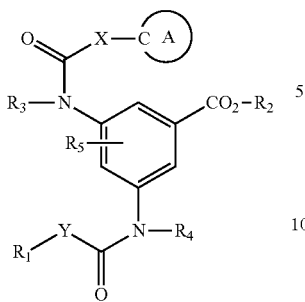

In the reaction flow chart (B), rings A, $R_1$-$R_5$, X and Y are the same as defined in the Formula (I). W and Z independently represent a halogen atom or a hydroxy group.

In the reaction flow chart (B), the reaction (1) is the same as the reaction (1) in the reaction flow chart (A), that is, a reaction for Boc-protecting amines, in which one amine in diaminobenzoate ester is reacted with (Boc)$_2$O (di-tert-butyl dicarbonate) in the presence of a base. Then, the reaction (5) is a reaction in which the unreacted other amine in the diaminobenzoate ester is reacted with an acyl halide or a carboxylic acid having rings A and X to attach a group having the rings A and X to the amine via an amide bond. The reaction (6) is a reaction for deprotection in which a Boc group is detached under an acidic condition. Then, the reaction (7) is a reaction in which the deprotected amine is reacted with an acyl halide or a carboxylic acid having $R_1$ and Y to attach a group having $R_1$ and Y to the amine via an amide bond.

The reaction (A) is different from the reaction (B) in that the reaction (A) attaches the group having $R_1$ and Y first, while the reaction (B) attaches the group having the rings A and X first.

The compound obtained from the reaction flow chart (B) is the compound represented by the Formula (I), and moreover, in the case of $R_2$ being not a hydrogen atom, $R_2$ may be detached in a basic condition to obtain a compound of a carboxylic acid in which $R_2$ is substituted with a hydrogen atom.

Furthermore, in the case of $R_2$ being not a hydrogen atom, $R_2$ may also be detached after the reaction (6), followed by performing the reaction (7) to yield a carboxylic compound.

The reaction flow charts (A) and (B) are the reactions involving protection with a Boc group and deprotection. However, these reactions can be accomplished without protection with a Boc group. For example, the compound may be synthesized with the scheme shown in the following reaction flow chart (C).

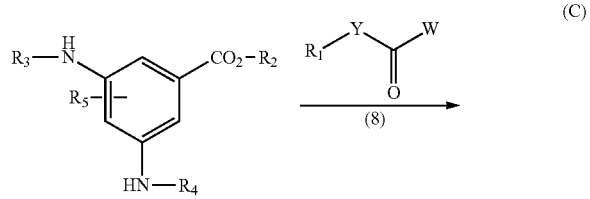

(C)

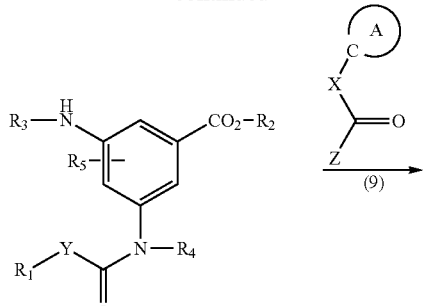

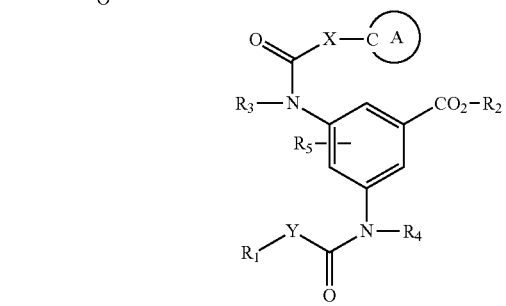

In the reaction flow chart (C), rings A, $R_1$-$R_5$, X and Y are the same as defined in the Formula (I). W and Z independently represent a halogen atom or a hydroxy group.

In the reaction flow chart (C), the reaction (8) is a reaction in which one amine in diaminobenzoate ester is reacted with an acyl halide or a carboxylic acid having $R_1$ and Y to attach a group having $R_1$ and Y to the amine via an amide bond. The reaction (9) is a reaction is a reaction in which the unreacted other amine in the diaminobenzoate ester is reacted with an acyl halide or a carboxylic acid having rings A and X to attach a group having the rings A and X to the amine via an amide bond.

The reaction flow chart (C) is a synthesis method in which the group having $R_1$ and Y is first attached as with the reaction flow chart (A). Although the purity is lower because the protection with a Boc group is not performed, it is possible to synthesize it at sufficiently high purity by exploring the reaction conditions.

The compound obtained from the reaction flow chart (C) is the compound represented by the Formula (I), and moreover, in the case of $R_2$ being not a hydrogen atom, $R_2$ may be detached in a basic condition to obtain a carboxylic acid in which $R_2$ is substituted with a hydrogen atom.

Furthermore, in the case of $R_2$ being not a hydrogen atom, $R_2$ may also be detached after the reaction (8), followed by performing the reaction (9) to yield a carboxylic compound.

2. Pin1 Inhibitors

Pin1 refers to a kind of peptidyl-prolyl cis-trans isomerase (PPIase) that catalyzes cis/trans isomerization of proline residues in proteins, and is an enzyme that specifically acts on proline residues immediately preceded by phosphorylated serine or threonine to change the conformation of those proline residues.

A Pin1 inhibitor according to the present invention is a compound that inhibits the function of Pin1, and a compound represented by the Formula (I) described in the above section 1, or a salt thereof, can be used as the Pin1 inhibitor.

In the present invention, the phrase "inhibit the function of Pin1" means inhibiting the isomerase activity of Pin1 and/or the activity of Pin1 to associate or interact with another protein, such as IRS-1.

The activity of a Pin1 inhibitor according to the present invention to inhibit the function of Pin1 can be measured by, for example, but not limited to, examining AMPK (AMP-activated protein kinase) phosphorylation level as an index by a cell-based assay (see Yusuke Nakatsu et al., Journal of Biological Chemistry, 2015, Vol. 290, No. 40, pp. 24255-24266). Alternatively, the activity of a Pin1 inhibitor according to the present invention to inhibit the function of Pin1 can also be measured by an assay without cells (i.e., a cell-free assay). For example, the activity of a Pin1 inhibitor according to the present invention to inhibit the function of Pin1 can be measured by detecting a change in the isomerase activity of Pin1 against a peptide substrate as a change in absorbance (see B. Janowskiet al., AnalyticalBiochemistry, 1997, Vol. 252, Issue 2, pp. 299-307), or by decomposition of the substrate by coupling with protease (see Hailong Zhao et al., Bioorganic & Medicinal Chemistry, 2016, Vol. 24, pp. 5911-5920). Alternatively, the activity of a Pin1 inhibitor according to the present invention to inhibit the function of Pin1 can also be measured by detecting the association of the inhibitor with Pin1, which competes with the association of Pin1 with a peptide substrate (see Shuo Wei et al., Nature Medicine, 2015, Vol. 21, No. 5, pp. 457-466, online methods).

3. Pharmaceutical Compositions

A pharmaceutical composition according to the present invention is a composition comprising a compound represented by the Formula (I) or a pharmaceutically acceptable salt thereof and a pharmaceutically acceptable carrier.

The structure of the compound represented by the Formula (I) is as described in the above section 1-1.

Pharmaceutical compositions according to the present invention can treat or prevent various diseases based on inhibition of Pin1 function as a mechanism of action.

In cases where the compound represented by the Formula (I) has an acidic functional group in the molecule, examples of a pharmaceutically acceptable salt of the compound can include, but are not limited to, sodium, potassium, and ammonium salts. Additionally, in cases where the compound has a basic functional group in the molecule, examples of a pharmaceutically acceptable salt of the compound can include, but are not limited to, hydrochloride, phosphate, acetate, phthalate, fumarate, and oxalate salts.

A pharmaceutical composition according to the present invention can be prepared by combining a compound represented by the Formula (I) or a pharmaceutically acceptable salt thereof and a pharmaceutically acceptable carrier, and may be made in the form of, for example, but not limited to, tablets, granules, capsules, powders, liquids, injection solutions, suppositories, patches, eye drops, and inhalants.

As a pharmaceutically acceptable carrier used in a pharmaceutical composition according to the present invention, various inorganic or organic carrier materials can be used. When the pharmaceutical composition is prepared in solid formulation, such as a tablet or a granule, an excipient, a lubricant, a binder, a disintegrator, and the like can be used. When the pharmaceutical composition is prepared in liquid formulation, such as a liquid or an injection solution, a solvent, a solubilizing agent, a suspending agent, a buffering agent, and the like can be used.

Moreover, additives such as antioxidant, antiseptic agent, and coloring agent can also be used as necessary.

Non-limiting examples of an excipient that can be used include lactose, D-mannitol, and starch; non-limiting examples of a lubricant that can be used include magnesium stearate and talc; non-limiting examples of a binder that can be used include crystalline cellulose and gelatin; non-limiting examples of a disintegrator that can be used include carboxymethyl cellulose.

Moreover, examples of a solvent that can be used include distilled water, alcohols, and propylene glycol; examples of a solubilizing agent that can be used include polyethylene glycol and ethanol; examples of a suspending agent that can be used include stearyl triethanolamine and sodium lauryl sulfate; examples of a buffering agent that can be used include phosphate and acetate salts.

4. Therapeutic or Prophylactic Agents for Inflammatory Disease

Therapeutic or prophylactic agents for inflammatory diseases according to the present invention contain the compound represented by the Formula (I) or the pharmaceutically acceptable salt thereof as an active ingredient.

The structure of the compound represented by the Formula (I) is as described in the above section 1-1, and the pharmaceutically acceptable salt thereof is as described in the above section 3.

In the present invention, inflammatory diseases refer to diseases that damage tissues due to chronic inflammation, including non-alcoholic steatohepatitis, inflammatory bowel disease, and pulmonary fibrosis.

In the present invention, "non-alcoholic steatohepatitis," which is also called NASH (Non-Alcoholic SteatoHepatitis), refers to a non-alcoholic fatty liver disease associated with inflammation the liver tissue, characterized by an accumulation of fat in the liver, which is similar to that found in cases of alcoholic hepatitis and is observed even in a patient who has no history of alcohol intake sufficient to induce liver injury. Non-alcoholic steatohepatitis is known to cause liver cirrhosis, in which dead liver cells are replaced by fibrous tissue.

In the present invention, "inflammatory bowel disease" is a collective term for diseases that cause chronic inflammation and/or ulcers in the mucosa of the large and small intestinal tracts. Ulcerative colitis and Crohn's disease are included as representative examples of inflammatory bowel disease. Ulcerative colitis is a disease that causes chronic inflammation and ulcers in the large intestine, while Crohn's disease is a disease that causes inflammatory lesions, such as ulcer and swelling, in any part of the digestive tract. In cases of stenosis due to intestinal fibrosis caused by inflammatory bowel disease, surgery should be performed.

In the present invention, "pulmonary fibrosis" is a disease that causes chronic inflammation in lung tissue, which is followed by hardening of the inflamed lung tissue due to fibrosis, and eventually impairs lung expansion and contraction.

The therapeutic or prophylactic agents for inflammatory diseases according to the present invention contain a compound represented by the Formula (I) or a pharmaceutically acceptable salt thereof as an active ingredient and thereby have an alleviating effect on the conditions of inflammatory diseases, such as non-alcoholic steatohepatitis (NASH), inflammatory bowel disease, and pulmonary fibrosis, or a prophylactic effect on the development of inflammatory diseases. Such beneficial effects are considered to be based on inhibition of Pin1 function as the mechanism of action of the compound represented by the Formula (I) or the pharmaceutically acceptable salt thereof.

The fact that the inhibition of Pin1 function as the mechanism of action has a therapeutic effect for both non-alcoholic steatohepatitis (NASH) and inflammatory bowel disease has also been demonstrated in Patent Document 5 (WO 2018/101329).

In the therapeutic or prophylactic agents for inflammatory diseases according to the present invention, the compound represented by the Formula (I) and contained as an active ingredient is highly variable in terms of chemical structure, due to, for example, the rings A, $R_1$-$R_5$, X, and Y. Thus, the chemical structures of the therapeutic or prophylactic agents for inflammatory diseases according to the present invention can be modified to obtain, for example, suitable absorption, distribution, degradation, and excretion features.

The therapeutic or prophylactic agents for inflammatory diseases according to the present invention can be administered as therapeutic or prophylactic agents for inflammatory diseases, such as non-alcoholic steatohepatitis, inflammatory bowel disease, and pulmonary fibrosis, not only to patients diagnosed with these diseases but also to patients suspected of having or at risk of these diseases.

The therapeutic or prophylactic agents for inflammatory diseases according to the present invention may be formulated in various dosage forms, which are combined with pharmaceutically acceptable carriers, as described in the above section 3.

When used as a therapeutic or prophylactic agent for non-alcoholic steatohepatitis, the therapeutic or prophylactic agent can be made in the form of, for example, but not limited to, tablets, granules, capsules, powders, and liquids for oral administration, and can also be administered in the form of injection solution directly to the liver by, for example, tube feeding, from the viewpoint of allowing the therapeutic or prophylactic agent to act directly on the liver and thereby to reduce side effects.

When used as a therapeutic or prophylactic agent for inflammatory bowel disease, the therapeutic or prophylactic agent is preferably made in the form of, but not limited to, tablets, granules, capsules, powders, liquids, or suppositories, from the viewpoint of allowing the therapeutic or prophylactic agent to act directly on the intestine.

When used as a therapeutic or prophylactic agent for pulmonary fibrosis, the therapeutic or prophylactic agent is preferably made in the form of, for example, but not limited to, inhalants, from the viewpoint of allowing the therapeutic or prophylactic agent to act directly on the lung.

The therapeutic or prophylactic agents for inflammatory diseases according to the present invention should preferably be administered to a patient at a daily dose of 0.01 to 100 mg, more preferably 0.1 to 10 mg, of active ingredient per kg of body weight.

The therapeutic or prophylactic agents for inflammatory diseases according to the present invention may contain a compound according to the present invention or a pharmaceutically acceptable salt thereof and further contain active ingredients in at least one or more drugs selected from the group of therapeutic or prophylactic agents for inflammatory diseases.

Examples of such an active ingredient which can be used include, but are not limited to: vitamin E as an active ingredient in a therapeutic agent for non-alcoholic steatohepatitis; obeticholic acid (6-ethyl-chenodeoxycholic acid) which is under a clinical study at the time of filing the present application; elafibranor; selonsertib; saroglitazar; lanifibranor; semaglutide; pemafibrate; and the like. Moreover, 5-aminoacetyl acid, salazosulfapyridine and the like can be used as an active ingredient of a therapeutic agent for inflammatory bowel disease.

The therapeutic or prophylactic agents for inflammatory diseases according to the present invention may be used in combination with one or more drugs selected from the drugs classified as therapeutic or prophylactic agents for the inflammatory diseases.

5. Therapeutic or Prophylactic Agents for Fatty Liver Disease

Therapeutic or prophylactic agents for fatty liver diseases according to the present invention contain the compound represented by the Formula (I) or the pharmaceutically acceptable salt thereof as an active ingredient.

The structure of the compound represented by the Formula (I) is as described in the above section 1-1, and the pharmaceutically acceptable salt thereof is as described in the above section 3.

In the present invention, the "fatty liver disease", which is also called "hepatic steatosis", refers to a pathological condition in which neutral fat excessively accumulates in a liver. Examples of the fatty liver disease include alcoholic steatosis and non-alcoholic fatty liver disease (NAFLD). Non-alcoholic fatty liver disease (NAFLD) is a pathological condition belonging to metabolic syndrome in which, even though patients have no history of alcohol intake sufficient to induce liver injury, fat deposition as with alcoholic steatosis is observed. The non-alcoholic fatty liver disease (NAFLD) includes simple hepatic steatosis as a mild pathological condition and non-alcoholic steatohepatitis (NASH) as a severe pathological condition accompanied by inflammation of liver tissue.

The compounds serving as an active ingredient in the present invention has an effect of inhibiting the function of Pin as the mechanism of action and can suppress accumulation of fat so that they can be used as a therapeutic or prophylactic agent for fatty liver disease.

The therapeutic or prophylactic agent for fatty liver disease according to the present invention can be administered as a therapeutic or prophylactic agent not only to patients diagnosed as having fatty liver disease, but also to patients possibly having fatty liver disease or to patients at risk of developing fatty liver disease.

A therapeutic or a prophylactic agent for fatty liver disease according to the present invention suppresses inflammation of liver so that it can be preferably used particularly to treat or prevent non-alcoholic steatohepatitis (NASH).

In the therapeutic or prophylactic agents for fatty liver diseases according to the present invention, the compound represented by the Formula (I) and contained as an active ingredient is highly variable in terms of chemical structure, due to, for example, the rings A, $R_1$-$R_5$, X, and Y. Thus, the chemical structures of the therapeutic or prophylactic agents for fatty liver diseases according to the present invention can be modified to obtain, for example, suitable absorption, distribution, degradation, and excretion features.

The therapeutic or prophylactic agents for fatty liver diseases according to the present invention can be administered as therapeutic or prophylactic agents for cancer not only to patients diagnosed with fatty liver diseases but also to patients suspected of having or at risk of fatty liver diseases.

The therapeutic or prophylactic agents for fatty liver diseases according to the present invention may be formulated in various dosage forms, which are combined with pharmaceutically acceptable carriers, as described in the above section 3. The therapeutic or prophylactic agent can be made in the form of, for example, tablets, granules, capsules, powders, and liquids for oral administration, and can also be administered in the form of injection solution directly to the liver by, for example, tube feeding, from the viewpoint of allowing the therapeutic or prophylactic agent to act directly on the liver and thereby to reduce side effects.

The therapeutic or prophylactic agents for fatty liver diseases according to the present invention should preferably be administered to a patient at a daily dose of 0.01 to 100 mg, more preferably 0.1 to 10 mg, of active ingredient per kg of body weight.

The therapeutic or prophylactic agents for fatty liver diseases according to the present invention may contain a compound according to the present invention or a pharmaceutically acceptable salt thereof and further contain active ingredients in at least one or more drugs selected from the group of therapeutic or prophylactic agents for fatty liver diseases.

Examples of such an active ingredient which can be used include, but are not limited to: vitamin E which is an active ingredient in a therapeutic agent for non-alcoholic steatohepatitis; obeticholic acid (6-ethyl-chenodeoxycholic acid) which is under a clinical study at the time of filing the present application; elafibranor; selonsertib; saroglitazar; lanifibranor; semaglutide; pemafibrate; and the like.

The therapeutic or prophylactic agents for fatty liver diseases according to the present invention may be used in combination with one or more drugs selected from the drugs classified as therapeutic or prophylactic agents for the fatty liver diseases.

6. Therapeutic or Prophylactic Agents for Obesity

Therapeutic or prophylactic agents for obesity according to the present invention contain the compound represented by the Formula (I) or the pharmaceutically acceptable salt thereof as an active ingredient.

The structure of the compound represented by the Formula (I) is as described in the above section 1-1, and the pharmaceutically acceptable salt thereof is as described in the above section 3.

The therapeutic or prophylactic agents for obesity according to the present invention have an effect to suppress accumulation of body fat and thereby to treat or prevent obesity. Such beneficial effects are considered to be based on inhibition of Pin1 function as the mechanism of action of the compound represented by the Formula (I) or the pharmaceutically acceptable salt thereof.

In the present invention, "obesity" refers to a condition with excessive fat accumulation in the internal organs or under the skin, which can be diagnosed with, for example, abdominal fat area measured by abdominal CT scanning. The therapeutic or prophylactic agents for obesity according to the present invention can be administered as therapeutic or prophylactic agents for obesity not only to patient diagnosed with obesity but also to patients suspected of having or at risk of obesity.

In the therapeutic or prophylactic agents for obesity according to the present invention, the compound represented by the Formula (I) and contained as an active ingredient is highly variable in terms of chemical structure, due to, for example, the rings A, $R_1$-$R_5$, X, and Y. Thus, the chemical structures of the therapeutic or prophylactic agents for obesity according to the present invention can be modified to obtain, for example, suitable absorption, distribution, degradation, and excretion features.

The therapeutic or prophylactic agents for obesity according to the present invention may be formulated in various dosage forms, which are combined with pharmaceutically acceptable carriers, as described in the above section 3. The therapeutic or prophylactic agent can be made in the form of, for example, tablets, granules, capsules, powders, and liquids for oral administration.

The therapeutic or prophylactic agents for obesity according to the present invention should preferably be administered to a patient at a daily dose of 0.01 to 100 mg, more preferably 0.1 to 10 mg, of active ingredient per kg of body weight.

The therapeutic or prophylactic agents for obesity according to the present invention may contain a compound according to the present invention or a pharmaceutically acceptable salt thereof and further contain active ingredients in at least one or more drugs selected from the group of therapeutic or prophylactic agents for obesity.

Examples of the active ingredients that can be used include, but are not limited to, mazindol, cetilistat, sibutramine, orlistat, lorcaserin, and Qsymia.

Additionally, the therapeutic or prophylactic agents for obesity according to the present invention can be used in combination with one or more drugs selected from the drugs classified as therapeutic or prophylactic agents for obesity.

The therapeutic or prophylactic agent for obesity according to the present invention may also be combined with diet therapy, exercise therapy, behavior therapy and the like, all of which are used for treatment or prevention of obesity.

7. Therapeutic or Prophylactic Agents for Viral Diseases

The therapeutic or prophylactic agents for viral diseases (including COVID-19) according to the present invention contain the compound represented by the Formula (I) or the pharmaceutically acceptable salt thereof as an active ingredient.

The structure of the compound represented by the Formula (I) is as described in the above section 1-1, and the pharmaceutically acceptable salts thereof are as described in the above section 3.

"Viral diseases", which are indications of the therapeutic or prophylactic agent according to the present invention, are diseases caused by viruses, including, e.g., a coronavirus infection caused by coronaviruses.

Coronaviruses that infect human include alpha-coronaviruses (HCoV-229E and HCoV-NL63) and beta-coronaviruses (MERS-CoV, SARS-CoV, SARS-CoV-2, HCoV-OC43 and HCoV—HKU1). HCoV-229E, HCoV-OC43, HCoV-NL63 and HCoV—HKU1 are causes of common cold, mostly with mild symptoms, however sometimes accompanied by high fever. It is thought that SARS-CoV is derived from a bat-borne coronavirus, which infects human and causes severe pneumonia, and that when MERS-CoV, which causes cold symptoms in dromedary camels, jumps the species barrier to infect human, it causes severe pneumonia. The infectious disease caused by SARS-CoV-2 (COVID-19) mainly spreads with human-to-human transmission via through airborne droplets expelled by coughs and sneezes of an infected person. COVID-19 causes fever, respiratory symptoms, headache, fatigue and the like and can also cause olfactory or taste disorders. Particularly the therapeutic or prophylactic agent according to the present invention is preferably applied to a coronavirus infection caused by beta-coronavirus, and more preferably applied to a coronavirus infection caused by SARS-CoV-2 (COVID-19).

The compounds serving as an active ingredient in the present invention has an effect of inhibiting the function of Pin as the mechanism of action and can suppress viral proliferation so that they can be used as a therapeutic or prophylactic agent for viral diseases. The therapeutic or prophylactic agent for viral diseases according to the present invention can be administered as a therapeutic agent or a prophylactic agent not only to patients diagnosed as having a viral disease, but also to patients possibly having a viral disease and patients at risk of developing a viral disease. In addition, the therapeutic or prophylactic agent for viral diseases according to the present invention suppresses proliferation of SARS-CoV-2 virus so that it can be preferably used particularly to treat or prevent coronavirus infection caused by SARS-CoV-2. Namely, the present invention can provide a method of treating COVID-19, the method comprising administrating a therapeutically effective amount of a Pin1 inhibitor having the function as a therapeutic or prophylactic agent for a viral disease or a pharmaceutically acceptable salt thereof to the subjects in need thereof, e.g., patients suffering from COVID-19.

The therapeutic or prophylactic agents for viral diseases according to the present invention can be prepared by combining a compound as an active ingredient or a pharmaceutically acceptable salt thereof and a pharmaceutically acceptable carrier to form a pharmaceutical composition, and may be made in the form of, for example, but not limited to, tablets, granules, capsules, powders, liquids, injection solutions, suppositories, patches, eye drops, and inhalants. Preferred dosage forms include: for example, tablets, granules, capsules, powders, and liquids for oral administration; as well as inhalants for pulmonary administration.

As a pharmaceutically acceptable carrier which can be used in the therapeutic or prophylactic agents for viral diseases according to the present invention, various inorganic or organic carrier materials can be used. When the pharmaceutical composition is prepared in solid formulation, such as a tablet or a granule, an excipient, a lubricant, a binder, a disintegrator, and the like can be used. When the pharmaceutical composition is prepared in liquid formulation, such as a liquid or an injection solution, a solvent, a solubilizing agent, a suspending agent, a buffering agent, and the like can be used.

Moreover, additives such as antioxidant, antiseptic agent, and coloring agent can also be used as necessary.

Non-limiting examples of an excipient that can be used include lactose, D-mannitol, and starch; non-limiting examples of a lubricant that can be used include magnesium stearate and talc; non-limiting examples of a binder that can be used include crystalline cellulose and gelatin; non-limiting examples of a disintegrator that can be used include carboxymethyl cellulose.

Moreover, examples of a solvent that can be used include distilled water, alcohols, and propylene glycol; examples of a solubilizing agent that can be used include polyethylene glycol and ethanol; examples of a suspending agent that can be used include stearyl triethanolamine and sodium lauryl sulfate; examples of a buffering agent that can be used include phosphate and acetate salts.

The therapeutic or prophylactic agent for viral diseases according to the invention may be administered to a patient, e.g., preferably at a daily dose of 0.01 to 100 mg, more preferably 0.1 to 10 mg of active ingredient per kg of patient's body weight.

The therapeutic or prophylactic agent for coronavirus diseases according to the present invention may contain, in addition to the compound according to the present invention or pharmaceutically acceptable salts thereof, active ingredients in at least one or more drugs selected from drugs classified as therapeutic or prophylactic agents for coronavirus diseases. Examples of such an active ingredient which can be used include, but not limited to, remdesivir, favipiravir, chloroquine, hydroxychloroquine, nafamostat, interferon and the like. The therapeutic or prophylactic agent for viral diseases according to the invention can be used in combination with other therapeutic or prophylactic agents for viral diseases.

Now, the present invention will be described in detail by reference to examples, but the present invention is not limited thereto.

EXAMPLES

Example 1

Synthesis of Compounds (Example 1-1) Synthesis of Intermediates

Various intermediates (H-675, H-676, H-677, H-608, H-720, H-721, H-722, H-724, H-725, H-814, and H-816) used for the synthesis of compounds according to the present invention were synthesized.

Synthesis of H-675

To a mixed solution of 3,5-diaminobenzoate methyl ester (3.0 g, 18.0 mmol) in dioxane (60 mL) and water (30 mL), triethylamine (5.48 g, 7.52 mL, 54 mmol) was added and cooled to 0° C., to which (Boc)$_2$O (4.32 g, 19.7 mmol) was added at the same temperature, and the resulting mixture was stirred at the same temperature for 1 hour and then at room temperature for 20 hours. Dioxane was distilled off under reduced pressure, and then the residue was extracted with ethyl acetate. The organic layer was washed with water, 10% citric acid aqueous solution, saturated sodium bicarbonate aqueous solution, and saturated saline in this order, dried over anhydrous magnesium sulfate, and then filtered and concentrated under reduced pressure. The residue was purified by silica gel column chromatography (chloroform: ethyl acetate, 8:1) to give H-675 as a white powder (3.78 g, 14.2 mmol, 79%).

The measured NMR spectrum and HR-ESI-MS result of H-675 are described below.

$^1$H NMR (400 MHz, DMSOd$_6$) δ 1.45 (9H, s), 3.76 (3H, s), 5.33 (2H, s), 6.80 (1H, t, J=1.8 Hz), 6.95 (1H, bs), 7.25 (1H, bs), 9.26 (1H, s); HRESIMS calcd for $C_{13}H_{18}N_2O_4Na$ [M+Na]$^+$289.1164, found 289.1160.

The identified chemical structure of H-675 is indicated below.

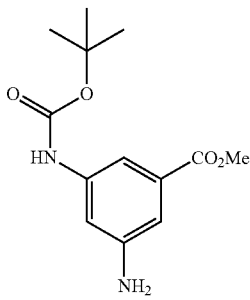

H-675

Synthesis of H-676

To a solution of H-675 (5.0 g, 18.7 mmol) in THF (60 mL), pyridine (2.2 g, 2.3 mL, 28.2 mmol) and 9H-carbazole-9-carbonyl chloride (5.15 g, 22.4 mmol) were added at room temperature, and the resulting mixture was stirred at the same temperature for 3 hours. After saturated ammonium chloride aqueous solution was added to the mixture, THF was distilled off under reduced pressure. The residue was extracted with ethyl acetate. The organic layer was washed with water and saturated saline in this order, dried over anhydrous magnesium sulfate, and then filtered and concentrated under reduced pressure to give H-676 as a white powder (8.12 g, 17.6 mmol, 95%).

The measured NMR spectrum and HR-ESI-MS result of H-676 are described below.

$^1$H NMR (400 MHz, DMSOd$_6$) δ 1.48 (9H, s), 3.86 (3H, s), 7.38 (2H, t, J=7.8 Hz), 7.53 (2H, t, J=8.2 Hz), 7.88 (1H, t, J=1.8 Hz), 7.92 (2H, d, J=8.2 Hz), 7.99 (1H, t, J=1.9 Hz), 8.17 (1H, t, J=1.9 Hz), 8.22 (2H, d, J=7.8 Hz), 9.72 (1H, s), 10.76 (1H, s); HRESIMS calcd for C$_{26}$H$_{25}$N$_3$O$_5$Na [M+Na]$^+$ 482.1692, found 482.1684.

The identified chemical structure of H-676 is indicated below.

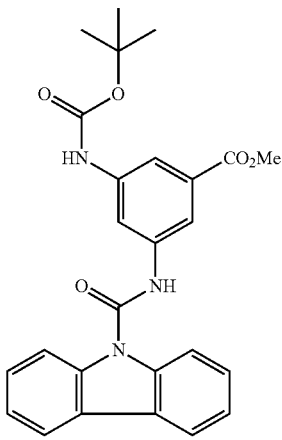

H-676

Synthesis of H-677

To a solution of H-676 (8.0 g, 17.4 mmol) in dichloromethane (100 mL), trifluoroacetic acid (10 mL) was added at room temperature, and the resulting mixture was stirred at the same temperature for 2 hours. Volatile solvent was distilled off under reduced pressure. The residue was neutralized by adding 1M sodium hydroxide aqueous solution thereto, and then the mixture was extracted with ethyl acetate. The organic layer was washed with saturated sodium bicarbonate aqueous solution, saturated saline in this order, dried over anhydrous magnesium sulfate, and then filtered and concentrated under reduced pressure, to give H-677 as a white powder (5.93 g, 16.5 mmol, 95%).

The measured NMR spectrum and HR-ESI-MS result of H-677 are described below.

$^1$H NMR (400 MHz, DMSOd$_6$) δ 3.81 (3H, s), 5.56 (2H, bs), 7.00 (1H, t, J=1.8 Hz), 7.22 (1H, t, J=1.8 Hz), 7.37 (2H, t, J=7.8 Hz), 7.48 (1H, t, J=1.8 Hz), 7.52 (2H, t, J=8.2 Hz), 7.89 (2H, d, J=8.2 Hz), 8.22 (2H, d, J=7.8 Hz), 10.50 (1H, s); HRESIMS calcd for C$_{21}$H$_{17}$N$_3$O$_3$Na [M+Na]$^+$ 382.1168, found 382.1161.

The identified chemical structure of H-677 is indicated below.

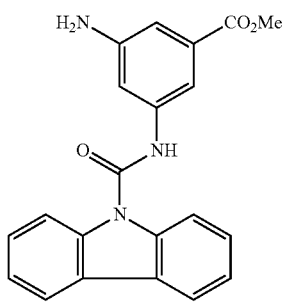

H-677

Synthesis of H-608

To a solution of H-675 (100 mg, 0.375 mmol) in dichloromethane (15 mL), pyridine (45 mg, 0.45 mL, 0.563 mmol) and 2-naphthoylchloride (85 mg, 0.45 mmol) were added at room temperature, and the resulting mixture was stirred at the same temperature for 3 hours. Saturated ammonium chloride aqueous solution was added to the mixture, and then the mixture was extracted with ethyl acetate. The organic layer was washed with water and saturated saline in this order, dried over anhydrous magnesium sulfate, and then filtered and concentrated under reduced pressure. Dichloromethane (10 mL) and trifluoroacetic acid (5 mL) were added to the residue at room temperature, and the resulting mixture was stirred at the same temperature for 3 hours. After dichloromethane was distilled off under reduced pressure, the pH of the residue was adjusted to 8 to 9 by adding 1M sodium hydroxide aqueous solution thereto. Then, the residue was extracted with ethyl acetate. The organic layer was washed with saturated sodium bicarbonate aqueous solution, water, and saturated saline in this order, dried over anhydrous magnesium sulfate, and then filtered and concentrated under reduced pressure, to give H-608 as a pale orange powder (114 mg, 0.356 mmol, 95%).

The measured NMR spectrum and HR-ESI-MS result of H-608 are described below.

$^1$H NMR (400 MHz, DMSOd$_6$) δ 3.81 (3H, s), 5.46 (2H, bs), 6.97 (1H, t, J=1.8 Hz), 7.44 (1H, t, J=1.8 Hz), 7.57 (1H, t, J=1.8 Hz), 7.59-7.66 (2H, m), 7.98-8.08 (4H, m), 8.57 (1H, bs), 10.32 (1H, s); HRESIMS calcd for C$_{19}$H$_{16}$N$_2$O$_3$Na [M+Na]$^+$ 343.1059, found 343.1052.

The identified chemical structure of H-608 is indicated below.

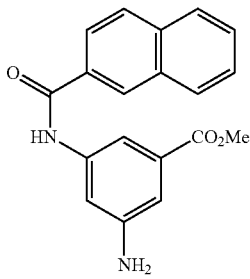

H-608

Synthesis of H-720

To a solution of H-675 (1.45 g, 5.44 mmol) in THF (50 mL), carbazole-acetic acid (1.47 g, 6.5 mmol), EDCI (2.08 g, 10.1 mmol), and DMAP (130 mg, 1.1 mmol) were added at room temperature, and the resulting mixture was stirred at the same temperature overnight. THF was distilled off under reduced pressure, and then water was added to the residue. The resulting mixture was extracted with ethyl acetate. The organic layer was washed with saturated saline, dried over anhydrous magnesium sulfate, and then filtered and concentrated under reduced pressure, to give H-720 as a white powder (2.27 g, 4.79 mmol, 88%).

The measured NMR spectrum and HR-ESI-MS result of H-720 are described below.

$^1$H NMR (400 MHz, DMSOd$_6$) δ 1.46 (9H, s), 3.79 (3H, s), 5.26 (2H, s), 7.21 (2H, t, J=7.8 Hz), 7.44 (2H, t, J=7.3 Hz), 7.57 (2H, d, J=8.2 Hz), 7.77 (1H, t, J=1.8 Hz), 7.95 (1H, t, J=1.8 Hz), 8.04 (1H, t, J=1.8 Hz), 8.16 (2H, d, J=7.8 Hz), 9.64 (1H, s), 10.70 (1H, s); HRESIMS calcd for C$_{27}$H$_{27}$N$_3$O$_5$Na [M+Na]$^+$ 496.1848, found 496.1847.

The identified chemical structure of H-720 is indicated below.

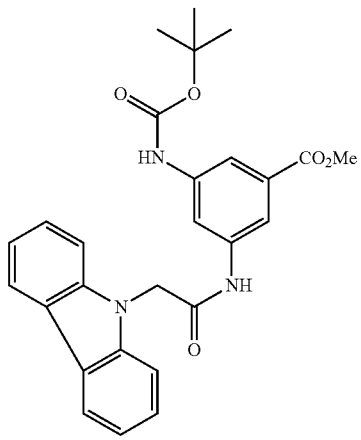

H-720

Synthesis of H-721

To a solution of H-720 (35 mg, 0.074 mmol) in THF (3 mL) and methanol (1 mL), lithium hydroxide aqueous solution (1M, 2 mL, 2 mmol) was added at room temperature, and the resulting mixture was stirred at the same temperature overnight. The mixture was neutralized by adding 1 M hydrochloric acid thereto and then extracted with ethyl acetate. The organic layer was washed with saturated saline, dried over anhydrous magnesium sulfate, and then filtered and concentrated under reduced pressure, to give H-721 as a pale red powder (26.7 mg, 0.058 mmol, 78%).

The measured NMR spectrum and HR-ESI-MS result of H-721 are described below.

$^1$H NMR (400 MHz, DMSOd$_6$) δ 1.46 (9H, s), 5.26 (2H, s), 7.21 (2H, t, J=7.8 Hz), 7.44 (2H, t, J=7.3 Hz), 7.57 (2H, d, J=8.2 Hz), 7.72 (1H, bs), 7.89 (1H, bs), 8.05 (1H, bs), 8.16 (2H, d, J=7.8 Hz), 9.59 (1H, s), 10.66 (1H, s); HRESIMS calcd for C$_{26}$H$_{25}$N$_3$O$_5$Na [M+Na]$^+$ 482.1692, found 482.1686.

The identified chemical structure of H-721 is indicated below.

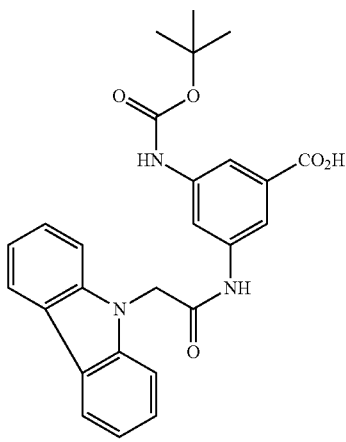

H-721

Synthesis of H-722

To a solution of H-721 (160 mg, 0.279 mmol) in dichloromethane (8 mL), trifluoroacetic acid (3 mL) was added at room temperature, and the resulting mixture was stirred at the same temperature for 2 hours. After the reaction mixture was cooled to 0° C., the pH of the mixture was adjusted to 8 to 9 by using 1M sodium hydroxide aqueous solution. Then the resulting mixture was extracted with ethyl acetate. The organic layer was washed with water and saturated saline, dried over anhydrous magnesium sulfate, and then filtered and concentrated under reduced pressure, to give H-720 as a white powder (98.6 mg, 0.264 mmol, 95%).

The measured NMR spectrum and HR-ESI-MS result of H-722 are described below.

$^1$H NMR (400 MHz, DMSOd$_6$) δ 3.75 (3H, s), 5.22 (2H, bs), 5.44 (2H, bs), 6.90 (1H, t, J=1.8 Hz), 7.09 (1H, t, J=1.8 Hz), 7.21 (2H, t, J=7.7 Hz), 7.38 (1H, bs), 7.43 (2H, t, J=7.7 Hz), 7.56 (2H, d, J=8.2 Hz), 8.16 (2H, d, J=7.8 Hz), 10.42 (1H, bs); HRESIMS calcd for C$_{22}$H$_{19}$N$_3$O$_3$Na [M+Na]$^+$ 396.1324, found 396.1315.

The identified chemical structure of H-722 is indicated below.

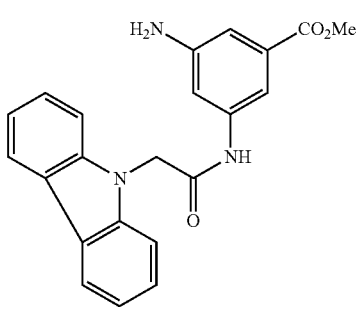

H-722

Synthesis of H-724

To a solution of H-675 (1.0 g, 3.76 mmol) in THF (20 mL), pyridine (450 mg, 0.45 mL, 3.44 mmol) and diphenylcarbamoylchloride (1.3 g, 5.63 mmol) were added at room temperature, and the resulting mixture was stirred at the same temperature for 17 hours. Saturated ammonium chloride aqueous solution was added to the mixture, and the resulting mixture was extracted with ethyl acetate. The organic layer was washed with water and saturated saline in this order, dried over anhydrous magnesium sulfate, and then filtered and concentrated under reduced pressure, to give H-724 as a light red powder (1.59 g, 3.44 mmol, 92%).

The measured NMR spectrum and HR-ESI-MS result of H-724 are described below.

$^1$H NMR (400 MHz, DMSOd$_6$) δ 1.45 (9H, s), 3.79 (3H, s), 7.17-7.25 (6H, m), 7.34-7.40 (4H, m), 7.64 (1H, t, J=1.8 Hz), 7.73 (1H, t, J=1.8 Hz), 7.94 (1H, t, J=1.8 Hz), 8.71 (1H, s), 9.51 (1H, s); HRESIMS calcd for $C_{26}H_{27}N_3O_5Na$ [M+Na]$^+$ 484.1848, found 484.1848.

The identified chemical structure of H-724 is indicated below.

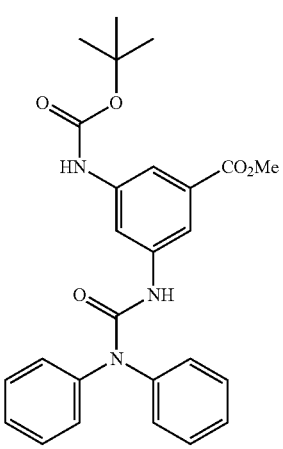

H-724

Synthesis of H-725

To a solution of H-724 (1.4 g, 3.03 mmol) in dioxane (30 mL), concentrated hydrochloric acid (10 mL) was added at room temperature, and the resulting mixture was stirred at the same temperature for 2 hours. After the solvent was distilled off under reduced pressure, water was added to the mixture. Then the resulting mixture was extracted with ethyl acetate. The organic layer was washed with saturated saline, dried over anhydrous magnesium sulfate, and then filtered and concentrated under reduced pressure, to give H-725 as a white powder (970 mg, 2.44 mmol, 80%). The measured NMR spectrum and HR-ESI-MS result of H-725 are described below.

$^1$H NMR (400 MHz, DMSOd$_6$) δ 3.80 (3H, s), 7.18-7.26 (7H, m), 7.38 (4H, t, J=8.2 Hz), 7.52 (1H, bs), 7.71 (1H, bs), 8.73; HRESIMS calcd for $C_{21}H_{19}N_3O_3Cl$ [M+Cl]$^-$ 396.1115, found 396.1106.

The identified chemical structure of H-725 is indicated below.

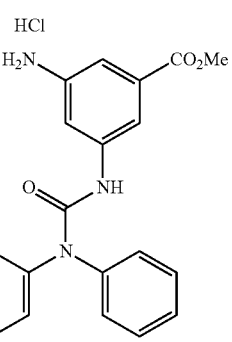

H-725

Synthesis of H-814

To a solution of H-675 (615 mg, 2.31 mmol) in dichloromethane (40 mL), N,N-diphenylglycine (525 mg, 2.31 mmol), EDCI (1.32 g, 6.93 mmol), and DMAP (56.4 mg, 0.46 mmol) were added at room temperature, and the resulting mixture was stirred at the same temperature overnight. Water was added to the mixture, and the resulting mixture was extracted with dichloromethane. The organic layer was washed with water, saturated sodium bicarbonate aqueous solution, and saturated saline, dried over anhydrous magnesium sulfate, and then filtered and concentrated under reduced pressure to give H-814 as a pale orange powder (1.01 g, 2.12 mmol, 92%).

The measured NMR spectrum and HR-ESI-MS result of H-814 are described below.

$^1$H NMR (400 MHz, DMSOd$_6$) δ 1.46 (9H, s), 3.81 (3H, s), 4.54 (2H, s), 6.93 (2H, t, J=7.3 Hz), 7.02 (4H, d, J=7.8 Hz), 7.26 (4H, t, J=7.8 Hz), 7.74 (1H, bs), 7.96 (1H, bs), 8.01 (1H, bs), 9.62 (1H, bs), 10.34 (1H, bs); HRESIMS calcd for $C_{27}H_{29}N_3O_5Na$ [M+Na]$^+$ 498.2005, found 498.2004.

The identified chemical structure of H-814 is indicated below.

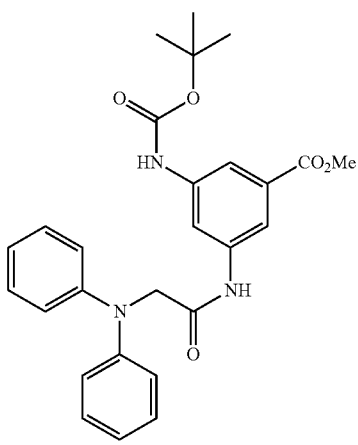

Synthesis of H-816

To a solution of H-814 (1.0 g, 2.10 mmol) in dichloromethane (20 mL), trifluoroacetic acid (5 mL) was added at room temperature, and the resulting mixture was stirred at the same temperature for 2 hours. After volatile materials were distilled off under reduced pressure, the pH of the mixture was adjusted to 8 to 9 by using 1M sodium hydroxide aqueous solution. Then the mixture was extracted with ethyl acetate. The organic layer was washed with water, saturated sodium bicarbonate aqueous solution, and saturated saline, dried over anhydrous magnesium sulfate, and then filtered and concentrated under reduced pressure, to give H-816 as a pale yellow powder (720 mg, 1.92 mmol, 90%).

The measured NMR spectrum and HR-ESI-MS result of H-816 are described below.

$^1$H NMR (400 MHz, DMSOd$_6$) δ 3.77 (3H, s), 4.50 (2H, s), 5.42 (2H, bs), 6.88 (1H, bs), 6.92 (2H, t, J=7.3 Hz), 7.02 (4H, d, J=7.8 Hz), 7.13 (1H, bs), 7.25 (4H, t, J=7.8 Hz), 7.36 (1H, bs), 10.04 (1H, bs); HRESIMS calcd for C$_{22}$H$_{21}$N$_3$O$_3$Na [M+Na]$^+$ 398.1481, found 398.1474.

The identified chemical structure of H-816 is indicated below.

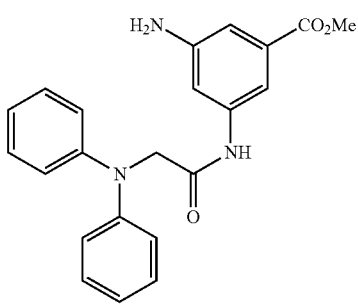

(Example 1-2) Synthesis of H-591

To a solution of H-677 synthesized in Example 1-1 (50 mg, 0.139 mmol) in dichloromethane (3 mL), 2-naphthoyl chloride (32 mg, 0.167 mmol) and pyridine (16 mg, 0.17 mL, 0.209 mmol) were added at room temperature, and the resulting mixture was stirred at the same temperature for 3 hours. Saturated ammonium chloride aqueous solution was added to the mixture, and the resulting mixture was extracted with ethyl acetate. The organic layer was washed with water and saturated saline, dried over anhydrous magnesium sulfate, and then filtered and concentrated under reduced pressure, to give H-591 as a white powder (70 mg, 0.136 mmol, 97%).

The measured NMR spectrum and HR-ESI-MS result of H-591 are described below.

$^1$H NMR (400 MHz, DMSOd$_6$) δ 3.91 (3H, s), 7.39 (2H, t, J=7.8 Hz), 7.54 (2H, t, J=7.3 Hz), 7.60-7.69 (2H, m), 7.93-8.12 (6H, m), 8.13 (1H, t, J=1.8 Hz), 8.24 (2H, d, J=7.8 Hz), 8.30 (1H, bs), 8.63 (1H, bs), 8.65 (1H, bs), 10.75 (1H, s), 10.87 (1H, s); HRESIMS calcd for C$_{32}$H$_{23}$N$_3$O$_4$Na [M+Na]$^+$ 536.1586, found 536.1588.

The identified chemical structure of H-591 is indicated below.

(Example 1-3) Synthesis of H-594

To a solution of H-591 synthesized in Example 1-2 (40 mg, 0.078 mmol) in methanol (1 mL) and THF (2 mL), sodium hydroxide aqueous solution (1M, 1 mL, 1 mmol) was added at room temperature, and the resulting mixture was stirred at the same temperature for 17 hours. The mixture was neutralized by adding 1 M hydrochloric acid thereto, and then extracted with ethyl acetate. The organic layer was washed with saturated saline, dried over anhydrous magnesium sulfate, and then filtered and concentrated under reduced pressure, to give H-594 as a pale yellow powder (25 mg, 0.05 mmol, 64%).

The measured NMR spectrum and HR-ESI-MS result of H-594 are described below.

$^1$H NMR (400 MHz, DMSOd$_6$) δ 7.39 (2H, t, J=7.8 Hz), 7.54 (2H, t, J=7.3 Hz), 7.60-7.68 (2H, m), 7.96 (2H, d, J=8.7 Hz), 7.99-8.12 (5H, m), 8.24 (2H, d, J=7.8 Hz), 8.26 (1H, bs), 8.60 (1H, bs), 8.64 (1H, bs), 10.71 (1H, s), 10.83 (1H, s); HRESIMS calcd for C$_{31}$H$_{21}$N$_3$O$_4$Na [M+Na]$^+$ 522.1430, found 522.1428.

The identified chemical structure of H-594 is indicated below.

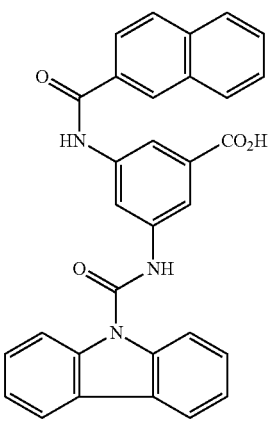 [SMILES: O=C(O)c1cc(NC(=O)c2ccc3ccccc3c2)cc(NC(=O)n2c3ccccc3c3ccccc32)c1]

H-594

(Example 1-4) Synthesis of H-679

To a solution of H-677 synthesized in Example 1-1 (150 mg, 0.42 mmol) in THF (5 mL), benzoic acid (62 mg, 0.51 mmol), EDCI (240 mg, 1.26 mmol), and DMAP (10 mg, 0.08 mmol) were added at room temperature, and the resulting mixture was stirred at the same temperature for 16 hours. Water was added to the mixture, and the resulting mixture was extracted with ethyl acetate. The organic layer was washed with saturated saline, dried over anhydrous magnesium sulfate, and then filtered and concentrated under reduced pressure, to give H-679 as a gray powder (175 mg, 0.378 mmol, 89%).

The measured NMR spectrum and HR-ESI-MS result of H-679 are described below.

$^1$H NMR (400 MHz, DMSOd$_6$) δ 3.90 (3H, s), 7.39 (2H, t, J=7.8 Hz), 7.50-7.64 (5H, m), 7.95 (2H, d, J=8.7 Hz), 8.01 (2H, d, J=8.2 Hz), 8.11 (1H, bs), 8.24 (2H, d, J=7.8 Hz), 8.26 (1H, bs), 8.58 (1H, bs), 10.59 (1H, s), 10.86 (1H, s); HRESIMS calcd for C$_{28}$H$_{21}$N$_3$O$_4$Na [M+Na]$^+$ 486.1430, found 486.1425.

The identified chemical structure of H-679 is indicated below.

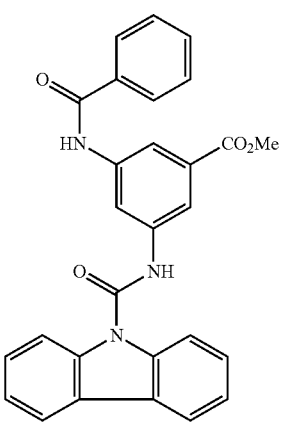 [SMILES: COC(=O)c1cc(NC(=O)c2ccccc2)cc(NC(=O)n2c3ccccc3c3ccccc32)c1]

H-679

(Example 1-5) Synthesis of H-681

To a solution of H-679 synthesized in Example 1-4 (100 mg, 0.163 mmol) in THF (3 mL) and methanol (1 mL), lithium hydroxide aqueous solution (1M, 2 mL, 2 mmol) was added at room temperature, and the resulting mixture was stirred at the same temperature overnight. The mixture was neutralized by adding 1 M hydrochloric acid thereto, and then extracted with ethyl acetate. The organic layer was washed with saturated saline, dried over anhydrous magnesium sulfate, and then filtered and concentrated under reduced pressure, to give H-681 as a pale gray powder (85 mg, 0.189 mmol, 88%).

The measured NMR spectrum and HR-ESI-MS result of H-681 are described below.

$^1$H NMR (400 MHz, DMSOd$_6$) δ 7.39 (2H, t, J=7.3 Hz), 7.50-7.64 (5H, m), 7.95 (2H, d, J=8.2 Hz), 8.01 (2H, d, J=8.2 Hz), 8.07 (1H, bs), 8.21 (1H, bs), 8.23 (2H, d, J=7.8 Hz), 8.55 (1H, t, J=1.8 Hz), 10.54 (1H, s), 10.81 (1H, s); HRESIMS calcd for C$_{27}$H$_{19}$N$_3$O$_4$Na [M+Na]$^+$ 472.1273, found 472.1267.

The identified chemical structure of H-681 is indicated below.

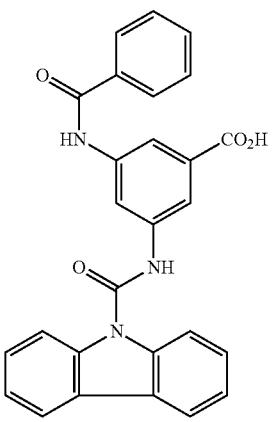 [SMILES: O=C(O)c1cc(NC(=O)c2ccccc2)cc(NC(=O)n2c3ccccc3c3ccccc32)c1]

H-681

(Example 1-6) Synthesis of H-680

A dehydration and condensation reaction was carried out in the same manner as in the synthesis of H-679 by using H-677 synthesized in Example 1-1 (150 mg, 0.42 mmol) and nicotinic acid (62 mg, 0.51 mmol) to give H-680 as a pale orange powder (120 mg, 0.258 mmol, 61%).

The measured NMR spectrum and HR-ESI-MS result of H-680 are described below.

$^1$H NMR (400 MHz, DMSOd$_6$) δ 3.90 (3H, s), 7.39 (2H, t, J=7.8 Hz), 7.54 (2H, t, J=8.2 Hz), 7.58 (1H, dd, J=7.8, 4.6 Hz), 7.95 (2H, d, J=8.2 Hz), 8.13 (1H, bs), 8.24 (2H, d, J=7.8 Hz), 8.26 (1H, bs), 8.34 (1H, dt, J=7.8, 1.8 Hz), 8.57 (1H, t, J=1.8 Hz), 8.77 (1H, dd, J=4.6, 1.8 Hz), 9.15 (1H, d, J=1.8 Hz), 10.77 (1H, s), 10.87 (1H, s); HRESIMS calcd for C$_{27}$H$_{20}$N$_4$O$_4$Na [M+Na]$^+$ 487.1382, found 487.1378.

The identified chemical structure of H-680 is indicated below.

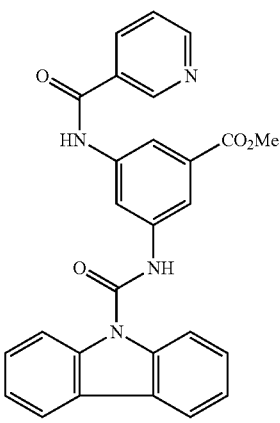 [SMILES: COC(=O)c1cc(NC(=O)c2cccnc2)cc(NC(=O)n2c3ccccc3c3ccccc32)c1]

H-680

(Example 1-7) Synthesis of H-682

H-680 synthesized in Example 1-6 (70 mg, 0.15 mmol) was hydrolyzed in the same manner as in the synthesis of H-681 to give H-682 as a brown powder (48.3 mg, 0.107 mmol, 71%).

The measured NMR spectrum and HR-ESI-MS result of H-682 are described below. $^1$H NMR (400 MHz, DMSOd$_6$) δ 7.39 (2H, t, J=7.8 Hz), 7.54 (2H, t, J=8.2 Hz), 7.58 (1H, dd, J=7.8, 4.6 Hz), 7.95 (2H, d, J=8.2 Hz), 8.09 (1H, bs), 8.22 (1H, bs), 8.24 (2H, d, J=7.8 Hz), 8.34 (1H, dt, J=7.8, 1.8 Hz), 8.55 (1H, bs), 8.77 (1H, dd, J=4.6, 1.8 Hz), 9.14 (1H, d, J=1.8 Hz), 10.73 (1H, s), 10.83 (1H, s); HRESIMS calcd for C$_{26}$H$_{18}$N$_4$O$_4$Na [M+Na]$^+$ 473.1226, found 473.1224.

The identified chemical structure of H-682 is indicated below.

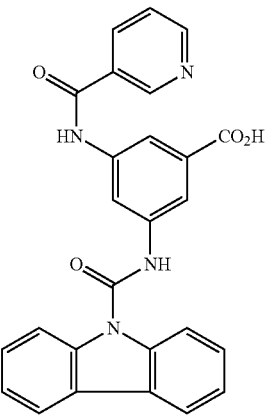 [SMILES: O=C(O)c1cc(NC(=O)c2cccnc2)cc(NC(=O)n2c3ccccc3c3ccccc32)c1]

H-682

(Example 1-8) Synthesis of H-684

A dehydration and condensation reaction was carried out in the same manner as in the synthesis of H-679 by using H-677 synthesized in Example 1-1 (150 mg, 0.42 mmol) and quinaldic acid (90 mg, 0.51 mmol), to give H-684 as a pale orange powder (168 mg, 0.33 mmol, 79%).

The measured NMR spectrum and HR-ESI-MS result of H-684 are described below.

$^1$H NMR (400 MHz, DMSOd$_6$) δ 3.92 (3H, s), 7.40 (2H, t, J=7.3 Hz), 7.55 (2H, t, J=8.2 Hz), 7.77 (1H, t, J=7.3 Hz), 7.93 (1H, t, J=7.3 Hz), 7.98 (2H, d, J=8.7 Hz), 8.13 (1H, d, J=7.8 Hz), 8.17 (1H, bs), 8.24 (2H, d, J=7.8 Hz), 8.25 (1H, d, J=8.7 Hz), 8.29 (1H, d, J=8.2 Hz), 8.42 (1H, bs), 8.65 (1H, d, J=8.6 Hz), 8.71 (1H, t, J=2.3 Hz), 10.88 (1H, s), 11.10 (1H, s); HRESIMS calcd for C$_{31}$H$_{22}$N$_4$O$_4$Na [M+Na]$^+$ 537.1539, found 537.1535.

The identified chemical structure of H-684 is indicated below.

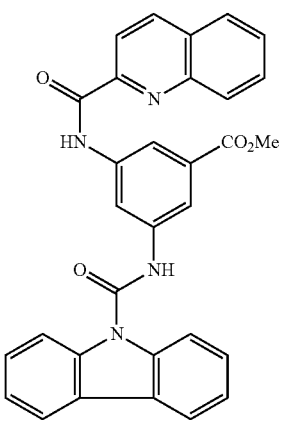 [SMILES: COC(=O)c1cc(NC(=O)c2ccc3ccccc3n2)cc(NC(=O)n2c3ccccc3c3ccccc32)c1]

H-684

(Example 1-9) Synthesis of H-688

H-684 synthesized in Example 1-8 (90 mg, 0.17 mmol) was hydrolyzed in the same manner as in the synthesis of H-681 to give H-688 as a pale orange powder (70 mg, 0.14 mmol, 82%).

The measured NMR spectrum and HR-ESI-MS result of H-688 are described below.

$^1$H NMR (400 MHz, DMSOd$_6$) δ 7.39 (2H, t, J=7.8 Hz), 7.55 (2H, t, J=8.2 Hz), 7.77 (1H, t, J=7.5 Hz), 7.93 (1H, t, J=7.3 Hz), 7.97 (2H, d, J=8.2 Hz), 8.12 (1H, bs), 8.13 (1H, d, J=7.8 Hz), 8.20-8.31 (4H, m), 8.37 (1H, bs), 8.65 (1H, d, J=8.2 Hz), 8.68 (1H, t, J=1.8 Hz), 10.85 (1H, s), 11.05 (1H, s); HRESIMS calcd for C$_{30}$H$_{20}$N$_4$O$_4$Na [M+Na]$^+$ 523.1382, found 523.1384.

The identified chemical structure of H-688 is indicated below.

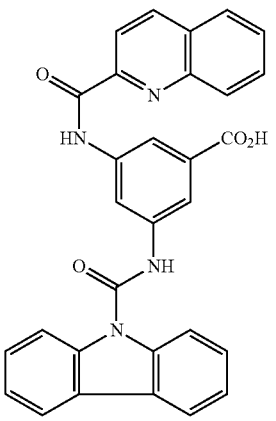 [SMILES: O=C(O)c1cc(NC(=O)c2ccc3ccccc3n2)cc(NC(=O)n2c3ccccc3c3ccccc32)c1]

H-688

(Example 1-10) Synthesis of H-685

A dehydration and condensation reaction was carried out in the same manner as in the synthesis of H-679 by using H-677 synthesized in Example 1-1 (150 mg, 0.42 mmol) and 2-quinoxaline carboxylic acid (90 mg, 0.51 mmol), to give H-685 as a gray powder (185 mg, 0.36 mmol, 85%).

The measured NMR spectrum and HR-ESI-MS result of H-685 are described below.

$^1$H NMR (400 MHz, DMSOd$_6$) δ 3.92 (3H, s), 7.40 (2H, t, J=7.4 Hz), 7.55 (2H, t, J=8.2 Hz), 7.98 (2H, d, J=8.2 Hz), 8.01-8.06 (2H, m), 8.17 (1H, bs), 8.22-8.26 (3H, m), 8.30-8.35 (1H, m), 8.42 (1H, bs), 8.72 (1H, t, J=1.8 Hz), 9.57 (1H, s), 10.90 (1H, s), 11.21 (1H, s); HRESIMS calcd for C$_{30}$H$_{21}$N$_5$O$_4$Na [M+Na]$^+$ 538.1491, found 538.1492.

The identified chemical structure of H-685 is indicated below.

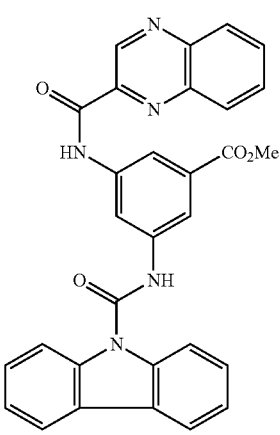 [SMILES: COC(=O)c1cc(NC(=O)c2cnc3ccccc3n2)cc(NC(=O)n2c3ccccc3c3ccccc32)c1]

H-685

(Example 1-11) Synthesis of H-686

A dehydration and condensation reaction was carried out in the same manner as in the synthesis of H-679 by using H-677 synthesized in Example 1-1 (150 mg, 0.42 mmol) and 1,4-benzodioxane-6-carboxylic acid (90 mg, 0.51 mmol), to give H-686 as a white powder (159 mg, 0.31 mmol, 73%).

The measured NMR spectrum and HR-ESI-MS result of H-686 are described below.

$^1$H NMR (400 MHz, DMSOd$_6$) δ 3.89 (3H, s), 4.28-4.34 (4H, m), 7.00 (1H, d, J=8.2 Hz), 7.39 (2H, t, J=7.4 Hz), 7.50-7.60 (4H, m), 7.94 (2H, d, J=8.2 Hz), 8.09 (1H, bs), 8.21-8.25 (3H, m), 8.56 (1H, t, J=1.8 Hz), 10.38 (1H, s), 10.83 (1H, s); HRESIMS calcd for C$_{30}$H$_{23}$N$_3$O$_6$Na [M+Na]$^+$ 544.1485, found 544.1487.

The identified chemical structure of H-686 is indicated below.

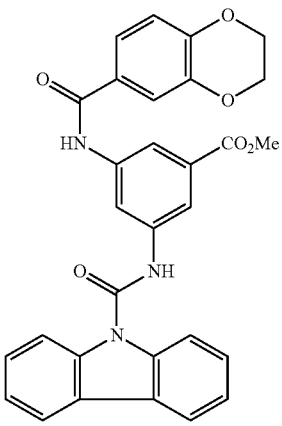 [SMILES: COC(=O)c1cc(NC(=O)c2ccc3c(c2)OCCO3)cc(NC(=O)n2c3ccccc3c3ccccc32)c1]

H-686

(Example 1-12) Synthesis of H-692

H-686 synthesized in Example 1-11 (80 mg, 0.17 mmol) was hydrolyzed in the same manner as in the synthesis of H-681 to give H-692 as a white powder (56.2 mg, 0.11 mmol, 72%).

The measured NMR spectrum and HR-ESI-MS result of H-692 are described below.

$^1$H NMR (400 MHz, DMSOd$_6$) δ 4.27-4.34 (4H, m), 7.00 (1H, d, J=8.2 Hz), 7.38 (2H, t, J=7.4 Hz), 7.50-7.60 (4H, m), 7.94 (2H, d, J=8.7 Hz), 8.05 (1H, bs), 8.19 (1H, bs), 8.23 (2H, d, J=7.7 Hz), 8.53 (1H, bs), 10.34 (1H, s), 10.79 (1H, s); HRESIMS calcd for C$_{29}$H$_{21}$N$_3$O$_6$Na [M+Na]$^+$ 530.1328, found 530.1324.

The identified chemical structure of H-692 is indicated below.

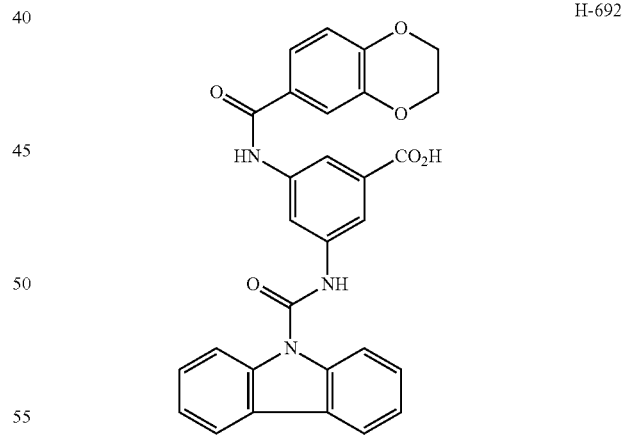

H-692

(Example 1-13) Synthesis of H-687

A dehydration and condensation reaction was carried out in the same manner as in the synthesis of H-679 by using H-677 synthesized in Example 1-1 (150 mg, 0.42 mmol) and 4-Acetamido benzoate (90 mg, 0.50 mmol), to give H-687 as a pale orange powder (152 mg, 0.29 mmol, 69%).

The measured NMR spectrum and HR-ESI-MS result of H-687 are described below.

¹H NMR (400 MHz, DMSOd₆) δ 2.08 (3H, s), 3.89 (3H, s), 7.39 (2H, t, J=7.8 Hz), 7.54 (2H, t, J=8.2 Hz), 7.72 (2H, d, J=8.7 Hz), 7.95 (2H, d, J=8.2 Hz), 7.97 (2H, d, J=8.7 Hz), 8.10 (1H, t, J=1.8 Hz), 8.23 (2H, d, J=7.8 Hz), 8.24 (1H, bs), 8.56 (1H, t, J=1.8 Hz), 10.24 (1H, s), 10.44 (1H, s), 10.84 (1H, s); HRESIMS calcd for C₃₀H₂₄N₄O₅Na [M+Na]⁺ 543.1644, found 543.1647.

The identified chemical structure of H-687 is indicated below.

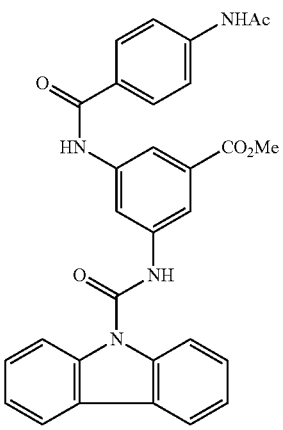 [SMILES: COC(=O)c1cc(NC(=O)c2ccc(NC(C)=O)cc2)cc(NC(=O)n2c3ccccc3c3ccccc32)c1]

H-687

(Example 1-14) Synthesis of H-694

H-687 synthesized in Example 1-13 (65 mg, 0.124 mmol) was hydrolyzed in the same manner as in the synthesis of H-681 to give H-694 as a pale orange powder (47.2 mg, 0.093 mmol, 75%).

The measured NMR spectrum and HR-ESI-MS result of H-694 are described below.

¹H NMR (400 MHz, DMSOd₆) δ 2.08 (3H, s), 7.38 (2H, t, J=7.8 Hz), 7.54 (2H, t, J=8.2 Hz), 7.72 (2H, d, J=8.7 Hz), 7.95 (2H, d, J=8.2 Hz), 7.97 (2H, d, J=8.7 Hz), 8.06 (1H, bs), 8.20 (1H, bs), 8.23 (2H, d, J=7.8 Hz), 8.53 (1H, t, J=1.8 Hz), 10.23 (1H, s), 10.40 (1H, s), 10.80 (1H, s); HRESIMS calcd for C₂₉H₂₂N₄O₅Na [M+Na]⁺ 529.1488, found 529.1487.

The identified chemical structure of H-694 is indicated below.

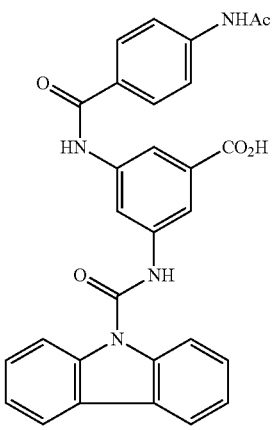 [SMILES: CC(=O)Nc1ccc(C(=O)Nc2cc(NC(=O)n3c4ccccc4c4ccccc43)cc(C(=O)O)c2)cc1]

H-694

(Example 1-15) Synthesis of H-690

A dehydration and condensation reaction was carried out in the same manner as in the synthesis of H-679 by using H-677 synthesized in Example 1-1 (150 mg, 0.42 mmol) and piperonylic acid (85 mg, 0.50 mmol), to give H-690 as a pale gray powder (148 mg, 0.29 mmol, 70%).

The measured NMR spectrum and HR-ESI-MS result of H-690 are described below.

¹H NMR (400 MHz, DMSOd₆) δ 3.89 (3H, s), 6.14 (2H, s), 7.07 (1H, d, J=8.2 Hz), 7.39 (2H, t, J=7.3 Hz), 7.54 (2H, t, J=8.2 Hz), 7.57 (1H, d, J=1.8 Hz), 7.63 (1H, dd, J=8.2, 1.4 Hz), 7.95 (2H, d, J=8.2 Hz), 8.10 (1H, bs), 8.21-8.25 (3H, m), 8.56 (1H, t, J=1.8 Hz), 10.38 (1H, s), 10.83 (1H, s); HRESIMS calcd for C₂₉H₂₁N₃O₆Na [M+Na]⁺ 530.1328, found 530.1325.

The identified chemical structure of H-690 is indicated below.

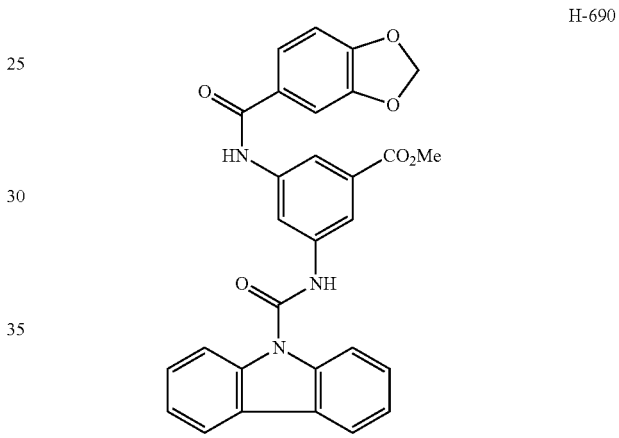

H-690

(Example 1-16) Synthesis of H-695

H-690 synthesized in Example 1-15 (70 mg, 0.137 mmol) was hydrolyzed in the same manner as in the synthesis of H-681 to give H-695 as a pale gray powder (51.8 mg, 0.105 mmol, 77%).

The measured NMR spectrum and HR-ESI-MS result of H-695 are described below.

¹H NMR (400 MHz, DMSOd₆) δ 6.13 (2H, s), 7.07 (1H, d, J=7.8 Hz), 7.38 (2H, t, J=7.8 Hz), 7.53 (2H, t, J=8.2 Hz), 7.57 (1H, d, J=1.8 Hz), 7.63 (1H, dd, J=8.2, 1.3 Hz), 7.94 (2H, d, J=8.2 Hz), 8.06 (1H, bs), 8.19 (1H, bs), 8.23 (2H, d, J=7.3 Hz), 8.53 (1H, t, J=1.8 Hz), 10.35 (1H, s), 10.80 (1H, s); HRESIMS calcd for C₂₈H₁₉N₃O₆Na [M+Na]⁺ 516.1172, found 516.1170.

The identified chemical structure of H-695 is indicated below.

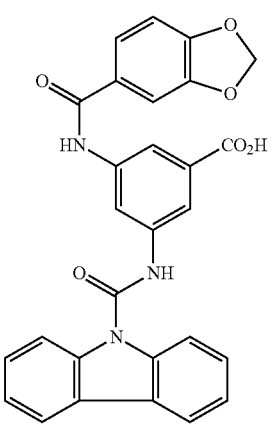 [SMILES: O=C(O)c1cc(NC(=O)c2ccc3c(c2)OCO3)cc(NC(=O)n2c3ccccc3c3ccccc32)c1]

H-695

(Example 1-17) Synthesis of H-696

A dehydration and condensation reaction was carried out in the same manner as in the synthesis of H-679 by using H-677 synthesized in Example 1-1 (150 mg, 0.42 mmol) and 4-acetoxybenzoate (90 mg, 0.50 mmol), to give H-696 as a white powder (85 mg, 0.162 mmol, 38%).

The measured NMR spectrum and HR-ESI-MS result of H-696 are described below.

$^1$H NMR (400 MHz, DMSOd$_6$) δ 2.31 (3H, s), 3.89 (3H, s), 7.31 (2H, d, J=8.2 Hz), 7.39 (2H, t, J=7.3 Hz), 7.54 (2H, t, J=8.2 Hz), 7.95 (2H, d, J=8.2 Hz), 8.05 (2H, d, J=8.2 Hz), 8.12 (1H, bs), 8.21-8.25 (3H, m), 8.57 (1H, bs), 10.60 (1H, s), 10.85 (1H, s); HRESIMS calcd for $C_{30}H_{23}N_3O_6Na$ [M+Na]$^+$ 544.1485, found 544.1486.

The identified chemical structure of H-696 is indicated below.

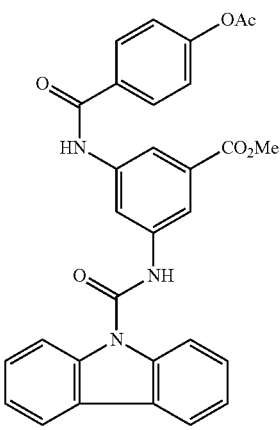 [SMILES: COC(=O)c1cc(NC(=O)c2ccc(OC(C)=O)cc2)cc(NC(=O)n2c3ccccc3c3ccccc32)c1]

H-696

(Example 1-18) Synthesis of H-697

H-696 synthesized in Example 1-17 (40 mg, 0.077 mmol) was hydrolyzed in the same manner as in the synthesis of H-681 to give H-697 as a white powder (28.9 mg, 0.062 mmol, 81%).

The measured NMR spectrum and HR-ESI-MS result of H-697 are described below.

$^1$H NMR (400 MHz, DMSOd$_6$) δ 6.87 (2H, d, J=8.2 Hz), 7.38 (2H, t, J=7.4 Hz), 7.54 (2H, t, J=8.2 Hz), 7.90 (2H, d, J=8.7 Hz), 7.94 (2H, d, J=8.2 Hz), 8.03 (1H, bs), 8.18 (1H, bs), 8.23 (2H, d, J=7.8 Hz), 8.51 (1H, bs), 10.15 (1H, bs), 10.27 (1H, s), 10.77 (1H, s); HRESIMS calcd for $C_{27}H_{19}N_3O_5Na$ [M+Na]$^+$ 488.1222, found 488.1219.

The identified chemical structure of H-697 is indicated below.

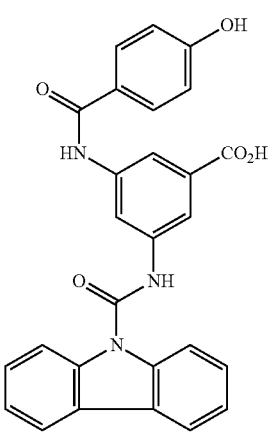 [SMILES: O=C(O)c1cc(NC(=O)c2ccc(O)cc2)cc(NC(=O)n2c3ccccc3c3ccccc32)c1]

H-697

(Example 1-19) Synthesis of H-699

A dehydration and condensation reaction was carried out in the same manner as in the synthesis of H-679 by using H-677 synthesized in Example 1-1 (150 mg, 0.42 mmol) and pyrazinecarboxylic acid (65 mg, 0.50 mmol), to give H-699 as a white powder (89 mg, 0.191 mmol, 45%).

The measured NMR spectrum and HR-ESI-MS result of H-699 are described below.

$^1$H NMR (400 MHz, DMSOd$_6$) δ 3.90 (3H, s), 7.39 (2H, t, J=7.4 Hz), 7.54 (2H, t, J=7.3 Hz), 7.96 (2H, d, J=8.7 Hz), 8.15 (1H, t, J=1.8 Hz), 8.23 (2H, d, J=7.8 Hz), 8.36 (1H, t, J=1.4 Hz), 8.63 (1H, t, J=1.8 Hz), 8.83 (1H, dd, J=2.3, 1.4 Hz), 8.94 (1H, d, J=2.3 Hz), 9.31 (1H, d, J=1.4 Hz), 10.87 (1H, s), 11.09 (1H, s); HRESIMS calcd for $C_{26}H_{19}N_5O_4Na$ [M+Na]$^+$ 488.1335, found 488.1334.

The identified chemical structure of H-699 is indicated below.

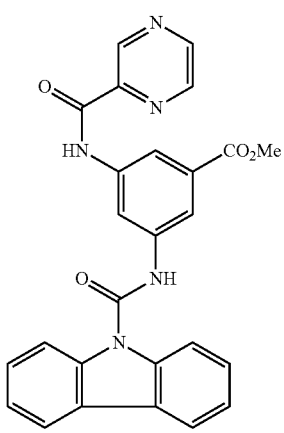 [SMILES: COC(=O)c1cc(NC(=O)c2cnccn2)cc(NC(=O)n2c3ccccc3c3ccccc32)c1]

H-699

(Example 1-20) Synthesis of H-700

H-699 synthesized in Example 1-19 (65 mg, 0.14 mmol) was hydrolyzed in the same manner as in the synthesis of H-681 to give H-700 as a white powder (42 mg, 0.093 mmol, 66%).

The measured NMR spectrum and HR-ESI-MS result of H-700 are described below.

$^1$H NMR (400 MHz, DMSOd$_6$) δ 7.39 (2H, t, J=7.4 Hz), 7.54 (2H, t, J=8.2 Hz), 7.96 (2H, d, J=8.2 Hz), 8.11 (1H, t, J=1.8 Hz), 8.23 (2H, d, J=7.4 Hz), 8.30 (1H, t, J=1.8 Hz), 8.60 (1H, t, J=1.8 Hz), 8.83 (1H, dd, J=2.3, 1.4 Hz), 8.94 (1H, d, J=2.3 Hz), 9.31 (1H, d, J=1.3 Hz), 10.83 (1H, s), 11.03 (1H, s); HRESIMS calcd for $C_{25}H_{17}N_5O_4Na$ [M+Na]$^+$ 474.1178, found 474.1173.

The identified chemical structure of H-700 is indicated below.

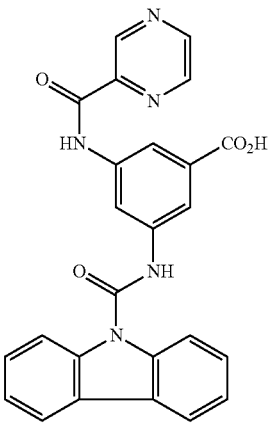 [SMILES: O=C(O)c1cc(NC(=O)c2cnccn2)cc(NC(=O)n2c3ccccc3c3ccccc32)c1]

H-700

(Example 1-21) Synthesis of H-728

To a solution of H-725 synthesized in Example 1-1 (150 mg, 0.377 mmol) in THF (3 mL), 2-naphthoic acid (78 mg, 0.452 mmol), EDCI (215 mg, 1.13 mmol), triethylamine (58 mg, 0.8 mL, 0.57 mmol), and DMAP (10 mg, 0.08 mmol) were added at room temperature, and the resulting mixture was stirred at the same temperature overnight. Water was added to the mixture, and the resulting mixture was extracted with ethyl acetate. The organic layer was washed with saturated saline, dried over anhydrous magnesium sulfate, and then filtered and concentrated under reduced pressure, to give H-728 as a pale orange powder (126 mg, 0.244 mmol, 65%).

The measured NMR spectrum and HR-ESI-MS result of H-728 are described below.

$^1$H NMR (400 MHz, DMSOd$_6$) δ 3.84 (3H, s), 7.21-7.27 (6H, m), 7.36-7.42 (4H, m), 7.59-7.67 (2H, m), 7.89 (1H, bs), 7.98-8.10 (5H, m), 8.33 (1H, bs), 8.60 (1H, bs), 8.78 (1H, bs), 10.55 (1H, bs); HRESIMS calcd for $C_{32}H_{25}N_3O_4Na$ [M+Na]$^+$ 538.1743, found 538.1743.

The identified chemical structure of H-728 is indicated below.

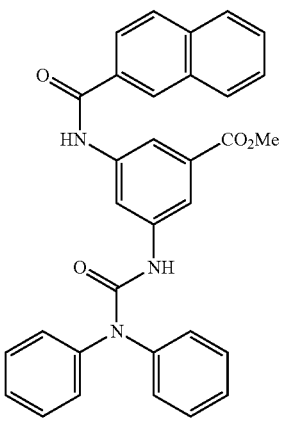 [SMILES: COC(=O)c1cc(NC(=O)c2ccc3ccccc3c2)cc(NC(=O)N(c2ccccc2)c2ccccc2)c1]

H-728

(Example 1-22) Synthesis of H-732

H-728 synthesized in Example 1-21 (80 mg, 0.155 mmol) was hydrolyzed in the same manner as in the synthesis of H-681 to give H-732 as a white powder (58 mg, 0.115 mmol, 75%).

The measured NMR spectrum and HR-ESI-MS result of H-732 are described below.

$^1$H NMR (400 MHz, DMSOd$_6$) δ 7.21-7.27 (6H, m), 7.36-7.42 (4H, m), 7.59-7.67 (2H, m), 7.84 (1H, t, J=1.8 Hz), 7.98-8.08 (5H, m), 8.30 (1H, t, J=1.8 Hz), 8.59 (1H, bs), 8.74 (1H, bs), 10.53 (1H, bs); HRESIMS calcd for $C_{31}H_{23}N_3O_4Na$ [M+Na]$^+$ 524.1586, found 524.1587.

The identified chemical structure of H-732 is indicated below.

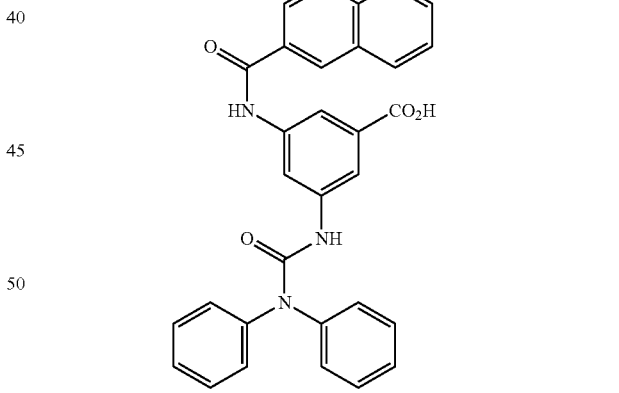

H-732

(Example 1-23) Synthesis of H-729

A dehydration and condensation reaction was carried out in the same manner as in the synthesis of H-728 by using H-725 synthesized in Example 1-1 (150 mg, 0.377 mmol) and quinaldic acid (78 mg, 0.452 mmol) to give H-729 as a pale orange powder (158 mg, 0.306 mmol, 81%).

The measured NMR spectrum and HR-ESI-MS result of H-729 are described below.

$^1$H NMR (400 MHz, DMSOd$_6$) δ 3.85 (3H, s), 7.15-7.27 (6H, m), 7.34-7.43 (4H, m), 7.75 (1H, ddd, J=8.2, 6.8, 1.4

Hz), 7.88-7.93 (2H, m), 8.11 (1H, d, J=7.3 Hz), 8.21 (1H, d, J=8.2 Hz), 8.23-8.27 (2H, m), 8.38 (1H, t, J=1.8 Hz), 8.63 (1H, d, J=8.3 Hz), 8.80 (1H, bs), 10.87 (1H, bs); HRESIMS calcd for $C_{31}H_{24}N_4O_4Na$ $[M+Na]^+$ 539.1695, found 539.1698.

The identified chemical structure of H-729 is indicated below.

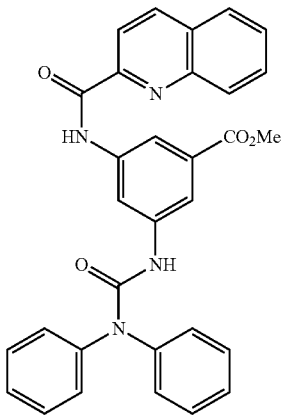 [SMILES: COC(=O)c1cc(NC(=O)c2ccc3ccccc3n2)cc(NC(=O)N(c2ccccc2)c2ccccc2)c1]

H-729

(Example 1-24) Synthesis of H-733

H-729 synthesized in Example 1-23 (80 mg, 0.154 mmol) was hydrolyzed in the same manner as in the synthesis of H-681 to give H-733 as a white powder (63 mg, 0.125 mmol, 81%).

The measured NMR spectrum and HR-ESI-MS result of H-733 are described below.

$^1$H NMR (400 MHz, DMSOd$_6$) δ 7.15-7.27 (6H, m), 7.34-7.43 (4H, m), 7.75 (1H, ddd, J=8.2, 6.8, 1.4 Hz), 7.87 (1H, t, J=1.8 Hz), 7.91 (1H, ddd, J=8.7, 6.8, 1.4 Hz), 8.11 (1H, d, J=7.8 Hz), 8.20 (1H, t, J=1.8 Hz), 8.21 (1H, d, J=8.2 Hz), 8.25 (1H, d, J=8.2 Hz), 8.34 (1H, t, J=1.8 Hz), 8.63 (1H, d, J=8.3 Hz), 8.75 (1H, bs), 10.82 (1H, bs); HRESIMS calcd for $C_{30}H_{22}N_4O_4Na$ $[M+Na]^+$ 525.1539, found 525.1539.

The identified chemical structure of H-733 is indicated below.

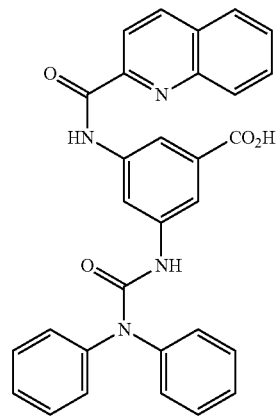 [SMILES: O=C(O)c1cc(NC(=O)c2ccc3ccccc3n2)cc(NC(=O)N(c2ccccc2)c2ccccc2)c1]

H-733

(Example 1-25) Synthesis of H-730

A dehydration and condensation reaction was carried out in the same manner as in the synthesis of H-728 by using H-725 synthesized in Example 1-1 (150 mg, 0.377 mmol) and 1,4-benzodioxane-6-carboxylic acid (81 mg, 0.425 mmol) to give H-730 as a white powder (179 mg, 0.341 mmol, 90%).

The measured NMR spectrum and HR-ESI-MS result of H-730 are described below.

$^1$H NMR (400 MHz, DMSOd$_6$) δ 3.82 (3H, s), 4.26-4.32 (4H, m), 6.97 (1H, d, J=8.7 Hz), 7.19-7.26 (6H, m), 7.36-7.41 (4H, m), 7.50 (1H, dd, J=8.7, 1.8 Hz), 7.54 (1H, d, J=2.3 Hz), 7.85 (1H, t, J=1.8 Hz), 8.02 (1H, t, J=1.8 Hz), 8.26 (1H, t, J=1.8 Hz), 8.75 (1H, bs), 10.19 (1H, bs); HRESIMS calcd for $C_{30}H_{25}N_3O_6Na$ $[M+Na]^+$ 546.1641, found 546.1644.

The identified chemical structure of H-730 is indicated below.

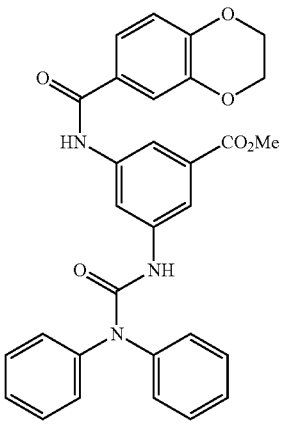 [SMILES: COC(=O)c1cc(NC(=O)c2ccc3c(c2)OCCO3)cc(NC(=O)N(c2ccccc2)c2ccccc2)c1]

H-730

(Example 1-26) Synthesis of H-734

H-730 synthesized in Example 1-25 (80 mg, 0.152 mmol) was hydrolyzed in the same manner as in the synthesis of H-681 to give H-734 as a white powder (65 mg, 0.128 mmol, 84%).

The measured NMR spectrum and HR-ESI-MS result of H-734 are described below.

$^1$H NMR (400 MHz, DMSOd$_6$) δ 4.26-4.32 (4H, m), 6.96 (1H, d, J=8.7 Hz), 7.19-7.26 (6H, m), 7.35-7.41 (4H, m), 7.50 (1H, dd, J=8.2, 2.3 Hz), 7.54 (1H, d, J=2.3 Hz), 7.80 (1H, t, J=1.8 Hz), 7.98 (1H, t, J=1.8 Hz), 8.22 (1H, t, J=1.8 Hz), 8.69 (1H, bs), 10.15 (1H, bs); HRESIMS calcd for $C_{29}H_{23}N_3O_6Na$ $[M+Na]^+$ 532.1485, found 532.1481.

The identified chemical structure of H-734 is indicated below.

H-734

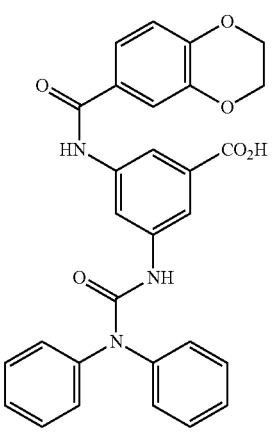 [SMILES: O=C(O)c1cc(NC(=O)c2ccc3c(c2)OCCO3)cc(NC(=O)N(c2ccccc2)c2ccccc2)c1]

(Example 1-27) Synthesis of H-731

A dehydration and condensation reaction was carried out in the same manner as in the synthesis of H-728 by using H-725 synthesized in Example 1-1 (150 mg, 0.377 mmol) and 2-quinoxaline carboxylic acid (78 mg, 0.425 mmol) to give H-731 as a white powder (135 mg, 0.261 mmol, 69%).

The measured NMR spectrum and HR-ESI-MS result of H-731 are described below.

$^1$H NMR (400 MHz, DMSOd$_6$) δ 3.85 (3H, s), 7.22-7.27 (6H, m), 7.37-7.42 (4H, m), 7.92 (1H, t, J=1.8 Hz), 7.99-8.04 (2H, m), 8.20-8.24 (1H, m), 8.23 (1H, t, J=1.8 Hz), 8.26-8.31 (1H, m), 8.40 (1H, t, J=1.8 Hz), 8.81 (1H, s), 9.52 (1H, s), 10.98 (1H, bs); HRESIMS calcd for C$_{30}$H$_{23}$N$_5$O$_4$Na [M+Na]$^+$ 540.1648, found 540.1652.

The identified chemical structure of H-731 is indicated below.

H-731

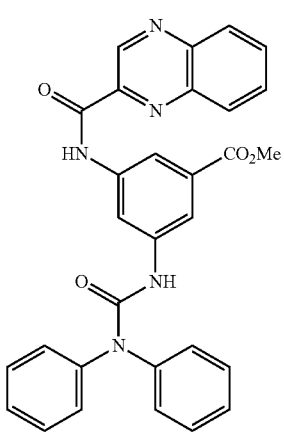 [SMILES: COC(=O)c1cc(NC(=O)c2cnc3ccccc3n2)cc(NC(=O)N(c2ccccc2)c2ccccc2)c1]

(Example 1-28) Synthesis of H-735

H-731 synthesized in Example 1-27 (80 mg, 0.154 mmol) was hydrolyzed in the same manner as in the synthesis of H-681 to give H-735 as a pale orange powder (53 mg, 0.105 mmol, 68%).

The measured NMR spectrum and HR-ESI-MS result of H-735 are described below.

$^1$H NMR (400 MHz, DMSOd$_6$) δ 7.22-7.27 (6H, m), 7.36-7.42 (4H, m), 7.88 (1H, t, J=1.8 Hz), 7.99-8.04 (2H, m), 8.18 (1H, t, J=1.8 Hz), 8.20-8.24 (1H, m), 8.26-8.31 (1H, m), 8.37 (1H, t, J=1.8 Hz), 8.77 (1H, s), 9.52 (1H, s), 10.93 (1H, bs); HRESIMS calcd for C$_{29}$H$_{21}$N$_5$O$_4$Na[M+Na]$^+$ 526.1491, found 526.1494.

The identified chemical structure of H-735 is indicated below.

H-735

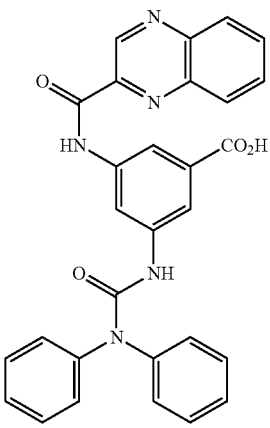 [SMILES: O=C(O)c1cc(NC(=O)c2cnc3ccccc3n2)cc(NC(=O)N(c2ccccc2)c2ccccc2)c1]

(Example 1-29) Synthesis of H-609

To a solution of H-608 synthesized in Example 1-1 (100 mg, 0.312 mmol) in THF (5 mL), 1-naphthylisocyanate (69 mg, 0.373 mmol) was added at room temperature, and the resulting mixture was stirred at the same temperature for 20 hours. Water was added to the mixture, and the resulting mixture was extracted with ethyl acetate. The organic layer was washed with saturated saline, dried over anhydrous magnesium sulfate, and then filtered and concentrated under reduced pressure, to give H-609 as a white powder (121 mg, 0.247 mmol, 79%).

The measured NMR spectrum and HR-ESI-MS result of H-609 are described below.

$^1$H NMR (400 MHz, DMSOd$_6$) δ 3.89 (3H, s), 7.46-7.68 (6H, m), 7.95 (1H, d, J=7.8 Hz), 8.00-8.15 (8H, m), 8.34 (1H, bs), 8.63 (1H, bs), 8.78 (1H, s), 9.43 (1H, s), 10.65 (1H, s); HRESIMS calcd for C$_{30}$H$_{23}$N$_3$O$_4$Na [M+Na]$^+$ 512.1586, found 512.1585.

The identified chemical structure of H-609 is indicated below.

H-609

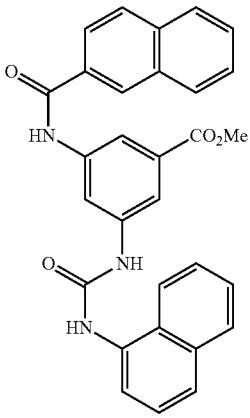 [SMILES: COC(=O)c1cc(NC(=O)Nc2cccc3ccccc23)cc(NC(=O)c2ccc3ccccc3c2)c1]

(Example 1-30) Synthesis of H-613

To a solution of H-609 synthesized in Example 1-29 (80 mg, 0.163 mmol) in methanol (4 mL) and THF (10 mL), sodium hydroxide aqueous solution (1M, 2 mL, 2 mmol) was added at room temperature, and the resulting mixture was stirred at the same temperature for 17 hours. The mixture was neutralized by adding 1 M hydrochloric acid thereto, and then extracted with ethyl acetate. The organic layer was washed with saturated saline, dried over anhydrous magnesium sulfate, and then filtered and concentrated under reduced pressure, to give H-613 as a pale gray powder (61.3 mg, 0.129 mmol, 79%).

The measured NMR spectrum and HR-ESI-MS result of H-613 are described below.

$^1$H NMR (400 MHz, DMSOd$_6$) δ 7.48 (1H, t, J=7.8 Hz), 7.52-7.68 (5H, m), 7.94 (1H, d, J=8.2 Hz), 7.99-8.15 (8H, m), 8.33 (1H, bs), 8.62 (1H, bs), 8.77 (1H, s), 9.38 (1H, s), 10.61 (1H, s); HRESIMS calcd for C$_{29}$H$_{21}$N$_3$O$_4$Na [M+Na]$^+$ 498.1430, found 498.1430.

The identified chemical structure of H-613 is indicated below.

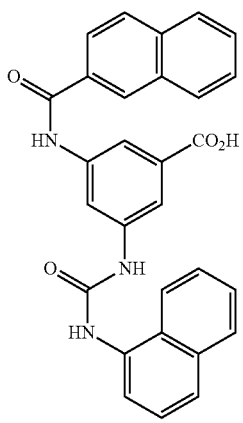 [SMILES: O=C(Nc1cc(NC(=O)c2ccc3ccccc3c2)cc(C(=O)O)c1)Nc1cccc2ccccc12]

H-613

(Example 1-31) Synthesis of H-744

To a solution of H-722 synthesized in Example 1-1 (150 mg, 0.40 mmol) in THF (3 mL), 2-naphthoic acid (82 mg, 0.476 mmol), EDCI (150 mg, 0.785 mmol), and DMAP (9.8 mg, 0.08 mmol) were added at room temperature, and the resulting mixture was stirred at the same temperature overnight. Water was added to the mixture, and the resulting mixture was extracted with ethyl acetate. The organic layer was washed with water and saturated saline, dried over anhydrous magnesium sulfate, and then filtered and concentrated under reduced pressure. The residue was purified by silica gel column chromatography (chloroform:hexane, 8:1), to give H-744 as a white powder (48 mg, 0.091 mmol, 23%).

The measured NMR spectrum and HR-ESI-MS result of H-744 are described below.

$^1$H NMR (400 MHz, DMSOd$_6$) δ 3.84 (3H, s), 5.31 (2H, s), 7.22 (2H, t, J=7.8 Hz), 7.45 (2H, t, J=7.3 Hz), 7.60 (2H, d, J=8.2 Hz), 7.58-7.67 (3H, m), 7.96-8.08 (4H, m), 8.14-8.18 (3H, m), 8.52 (1H, t, J=1.8 Hz), 8.59 (1H, bs), 10.64 (1H, s), 10.83 (1H, s); HRESIMS calcd for C$_{33}$H$_{25}$N$_3$O$_4$Na [M+Na]$^+$ 550.1743, found 550.1740.

The identified chemical structure of H-744 is indicated below.

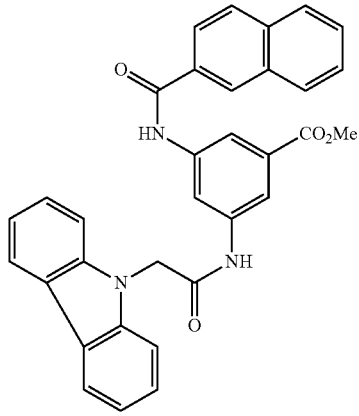 [SMILES: COC(=O)c1cc(NC(=O)Cn2c3ccccc3c3ccccc32)cc(NC(=O)c2ccc3ccccc3c2)c1]

H-744

(Example 1-32) Synthesis of H-745

H-744 synthesized in Example 1-31 (20 mg, 0.038 mmol) was hydrolyzed in the same manner as in the synthesis of H-681 to give H-745 as a white powder (8.0 mg, 0.015 mmol, 41%).

The measured NMR spectrum and HR-ESI-MS result of H-745 are described below.

$^1$H NMR (400 MHz, DMSOd$_6$) δ 5.30 (2H, s), 7.22 (2H, t, J=7.8 Hz), 7.45 (2H, t, J=7.3 Hz), 7.60 (2H, d, J=8.2 Hz), 7.59-7.66 (3H, m), 7.96-8.10 (5H, m), 8.17 (2H, d, J=7.4 Hz), 8.48 (1H, bs), 8.59 (1H, bs), 10.55 (1H, s), 10.74 (1H, s); HRESIMS calcd for C$_{32}$H$_{23}$N$_3$O$_4$Na [M+Na]$^+$ 536.1586, found 536.1589.

The identified chemical structure of H-745 is indicated below.

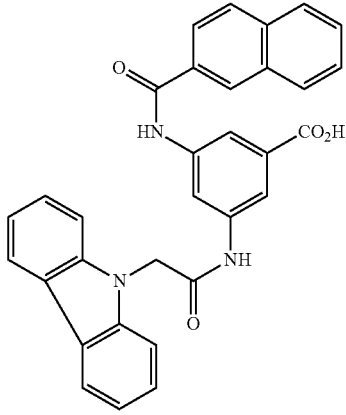

H-745

(Example 1-33) Synthesis of H-746

A dehydration and condensation reaction was carried out in the same manner as in the synthesis of H-744 by using H-722 synthesized in Example 1-1 (150 mg, 0.40 mmol) and quinaldic acid (82 mg, 0.48 mmol). The residue was purified by silica gel column chromatography (chloroform) to give H-746 as a white powder (30.3 mg, 0.057 mmol, 14%).

The measured NMR spectrum and HR-ESI-MS result of H-746 are described below.

$^1$H NMR (400 MHz, DMSOd$_6$) δ 3.85 (3H, s), 5.31 (2H, s), 7.22 (2H, t, J=7.8 Hz), 7.45 (2H, t, J=7.3 Hz), 7.60 (2H, d, J=8.2 Hz), 7.75 (1H, t, J=7.8 Hz), 7.90 (1H, t, J=8.3 Hz), 8.08 (1H, bs), 8.11 (1H, d, J=7.8 Hz), 8.17 (2H, d, J=7.7 Hz), 8.21 (1H, d, J=8.7 Hz), 8.25 (1H, d, J=8.2 Hz), 8.28 (1H, bs), 8.59 (1H, t, J=1.8 Hz), 8.62 (1H, d, J=8.7 Hz), 10.85 (1H, s), 10.99 (1H, s); HRESIMS calcd for $C_{32}H_{24}N_4O_4Na$ [M+Na]$^+$ 551.1695, found 551.1690.

The identified chemical structure of H-746 is indicated below.

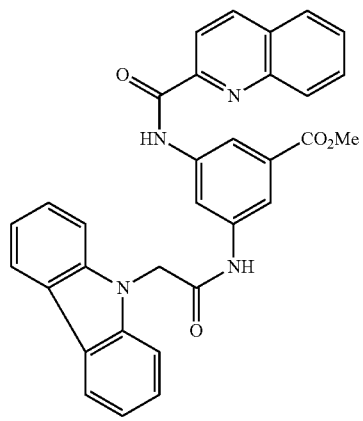 [SMILES: COC(=O)c1cc(NC(=O)Cn2c3ccccc3c3ccccc32)cc(NC(=O)c2ccc3ccccc3n2)c1]

H-746

(Example 1-34) Synthesis of H-747

H-746 synthesized in Example 1-33 (20 mg, 0.038 mmol) was hydrolyzed in the same manner as in the synthesis of H-681 to give H-747 as a white powder (16 mg, 0.031 mmol, 82%).

The measured NMR spectrum and HR-ESI-MS result of H-747 are described below.

$^1$H NMR (400 MHz, DMSOd$_6$) δ 5.31 (2H, s), 7.22 (2H, t, J=7.8 Hz), 7.45 (2H, t, J=7.3 Hz), 7.61 (2H, d, J=8.2 Hz), 7.75 (1H, t, J=8.2 Hz), 7.90 (1H, t, J=8.3 Hz), 8.00 (1H, bs), 8.11 (1H, d, J=8.3 Hz), 8.17 (2H, d, J=7.8 Hz), 8.20 (1H, bs), 8.21 (1H, d, J=8.7 Hz), 8.24 (1H, d, J=8.2 Hz), 8.55 (1H, bs), 8.62 (1H, d, J=8.2 Hz), 10.78 (1H, s), 10.89 (1H, s); HRESIMS calcd for $C_{31}H_{22}N_4O_4Na$ [M+Na]$^+$ 537.1539, found 537.1541.

The identified chemical structure of H-747 is indicated below.

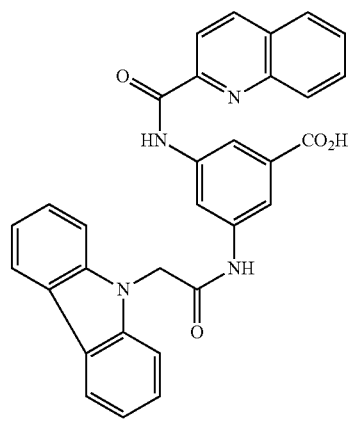 [SMILES: O=C(Cn1c2ccccc2c2ccccc21)Nc1cc(NC(=O)c2ccc3ccccc3n2)cc(C(=O)O)c1]

H-747

(Example 1-35) Synthesis of H-748

A dehydration and condensation reaction was carried out in the same manner as in the synthesis of H-744 by using H-722 synthesized in Example 1-1 (150 mg, 0.40 mmol) and 1,4-benzodioxane-6-carboxylic acid (82 mg, 0.48 mmol). The residue was purified by silica gel column chromatography (chloroform) to give H-748 as a white powder (25.7 mg, 0.048 mmol, 12%).

The measured NMR spectrum and HR-ESI-MS result of H-748 are described below.

$^1$H NMR (400 MHz, DMSOd$_6$) δ 3.82 (3H, s), 4.26-4.32 (4H, m), 5.29 (2H, s), 6.97 (1H, d, J=8.7 Hz), 7.21 (2H, t, J=7.3 Hz), 7.44 (2H, t, J=7.3 Hz), 7.51 (1H, dd, J=8.3, 2.3 Hz), 7.54 (1H, d, J=2.3 Hz), 7.59 (2H, d, J=8.2 Hz), 8.02 (1H, t, J=1.8 Hz), 8.10 (1H, t, J=1.8 Hz), 8.17 (2H, d, J=7.8 Hz), 8.45 (1H, t, J=1.8 Hz), 10.26 (1H, s), 10.78 (1H, s); HRESIMS calcd for $C_{31}H_{25}N_3O_6Na$ [M+Na]$^+$ 558.1641, found 558.1642.

The identified chemical structure of H-748 is indicated below.

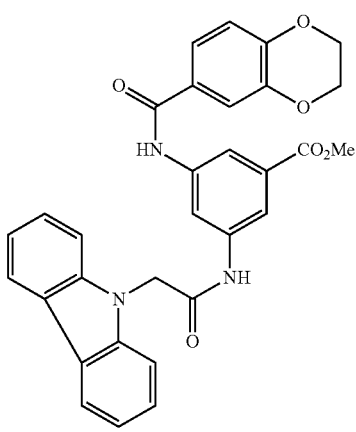 [SMILES: COC(=O)c1cc(NC(=O)Cn2c3ccccc3c3ccccc32)cc(NC(=O)c2ccc3c(c2)OCCO3)c1]

H-748

(Example 1-36) Synthesis of H-749

H-748 synthesized in Example 1-35 (20 mg, 0.037 mmol) was hydrolyzed in the same manner as in the synthesis of H-681 to give H-749 as a white powder (10 mg, 0.019 mmol, 52%).

The measured NMR spectrum and HR-ESI-MS result of H-749 are described below.

$^1$H NMR (400 MHz, DMSOd$_6$) δ 4.26-4.32 (4H, m), 5.29 (2H, s), 6.96 (1H, d, J=8.6 Hz), 7.21 (2H, t, J=7.8 Hz), 7.44 (2H, t, J=7.3 Hz), 7.51 (1H, dd, J=8.2, 2.3 Hz), 7.54 (1H, d, J=2.3 Hz), 7.59 (2H, d, J=7.8 Hz), 7.95 (1H, bs), 8.04 (1H, bs), 8.16 (2H, d, J=7.3 Hz), 8.42 (1H, bs), 10.20 (1H, s), 10.71 (1H, s); HRESIMS calcd for $C_{30}H_{23}N_3O_6Na$ [M+Na]$^+$ 544.1485, found 544.1487.

The identified chemical structure of H-749 is indicated below.

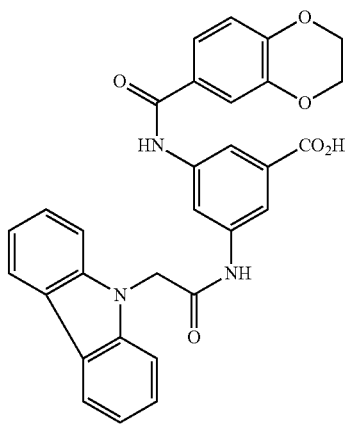 [SMILES: O=C(Cn1c2ccccc2c2ccccc21)Nc1cc(NC(=O)c2ccc3c(c2)OCCO3)cc(C(=O)O)c1]

H-749

(Example 1-37) Synthesis of H-818

A dehydration and condensation reaction was carried out in the same manner as in the synthesis of H-679 by using H-816 synthesized in Example 1-1 (100 mg, 0.266 mmol) and 2-naphthoic acid (55 mg, 0.32 mmol) to give H-818 as a white powder (136 mg, 0.256 mmol, 96%).

The measured NMR spectrum and HR-ESI-MS result of H-818 are described below.

$^1$H NMR (400 MHz, DMSOd$_6$) δ 3.86 (3H, s), 4.59 (2H, s), 6.94 (2H, t, J=7.3 Hz), 7.05 (4H, d, J=7.8 Hz), 7.27 (4H, t, J=7.8 Hz), 7.59-7.67 (2H, m), 7.98-8.09 (5H, m), 8.18 (1H, bs), 8.53 (1H, t, J=1.8 Hz), 8.61 (1H, bs), 10.47 (1H, s), 10.65 (1H, s); HRESIMS calcd for C$_{33}$H$_{27}$N$_3$O$_4$Na [M+Na]$^+$ 552.1899, found 552.1898.

The identified chemical structure of H-818 is indicated below.

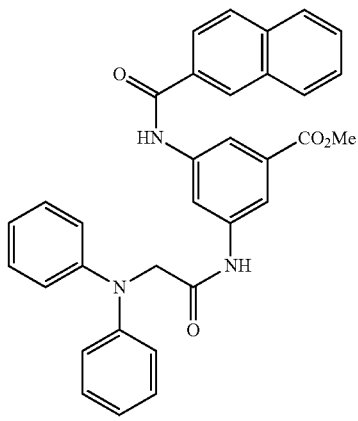 [SMILES: COC(=O)c1cc(NC(=O)CN(c2ccccc2)c2ccccc2)cc(NC(=O)c2ccc3ccccc3c2)c1]

H-818

(Example 1-38) Synthesis of H-819

H-818 synthesized in Example 1-37 (60 mg, 0.113 mmol) was hydrolyzed in the same manner as in the synthesis of H-681 to give H-819 as a white powder (54 mg, 0.104 mmol, 92%).

The measured NMR spectrum and HR-ESI-MS result of H-819 are described below.

$^1$H NMR (400 MHz, DMSOd$_6$) δ 4.59 (2H, s), 6.94 (2H, t, J=7.3 Hz), 7.06 (4H, d, J=7.8 Hz), 7.27 (4H, t, J=7.8 Hz), 7.59-7.68 (2H, m), 7.97-8.09 (5H, m), 8.15 (1H, bs), 8.51 (1H, bs), 8.61 (1H, bs), 10.42 (1H, s), 10.61 (1H, s); HRESIMS calcd for C$_{32}$H$_{25}$N$_3$O$_4$Na [M+Na]$^+$ 538.1743, found 538.1742.

The identified chemical structure of H-819 is indicated below.

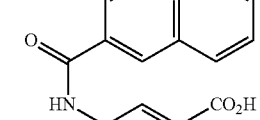

H-819

(Example 1-39) Synthesis of H-820

A dehydration and condensation reaction was carried out in the same manner as in the synthesis of H-679 by using H-816 synthesized in Example 1-1 (100 mg, 0.266 mmol) and quinaldic acid (55 mg, 0.32 mmol) to give H-820 as a yellow powder (126 mg, 0.238 mmol, 89%).

The measured NMR spectrum and HR-ESI-MS result of H-820 are described below.

$^1$H NMR (400 MHz, DMSOd$_6$) δ 3.87 (3H, s), 4.60 (2H, s), 6.94 (2H, t, J=7.3 Hz), 7.06 (4H, d, J=7.8 Hz), 7.27 (4H, t, J=7.8 Hz), 7.76 (1H, t, J=7.3 Hz), 7.91 (1H, t, J=7.3 Hz), 8.08 (1H, bs), 8.12 (1H, d, J=8.3 Hz), 8.22 (1H, d, J=8.7 Hz), 8.27 (1H, d, J=8.2 Hz), 8.28 (1H, bs), 8.59 (1H, bs), 8.63 (1H, d, J=8.7 Hz), 10.49 (1H, bs), 11.00 (1H, bs); HRESIMS calcd for C$_{32}$H$_{26}$N$_4$O$_4$Na [M+Na]$^+$ 553.1852, found 553.1852.

The identified chemical structure of H-820 is indicated below.

H-820

61

(Example 1-40) Synthesis of H-821

H-820 synthesized in Example 1-39 (60 mg, 0.113 mmol) was hydrolyzed in the same manner as in the synthesis of H-681 to give H-821 as a white powder (53 mg, 0.103 mmol, 91%).

The measured NMR spectrum and HR-ESI-MS result of H-821 are described below.

$^1$H NMR (400 MHz, DMSOd$_6$) δ 4.59 (2H, s), 6.94 (2H, t, J=7.3 Hz), 7.06 (4H, d, J=7.8 Hz), 7.27 (4H, t, J=7.8 Hz), 7.76 (1H, t, J=7.3 Hz), 7.91 (1H, t, J=7.3 Hz), 8.02 (1H, bs), 8.12 (1H, d, J=8.3 Hz), 8.22 (1H, d, J=8.7 Hz), 8.23 (1H, bs), 8.26 (1H, d, J=8.2 Hz), 8.56 (1H, bs), 8.63 (1H, d, J=8.7 Hz), 10.44 (1H, bs), 10.94 (1H, bs); HRESIMS calcd for C$_{31}$H$_{24}$N$_4$O$_4$Na [M+Na]$^+$ 539.1695, found 539.1697.

The identified chemical structure of H-821 is indicated below.

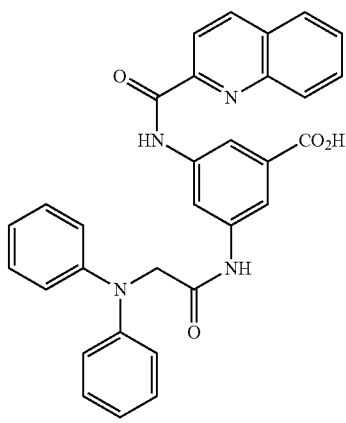 [SMILES: O=C(CN(c1ccccc1)c1ccccc1)Nc1cc(NC(=O)c2ccc3ccccc3n2)cc(C(=O)O)c1]

H-821

(Example 1-41) Synthesis of H-822

A dehydration and condensation reaction was carried out in the same manner as in the synthesis of H-679 by using H-816 synthesized in Example 1-1 (100 mg, 0.266 mmol) and 1,4-benzodioxane-6-carboxylic acid (58 mg, 0.32 mmol) to give H-822 as a white powder (124 mg, 0.231 mmol, 87%).

The measured NMR spectrum and HR-ESI-MS result of H-822 are described below.

$^1$H NMR (400 MHz, DMSOd$_6$) δ 3.84 (3H, s), 4.26-4.33 (4H, m), 4.57 (2H, s), 6.93 (2H, t, J=7.3 Hz), 6.97 (1H, d, J=8.2 Hz), 7.04 (4H, d, J=7.8 Hz), 7.26 (4H, t, J=7.8 Hz), 7.52 (1H, dd, J=8.3, 1.8 Hz), 7.55 (1H, d, J=1.8 Hz), 8.00 (1H, bs), 8.11 (1H, bs), 8.44 (1H, t, J=1.8 Hz), 10.27 (1H, bs), 10.43 (1H, bs); HRESIMS calcd for C$_{31}$H$_{27}$N$_3$O$_6$Na [M+Na]$^+$ 560.1798, found 560.1797.

The identified chemical structure of H-822 is indicated below.

62

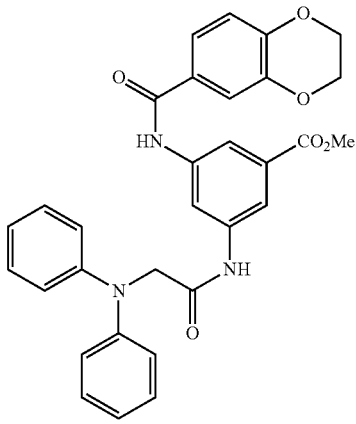 [SMILES: COC(=O)c1cc(NC(=O)CN(c2ccccc2)c2ccccc2)cc(NC(=O)c2ccc3c(c2)OCCO3)c1]

H-822

(Example 1-42) Synthesis of H-823

H-822 synthesized in Example 1-41 (60 mg, 0.112 mmol) was hydrolyzed in the same manner as in the synthesis of H-681 to give H-823 as a white powder (45 mg, 0.087 mmol, 77%).

The measured NMR spectrum and HR-ESI-MS result of H-823 are described below.

$^1$H NMR (400 MHz, DMSOd$_6$) δ 4.26-4.33 (4H, m), 4.56 (2H, s), 6.93 (2H, t, J=7.3 Hz), 6.97 (1H, d, J=8.2 Hz), 7.04 (4H, d, J=7.8 Hz), 7.26 (4H, t, J=7.8 Hz), 7.51 (1H, dd, J=8.3, 1.8 Hz), 7.55 (1H, d, J=1.8 Hz), 7.94 (1H, bs), 8.06 (1H, bs), 8.41 (1H, bs), 10.22 (1H, bs), 10.36 (1H, bs); HRESIMS calcd for C$_{30}$H$_{25}$N$_3$O$_6$Na [M+Na]$^+$ 546.1641, found 546.1646.

The identified chemical structure of H-823 is indicated below.

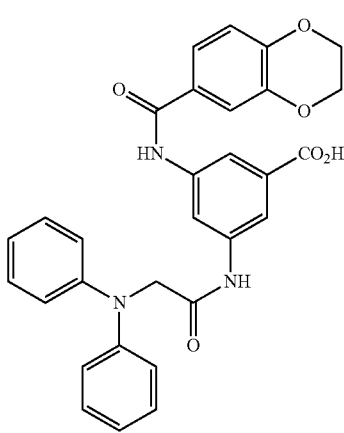 [SMILES: O=C(CN(c1ccccc1)c1ccccc1)Nc1cc(NC(=O)c2ccc3c(c2)OCCO3)cc(C(=O)O)c1]

H-823

(Example 1-43) Synthesis of H-824

A dehydration and condensation reaction was carried out in the same manner as in the synthesis of H-679 by using H-816 synthesized in Example 1-1 (100 mg, 0.266 mmol) and benzoic acid (39 mg, 0.32 mmol) to give H-824 as a white powder (127 mg, 0.263 mmol, 99%).

The measured NMR spectrum and HR-ESI-MS result of H-824 are described below.

$^1$H NMR (400 MHz, DMSOd$_6$) δ 3.85 (3H, s), 4.58 (2H, s), 6.93 (2H, t, J=7.3 Hz), 7.04 (4H, d, J=7.8 Hz), 7.26 (4H, t, J=7.8 Hz), 7.52 (2H, t, J=7.8 Hz), 7.59 (1H, t, J=7.8 Hz), 7.97 (2H, t, J=7.3 Hz), 8.03 (1H, bs), 8.13 (1H, bs), 8.46 (1H, bs), 10.44 (1H, bs), 10.47 (1H, bs); HRESIMS calcd for C$_{29}$H$_{25}$N$_3$O$_4$Na [M+Na]$^+$ 502.1743, found 502.1740.

The identified chemical structure of H-824 is indicated below.

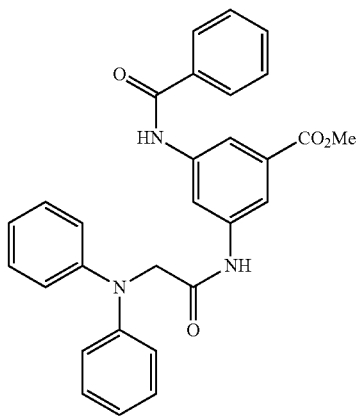 [SMILES: COC(=O)c1cc(NC(=O)CN(c2ccccc2)c2ccccc2)cc(NC(=O)c2ccccc2)c1]

H-824

(Example 1-44) Synthesis of H-825

H-824 synthesized in Example 1-43 (60 mg, 0.112 mmol) was hydrolyzed in the same manner as in the synthesis of H-681 to give H-825 as a white powder (52 mg, 0.112 mmol, 90%).

The measured NMR spectrum and HR-ESI-MS result of H-825 are described below.

$^1$H NMR (400 MHz, DMSOd$_6$) δ 4.57 (2H, s), 6.93 (2H, t, J=7.3 Hz), 7.04 (4H, d, J=7.8 Hz), 7.26 (4H, t, J=7.8 Hz), 7.52 (2H, t, J=7.8 Hz), 7.59 (1H, t, J=7.8 Hz), 7.97 (2H, t, J=7.3 Hz), 7.97 (1H, bs), 8.08 (1H, bs), 8.44 (1H, bs), 10.38 (1H, bs), 10.42 (1H, bs); HRESIMS calcd for C$_{28}$H$_{23}$N$_3$O$_4$Na [M+Na]$^+$ 488.1586, found 488.1582.

The identified chemical structure of H-825 is indicated below.

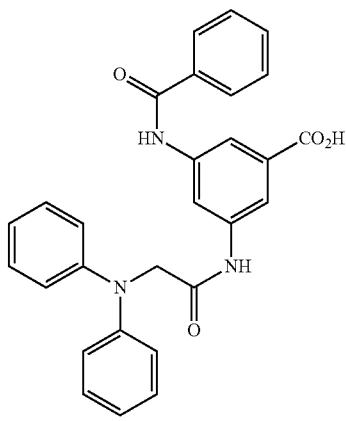 [SMILES: O=C(CN(c1ccccc1)c1ccccc1)Nc1cc(NC(=O)c2ccccc2)cc(C(=O)O)c1]

H-825

(Example 1-45) Synthesis of H-758

A dehydration and condensation reaction was carried out in the same manner as in the synthesis of H-679 by using H-677 synthesized in Example 1-1 (150 mg, 0.42 mmol) and phenoxyacetate (76 mg, 0.50 mmol) to give H-758 as a white powder (170 mg, 0.346 mmol, 83%).

The measured NMR spectrum and HR-ESI-MS result of H-758 are described below.

$^1$H NMR (400 MHz, DMSOd$_6$) δ 3.87 (3H, s), 4.74 (2H, s), 6.94-7.02 (3H, m), 7.32 (2H, dd, J=8.7, 7.3 Hz), 7.38 (2H, t, J=7.3 Hz), 7.53 (2H, t, J=7.3 Hz), 7.93 (2H, d, J=8.2 Hz), 8.08 (1H, bs), 8.12 (1H, bs), 8.23 (2H, d, J=7.3 Hz), 8.37 (1H, bs), 10.46 (1H, bs), 10.83 (1H, bs); HRESIMS calcd for C$_{29}$H$_{23}$N$_3$O$_5$Na[M+Na]$^+$ 516.1535, found 516.1530.

The identified chemical structure of H-758 is indicated below.

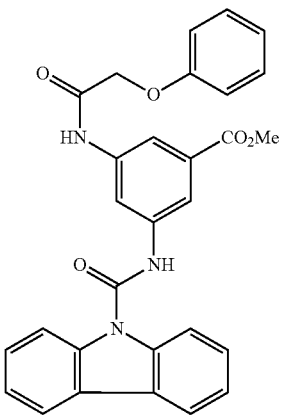 [SMILES: COC(=O)c1cc(NC(=O)COc2ccccc2)cc(NC(=O)n2c3ccccc3c3ccccc32)c1]

H-758

(Example 1-46) Synthesis of H-759

H-758 synthesized in Example 1-45 (80.0 mg, 0.16 mmol) was hydrolyzed in the same manner as in the synthesis of H-681 to give H-759 as a white powder (60.0 mg, 0.13 mmol, 77%).

The measured NMR spectrum and HR-ESI-MS result of H-759 are described below.

$^1$H NMR (400 MHz, DMSOd$_6$) δ 4.73 (2H, s), 6.94-7.02 (3H, m), 7.31 (2H, dd, J=8.7, 7.3 Hz), 7.38 (2H, t, J=7.3 Hz), 7.53 (2H, t, J=7.3 Hz), 7.93 (2H, d, J=8.2 Hz), 8.03 (1H, bs), 8.07 (1H, bs), 8.23 (2H, d, J=7.3 Hz), 8.34 (1H, bs), 10.40 (1H, bs), 10.78 (1H, bs); HRESIMS calcd for C$_{28}$H$_{21}$N$_3$O$_5$Na [M+Na]$^+$ 502.1379, found 502.1375.

The identified chemical structure of H-759 is indicated below.

H-759

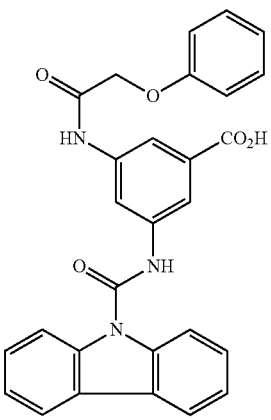 [SMILES: O=C(COc1ccccc1)Nc1cc(NC(=O)n2c3ccccc3c3ccccc32)cc(C(=O)O)c1]

(Example 1-47) Synthesis of H-760

A dehydration and condensation reaction was carried out in the same manner as in the synthesis of H-679 by using H-677 synthesized in Example 1-1 (150 mg, 0.42 mmol) and 2-naphthyloxyacetate (102 mg, 0.50 mmol) to give H-760 as a white powder (225 mg, 0.41 mmol, 99%).

The measured NMR spectrum and HR-ESI-MS result of H-760 are described below.

$^1$H NMR (400 MHz, DMSOd$_6$) δ 3.87 (3H, s), 4.87 (2H, s), 7.30-7.41 (5H, m), 7.46 (1H, t, J=7.3 Hz), 7.52 (2H, t, J=7.3 Hz), 7.78-7.90 (3H, m), 7.93 (2H, d, J=8.2 Hz), 8.09 (1H, t, J=1.8 Hz), 8.14 (1H, t, J=1.8 Hz), 8.23 (2H, d, J=7.3 Hz), 8.40 (1H, t, J=1.8 Hz), 10.52 (1H, bs), 10.83 (1H, bs); HRESIMS calcd for C$_{33}$H$_{25}$N$_3$O$_5$Na [M+Na]$^+$ 566.1692, found 566.1691.

The identified chemical structure of H-760 is indicated below.

H-760

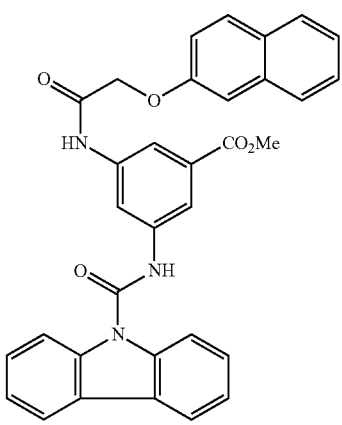 [SMILES: COC(=O)c1cc(NC(=O)COc2ccc3ccccc3c2)cc(NC(=O)n2c3ccccc3c3ccccc32)c1]

(Example 1-48) Synthesis of H-761

H-760 synthesized in Example 1-47 (100 mg, 0.18 mmol) was hydrolyzed in the same manner as in the synthesis of H-681 to give H-761 as a white powder (53.0 mg, 0.10 mmol, 56%).

The measured NMR spectrum and HR-ESI-MS result of H-761 are described below.

$^1$H NMR (400 MHz, DMSOd$_6$) δ 4.86 (2H, s), 7.30-7.40 (5H, m), 7.46 (1H, t, J=7.3 Hz), 7.52 (2H, t, J=7.3 Hz), 7.78-7.90 (3H, m), 7.93 (2H, d, J=8.2 Hz), 8.04 (1H, bs), 8.08 (1H, bs), 8.22 (2H, d, J=7.3 Hz), 8.37 (1H, bs), 10.45 (1H, bs), 10.78 (1H, bs); HRESIMS calcd for C$_{32}$H$_{23}$N$_3$O$_5$Na [M+Na]$^+$ 552.1535, found 552.1535.

The identified chemical structure of H-761 is indicated below.

H-761

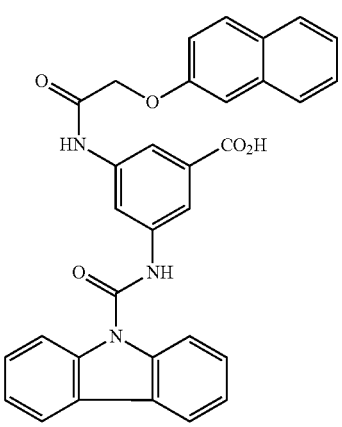 [SMILES: O=C(COc1ccc2ccccc2c1)Nc1cc(NC(=O)n2c3ccccc3c3ccccc32)cc(C(=O)O)c1]

(Example 1-49) Synthesis of H-762

A dehydration and condensation reaction was carried out in the same manner as in the synthesis of H-679 by using H-677 synthesized in Example 1-1 (150 mg, 0.42 mmol) and 2-pyridinyloxyacetate (76.6 mg, 0.50 mmol) to give H-762 as a pale orange powder (42.0 mg, 0.085 mmol, 21%).

The measured NMR spectrum and HR-ESI-MS result of H-762 are described below.

$^1$H NMR (400 MHz, DMSOd$_6$) δ 3.87 (3H, s), 4.77 (2H, s), 6.25 (1H, td, J=6.9, 1.3 Hz), 6.40 (1H, d, J=9.1 Hz), 7.38 (2H, t, J=7.3 Hz), 7.46 (1H, ddd, J=9.2, 6.8, 1.8 Hz), 7.53 (2H, t, J=7.3 Hz), 7.68 (1H, dd, J=6.4, 1.8 Hz), 7.93 (2H, d, J=8.2 Hz), 8.06 (1H, bs), 8.09 (1H, bs), 8.23 (2H, d, J=7.8 Hz), 8.30 (1H, bs), 10.73 (1H, bs), 10.83 (1H, bs); HRESIMS calcd for C$_{28}$H$_{22}$N$_4$O$_5$Na [M+Na]$^+$ 517.1488, found 517.1490.

The identified chemical structure of H-762 is indicated below.

H-762

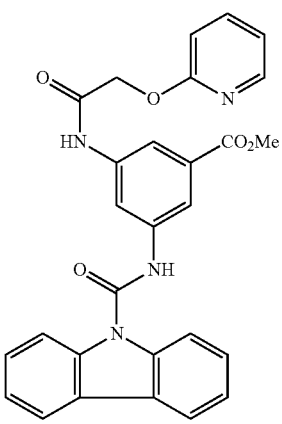 [SMILES: COC(=O)c1cc(NC(=O)COc2ccccn2)cc(NC(=O)n2c3ccccc3c3ccccc32)c1]

(Example 1-50) Synthesis of H-763

H-762 synthesized in Example 1-49 (55.0 mg, 0.11 mmol) was hydrolyzed in the same manner as in the synthesis of H-681 to give H-763 as a white powder (37.0 mg, 0.077 mmol, 70%).

The measured NMR spectrum and HR-ESI-MS result of H-763 are described below.

$^1$H NMR (400 MHz, DMSOd$_6$) δ 4.76 (2H, s), 6.22-6.28 (1H, m), 6.40 (1H, d, J=9.1 Hz), 7.38 (2H, t, J=7.3 Hz), 7.46 (1H, ddd, J=9.2, 6.8, 1.8 Hz), 7.53 (2H, t, J=7.3 Hz), 7.68 (1H, bd, J=6.9 Hz), 7.93 (2H, d, J=8.2 Hz), 8.02 (1H, bs), 8.03 (1H, bs), 8.22 (2H, d, J=7.8 Hz), 8.30 (1H, bs), 10.65 (1H, bs), 10.78 (1H, bs); HRESIMS calcd for C$_{27}$H$_{20}$N$_4$O$_5$Na [M+Na]$^+$ 503.1331, found 503.1331.

The identified chemical structure of H-763 is indicated below.

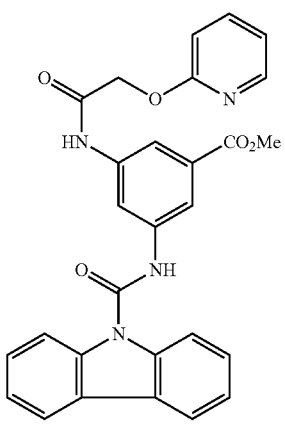

H-763

(Example 1-51) Synthesis of H-764

A dehydration and condensation reaction was carried out in the same manner as in the synthesis of H-679 by using H-677 synthesized in Example 1-1 (100 mg, 0.278 mmol) and 2-quinolinyloxyacetate (85 mg, 0.417 mmol) to give H-764 as a white powder (146 mg, 0.268 mmol, 97%).

The measured NMR spectrum and HR-ESI-MS result of H-764 are described below.

$^1$H NMR (400 MHz, DMSOd$_6$) δ 3.86 (3H, s), 5.18 (2H, s), 6.67 (1H, d, J=9.1 Hz), 7.26 (1H, t, J=7.3 Hz), 7.37 (2H, t, J=7.3 Hz), 7.46-7.62 (4H, m), 7.75 (1H, d, J=7.8 Hz), 7.92 (2H, d, J=8.2 Hz), 7.99 (1H, d, J=9.3 Hz), 8.06 (1H, bs), 8.09 (1H, bs), 8.22 (2H, d, J=7.8 Hz), 8.32 (1H, bs), 10.81 (2H, bs); HRESIMS calcd for C$_{32}$H$_{24}$N$_4$O$_5$Na [M+Na]$^+$ 567.1644, found 567.1642.

The identified chemical structure of H-764 is indicated below.

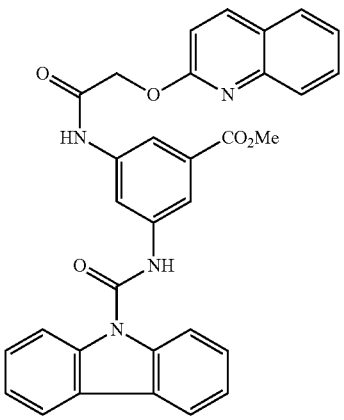 [SMILES: COC(=O)c1cc(NC(=O)COc2ccc3ccccc3n2)cc(NC(=O)n2c3ccccc3c3ccccc32)c1]

H-764

(Example 1-52) Synthesis of H-765

H-764 synthesized in Example 1-51 (80 mg, 0.144 mmol) was hydrolyzed in the same manner as in the synthesis of H-681 to give H-765 as a white powder (57.3 mg, 0.108 mmol, 75%).

The measured NMR spectrum and HR-ESI-MS result of H-765 are described below.

$^1$H NMR (400 MHz, DMSOd$_6$) δ 5.17 (2H, s), 6.66 (1H, d, J=9.6 Hz), 7.26 (1H, t, J=7.3 Hz), 7.37 (2H, t, J=7.3 Hz), 7.46-7.54 (3H, m), 7.59 (1H, t, J=7.3 Hz), 7.75 (1H, d, J=7.8 Hz), 7.91 (2H, d, J=8.2 Hz), 7.99 (1H, d, J=9.6 Hz), 8.01 (1H, bs), 8.02 (1H, bs), 8.22 (2H, d, J=7.8 Hz), 8.30 (1H, bs), 10.76 (1H, bs), 10.77 (1H, bs); HRESIMS calcd for C$_{31}$H$_{22}$N$_4$O$_5$Na [M+Na]$^+$ 553.1488, found 553.1492.

The identified chemical structure of H-765 is indicated below.

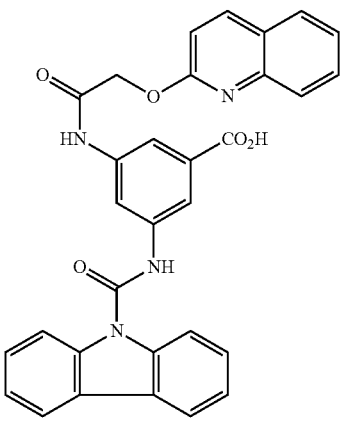 [SMILES: O=C(COc1ccc2ccccc2n1)Nc1cc(NC(=O)n2c3ccccc3c3ccccc32)cc(C(=O)O)c1]

H-765

(Example 1-53) Synthesis of H-766

A dehydration and condensation reaction was carried out in the same manner as in the synthesis of H-679 by using H-677 synthesized in Example 1-1 (150 mg, 0.42 mmol) and hippuric acid (90.2 mg, 0.50 mmol) to give H-766 as a pale orange powder (96.0 mg, 0.18 mmol, 44%).

The measured NMR spectrum and HR-ESI-MS result of H-766 are described below.

¹H NMR (400 MHz, DMSOd₆) δ 3.87 (3H, s), 4.08 (2H, d, J=5.9 Hz), 7.38 (2H, t, J=7.3 Hz), 7.46-7.57 (5H, m), 7.88-7.94 (4H, m), 8.06 (1H, t, J=1.8 Hz), 8.09 (1H, t, J=1.8 Hz), 8.22 (2H, d, J=7.8 Hz), 8.33 (1H, t, J=1.8 Hz), 8.88 (1H, t, J=5.9 Hz), 10.41 (1H, bs), 10.82 (1H, bs); HRESIMS calcd for $C_{30}H_{24}N_4O_5Na$ [M+Na]⁺ 543.1644, found 543.1644.

The identified chemical structure of H-766 is indicated below.

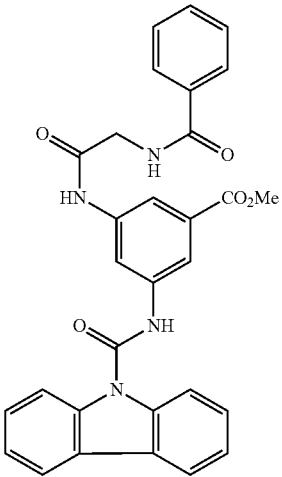 [SMILES: COC(=O)c1cc(NC(=O)CNC(=O)c2ccccc2)cc(NC(=O)n2c3ccccc3c3ccccc32)c1]

H-766

(Example 1-54) Synthesis of H-767

H-766 synthesized in Example 1-53 (50.0 mg, 0.096 mmol) was hydrolyzed in the same manner as in the synthesis of H-681 to give H-767 as a pale orange powder (33.0 mg, 0.065 mmol, 67%).

The measured NMR spectrum and HR-ESI-MS result of H-767 are described below.

¹H NMR (400 MHz, DMSOd₆) δ 4.08 (2H, d, J=5.9 Hz), 7.38 (2H, t, J=7.3 Hz), 7.46-7.57 (5H, m), 7.88-7.94 (4H, m), 8.02 (1H, t, J=1.8 Hz), 8.05 (1H, t, J=1.8 Hz), 8.22 (2H, d, J=7.8 Hz), 8.32 (1H, t, J=1.8 Hz), 8.88 (1H, t, J=5.9 Hz), 10.37 (1H, bs), 10.78 (1H, bs); HRESIMS calcd for $C_{29}H_{22}N_4O_5Na$ [M+Na]⁺ 529.1488, found 529.1492.

The identified chemical structure of H-767 is indicated below.

H-767

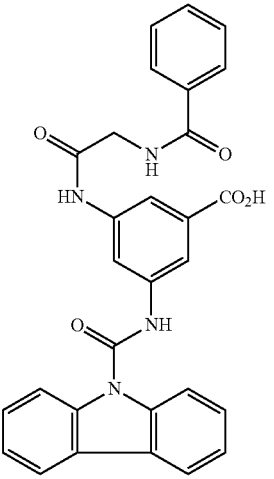 [SMILES: O=C(CNC(=O)c1ccccc1)Nc1cc(NC(=O)n2c3ccccc3c3ccccc32)cc(C(=O)O)c1]

(Example 1-55) Synthesis of H-768

A dehydration and condensation reaction was carried out in the same manner as in the synthesis of H-679 by using H-677 synthesized in Example 1-1 (150 mg, 0.42 mmol) and N-carbobenzoxyglycine (105 mg, 0.50 mmol) to give H-768 as a pale orange powder (227 mg, 0.41 mmol, 99%).

The measured NMR spectrum and HR-ESI-MS result of H-768 are described below.

¹H NMR (400 MHz, DMSOd₆) δ 3.83 (2H, d, J=6.0 Hz), 3.87 (3H, s), 5.05 (2H, s), 7.29-7.41 (7H, m), 7.53 (2H, t, J=8.2 Hz), 7.60 (1H, t, J=5.9 Hz), 7.93 (2H, d, J=8.2 Hz), 8.06 (1H, t, J=1.8 Hz), 8.07 (1H, t, J=1.8 Hz), 8.23 (2H, d, J=7.8 Hz), 8.31 (1H, t, J=1.8 Hz), 10.33 (1H, bs), 10.82 (1H, bs); HRESIMS calcd for $C_{31}H_{26}N_4O_6Na$ [M+Na]⁺ 573.1750, found 573.1757.

The identified chemical structure of H-768 is indicated below.

H-768

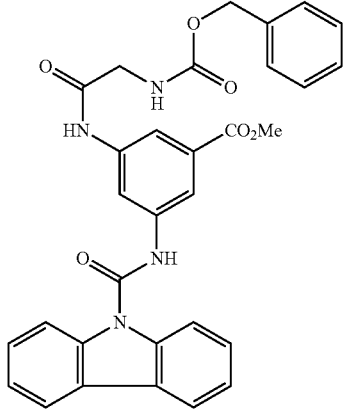 [SMILES: COC(=O)c1cc(NC(=O)CNC(=O)OCc2ccccc2)cc(NC(=O)n2c3ccccc3c3ccccc32)c1]

(Example 1-56) Synthesis of H-769

H-768 synthesized in Example 1-55 (100 mg, 0.18 mmol) was hydrolyzed in the same manner as in the synthesis of H-681 to give H-769 as a pale orange powder (12.0 mg, 0.022 mmol, 12%).

The measured NMR spectrum and HR-ESI-MS result of H-769 are described below.

¹H NMR (400 MHz, DMSOd₆) δ 3.83 (2H, d, J=6.4 Hz), 5.05 (2H, s), 7.28-7.40 (7H, m), 7.53 (2H, t, J=8.2 Hz), 7.58 (1H, t, J=6.4 Hz), 7.92 (2H, d, J=8.2 Hz), 7.98 (2H, bs), 8.23 (2H, d, J=7.8 Hz), 8.27 (1H, bs), 10.22 (1H, bs), 10.73 (1H, bs); HRESIMS calcd for $C_{30}H_{24}N_4O_6Na$ [M+Na]⁺ 559.1594, found 559.1597.

The identified chemical structure of H-769 is indicated below.

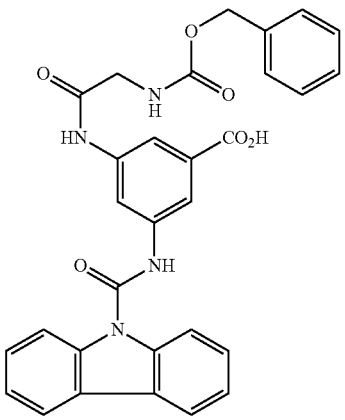 [SMILES: O=C(CNC(=O)OCc1ccccc1)Nc1cc(NC(=O)n2c3ccccc3c3ccccc32)cc(C(=O)O)c1]

H-769

(Evaluation of Pin1 Inhibition Activity)

To evaluate the inhibitory activity of each compound synthesized in Example 1 against the function of Pin1, a cell-based assay was performed according to the method previously developed by the inventors (Yusuke Nakatsu et al., Journal of Biological Chemistry, 2015, Vol. 290, No. 40, pp. 24255-24266), in which the phosphorylation level of AMPK (AMP-activated protein kinase), a protein whose phosphorylation is suppressed by Pin1, was examined as an index.

Briefly, 293T cells were plated on a collagen-coated 24-well plate. Forty-eight hours later, each compound synthesized in the preceding example (at 50 µM) was added to the plate, and the plate was left to stand in an incubator for 30 minutes. Subsequently, 10 mM 2-DG was added to the plate, and one hour later, each sample was collected with a buffer containing mercaptoethanol and SDS.

SDS-PAGE and blotting were performed, and blocking was then performed with 3% BSA for 1 hour, according to conventional protocols. Subsequently, a pAMPK antibody (Cell Signaling; diluted 1:2000 in Can Get Signal Solution 1, Toyobo) as a primary antibody, and an HRP-linked anti rabbit IgG (GE Healthcare; diluted 1:4000 in Can Get Signal Solution 2, Toyobo) as a secondary antibody were allowed to react at ambient temperature for 1 hour prior to detection.

The inhibitory activity against the function of Pin1 was evaluated as indicated below by comparing the inhibition levels between each compound and a known Pin1 inhibitor, C1 ((R)-2-(5-(4-methoxyphenyl)-2-methylfuran-3-carboxamido)-3-(naphthalene-6-yl) propanoic acid):

(+++): a higher level of AMPK phosphorylation is promoted, as compared with C1;

(++): a similar level of AMPK phosphorylation is promoted, as compared with C1;

(+): a lower level of AMPK phosphorylation is promoted, as compared with C1;

(−): no or almost no promotion is found in AMPK phosphorylation.

For some compounds synthesized in Example 1, the inhibitory activity against the function of Pin1 was measured by a cell-free assay based on the method by Janowski et al. (AnalyticalBiochemistry, 1997, Vol. 252, Issue 2, pp. 299-307) because there is an assay measuring peptidylprolylisomerase activity without cells (cell-free).

Briefly, an assay buffer (containing 35 mM HEPES, pH 7.8, 50 µM DTT and 0.0025% NP40) was equilibrated to 10° C. in a quartz cell with stirring function. To this solution was added the compound dissolved in DMSO (10 µM) and then UV spectrum of the resulting solution was immediately measured. Then Pin1 (final concentration of 5 nM) was added to the solution. The reaction was initiated by adding a substrate peptide (Suc-Ala-Glu-Pro-Phe-pNA) dissolved in 0.5 M LiCl solution in trifluoroethanol (final concentration of 60 µM). After reaction was initiated, the change of absorbance at 330 nm was measured for 5 minutes. The resultant reaction curve was fitted to a first order decay model to calculate the reaction rate. The catalytic reaction rate was calculated by subtracting the background rate from the reaction rate. The inhibition ratio (%) was calculated from the catalytic reaction rates in the presence and absence of the compound. The higher inhibition ratio means the higher inhibitory activity against Pin1 function.

The results of the cell-based assay and the cell-free assay for an inhibitory activity against Pin1 function are summarized in the following tables.

TABLE 1

| Example No. | Compound No. | Structural formula | Pin1 inhibition activity | |
| --- | --- | --- | --- | --- |
| | | | Cell-based assay | Cell-free assay |
| Ex. 1-2 | H-591 | | +++ (Hydrolysis causes conversion to H-594) | |

TABLE 1-continued

| Example No. | Compound No. | Structural formula | Pin1 inhibition activity | |
|---|---|---|---|---|
| | | | Cell-based assay | Cell-free assay |
| Ex. 1-3 | H-594 | (structure) | +++ | |
| Ex. 1-4 | H-679 | (structure) | ++ (Hydrolysis causes conversion to H-681) | |
| Ex. 1-5 | H-681 | (structure) | ++ | |

TABLE 2

| Example No. | Compound No. | Structural formula | Pin1 inhibition activity | |
|---|---|---|---|---|
| | | | Cell-based assay | Cell-free assay |
| Ex. 1-6 | H-680 | | − (Hydrolysis causes conversion to H-682) | |
| Ex. 1-7 | H-682 | | + | |
| Ex. 1-8 | H-684 | | ++ (Hydrolysis causes conversion to H-688) | |

TABLE 2-continued
|  |  |  | Pin1 inhibition activity | |
|---|---|---|---|---|
| Example No. | Compound No. | Structural formula | Cell-based assay | Cell-free assay |
| Ex. 1-9 | H-688 | 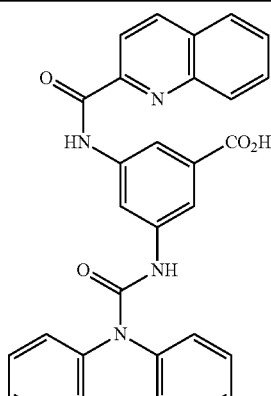 | ++ | |
TABLE 3
|  |  |  | Pin1 inhibition activity | |
|---|---|---|---|---|
| Example No. | Compound No. | Structural formula | Cell-based assay | Cell-free assay |
| Ex. 1-10 | H-685 | | + | |
| Ex. 1-11 | H-686 | | ++ (Hydrolysis causes conversion to H-692) | |

TABLE 3-continued

| Example No. | Compound No. | Structural formula | Pin1 inhibition activity | |
| --- | --- | --- | --- | --- |
| | | | Cell-based assay | Cell-free assay |
| Ex. 1-12 | H-692 | | +++ | 80-94% |

TABLE 4

| Example No. | Compound No. | Structural formula | Pin1 inhibition activity | |
| --- | --- | --- | --- | --- |
| | | | Cell-based assay | Cell-free assay |
| Ex. 1-13 | H-687 | | – (Hydrolysis causes conversion to H-694) | |
| Ex. 1-14 | H-694 | | ++ | 69% |

TABLE 4-continued
| Example No. | Compound No. | Structural formula | Pin1 inhibition activity Cell-based assay | Cell-free assay |
|---|---|---|---|---|
| Ex. 1-15 | H-690 | 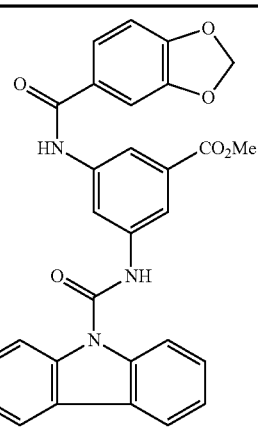 | − (Hydrolysis causes conversion to H-695) | |
| Ex. 1-16 | H-695 | | +++ | |
TABLE 5
| Example No. | Compound No. | Structural formula | Pin1 inhibition activity Cell-based assay | Cell-free assay |
|---|---|---|---|---|
| Ex. 1-17 | H-696 | 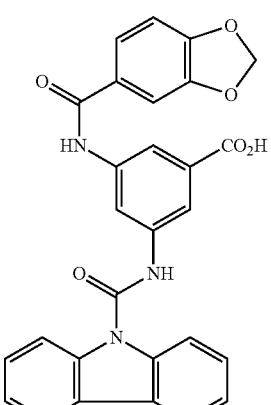 | ++ (Hydrolysis causes conversion to H-697) | |

TABLE 5-continued

| | | | Pin1 inhibition activity | |
|---|---|---|---|---|
| Example No. | Compound No. | Structural formula | Cell-based assay | Cell-free assay |
| Ex. 1-18 | H-697 | (structure) | + | |
| Ex. 1-19 | H-699 | (structure) | ++ (Hydrolysis causes conversion to H-700) | |
| Ex. 1-20 | H-700 | (structure) | ++ | |

TABLE 6

| Example No. | Compound No. | Structural formula | Pin1 inhibition activity | |
|---|---|---|---|---|
| | | | Cell-based assay | Cell-free assay |
| Ex. 1-21 | H-728 | | + (Hydrolysis causes conversion to H-732) | |
| Ex. 1-22 | H-732 | | + | |
| Ex. 1-23 | H-729 | | ++ (Hydrolysis causes conversion to H-733) | |

TABLE 6-continued

| Example No. | Compound No. | Structural formula | Pin1 inhibition activity | |
|---|---|---|---|---|
| | | | Cell-based assay | Cell-free assay |
| Ex. 1-24 | H-733 | | − | 61% |

TABLE 7

| Example No. | Compound No. | Structural formula | Pin1 inhibition activity | |
|---|---|---|---|---|
| | | | Cell-based assay | Cell-free assay |
| Ex. 1-25 | H-730 | | ++ (Hydrolysis causes conversion to H-734) | |
| Ex. 1-26 | H-734 | | − | 82% |

TABLE 7-continued
| | | | Pin1 inhibition activity | |
|---|---|---|---|---|
| Example No. | Compound No. | Structural formula | Cell-based assay | Cell-free assay |
| Ex. 1-27 | H-731 | 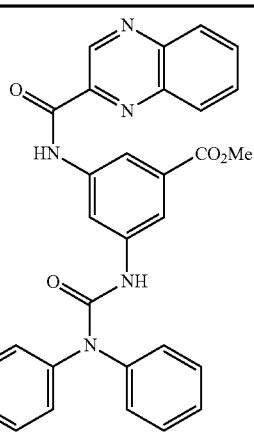 | +++ (Hydrolysis causes conversion to H-735) | |
| Ex. 1-28 | H-735 | 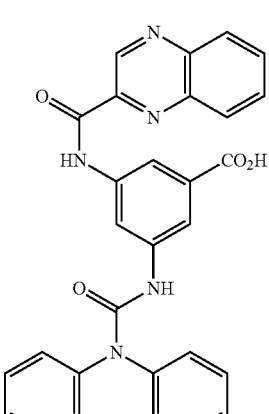 | + | |
TABLE 8
| | | | Pin1 inhibition activity | |
|---|---|---|---|---|
| Example No. | Compound No. | Structural formula | Cell-based assay | Cell-free assay |
| Ex. 1-29 | H-609 | (structure shown) | ++ to +++ (Hydrolysis causes conversion to H-613) | |

TABLE 8-continued

| Example No. | Compound No. | Structural formula | Pin1 inhibition activity | |
|---|---|---|---|---|
| | | | Cell-based assay | Cell-free assay |
| Ex. 1-30 | H-613 | | + to ++ | 38% |
| Ex. 1-31 | H-744 | | + (Hydrolysis causes conversion to H-745) | |
| Ex. 1-32 | H-745 | | − | 88-95% |

TABLE 9

| Example No. | Compound No. | Structural formula | Pin1 inhibition activity | |
|---|---|---|---|---|
| | | | Cell-based assay | Cell-free assay |
| Ex. 1-33 | H-746 | (structure) | − (Hydrolysis causes conversion to H-747) | |
| Ex. 1-34 | H-747 | (structure) | ++ | |
| Ex. 1-35 | H-748 | (structure) | ++ (Hydrolysis causes conversion to H-749) | |

TABLE 9-continued

| Example No. | Compound No. | Structural formula | Pin1 inhibition activity | |
|---|---|---|---|---|
| | | | Cell-based assay | Cell-free assay |
| Ex. 1-36 | H-749 | | Not measured | 53% |

TABLE 10

| Example No. | Compound No. | Structural formula | Pin1 inhibition activity | |
|---|---|---|---|---|
| | | | Cell-based assay | Cell-free assay |
| Ex. 1-37 | H-818 | | Not measured (Hydrolysis causes conversion to H-819) | |
| Ex. 1-38 | H-819 | | Not measured | 62% |

TABLE 10-continued

| Example No. | Compound No. | Structural formula | Pin1 inhibition activity | |
|---|---|---|---|---|
| | | | Cell-based assay | Cell-free assay |
| Ex. 1-39 | H-820 | (structure) | Not measured (Hydrolysis causes conversion to H-821) | |
| Ex. 1-40 | H-821 | (structure) | Not measured | 94.4% |

TABLE 11

| Example No. | Compound No. | Structural formula | Pin1 inhibition activity | |
|---|---|---|---|---|
| | | | Cell-based assay | Cell-free assay |
| Ex. 1-41 | H-822 | (structure) | Not measured (Hydrolysis causes conversion to H-823) | |

TABLE 11-continued

| | | | Pin1 inhibition activity | |
|---|---|---|---|---|
| Example No. | Compound No. | Structural formula | Cell-based assay | Cell-free assay |
| Ex. 1-42 | H-823 | | Not measured | 4.2% |
| Ex. 1-43 | H-824 | | Not measured (Hydrolysis causes conversion to H-825) | |
| Ex. 1-44 | H-825 | | Not measured | 19.9% |

TABLE 12

| Example No. | Compound No. | Structural formula | Pin1 inhibition activity | |
| --- | --- | --- | --- | --- |
| | | | Cell-based assay | Cell-free assay |
| Ex. 1-45 | H-758 | (phenoxyacetamide linked to methyl 3,5-diaminobenzoate, with carbazole-9-carboxamide) | – (Hydrolysis causes conversion to H-759) | |
| Ex. 1-46 | H-759 | (phenoxyacetamide linked to 3,5-diaminobenzoic acid, with carbazole-9-carboxamide) | – | 11% |
| Ex. 1-47 | H-760 | (naphthalen-2-yloxyacetamide linked to methyl 3,5-diaminobenzoate, with carbazole-9-carboxamide) | + (Hydrolysis causes conversion to H-761) | |

TABLE 12-continued
| Example No. | Compound No. | Structural formula | Pin1 inhibition activity | |
| --- | --- | --- | --- | --- |
| | | | Cell-based assay | Cell-free assay |
| Ex. 1-48 | H-761 | 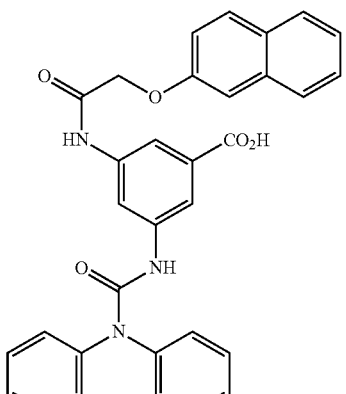 | – | 70% |
TABLE 13
| Example No. | Compound No. | Structural formula | Pin1 inhibition activity | |
| --- | --- | --- | --- | --- |
| | | | Cell-based assay | Cell-free assay |
| Ex. 1-49 | H-762 | | – (Hydrolysis causes conversion to H-763) | |
| Ex. 1-50 | H-763 | | – | 24.6% |

TABLE 13-continued

| Example No. | Compound No. | Structural formula | Pin1 inhibition activity | |
|---|---|---|---|---|
| | | | Cell-based assay | Cell-free assay |
| Ex. 1-51 | H-764 | | – | (Hydrolysis causes conversion to H-765) |
| Ex. 1-52 | H-765 | | – | 42.8% |

TABLE 14

| Example No. | Compound No. | Structural formula | Pin1 inhibition activity | |
|---|---|---|---|---|
| | | | Cell-based assay | Cell-free assay |
| Ex. 1-53 | H-766 | | + | (Hydrolysis causes conversion to H-767) |

TABLE 14-continued

| Example No. | Compound No. | Structural formula | Pin1 inhibition activity | |
| --- | --- | --- | --- | --- |
| | | | Cell-based assay | Cell-free assay |
| Ex. 1-54 | H-767 | *(structure)* | – | 74.8% |
| Ex. 1-55 | H-768 | *(structure)* | – | (Hydrolysis causes conversion to H-769) |
| Ex. 1-56 | H-769 | *(structure)* | – | 15.9% |

Example 3

(NASH Treatment Study)

Example 3-1

Animal experiments were performed using non-alcoholic steatohepatitis (NASH) model mice to test the compounds according to the present invention for the therapeutic effect on NASH.

NASH model mice (hereinafter referred to as "NASH mice") were produced by feeding a high-fat and high-cholesterol diet containing palm oil (HFD) to individual 8-week-old male laboratory mice for 8 weeks. The mice were divided into groups during 8 weeks of the HFD-feeding period, and animal experiments were performed on a group of mice to which a compound according to the present invention (H-686) was administered orally at a dose of 5 mg/kg/day three times a week, and a group of mice to which nothing was administered. In addition, a normal diet was given to individual 8-week-old male laboratory mice for 8 weeks to prepare control mice.

Figure 2:
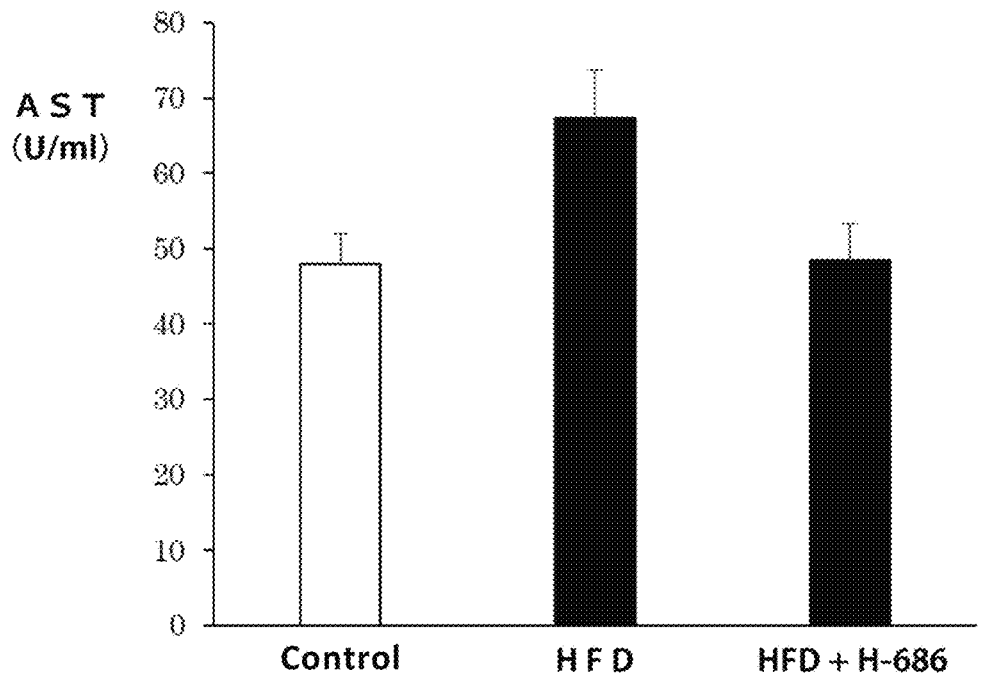
FIG. 2 shows graphs depicting the results of measurements of blood AST (GOT) and blood ALT (GPT) concentrations in a NASH treatment study.
Figure 2:
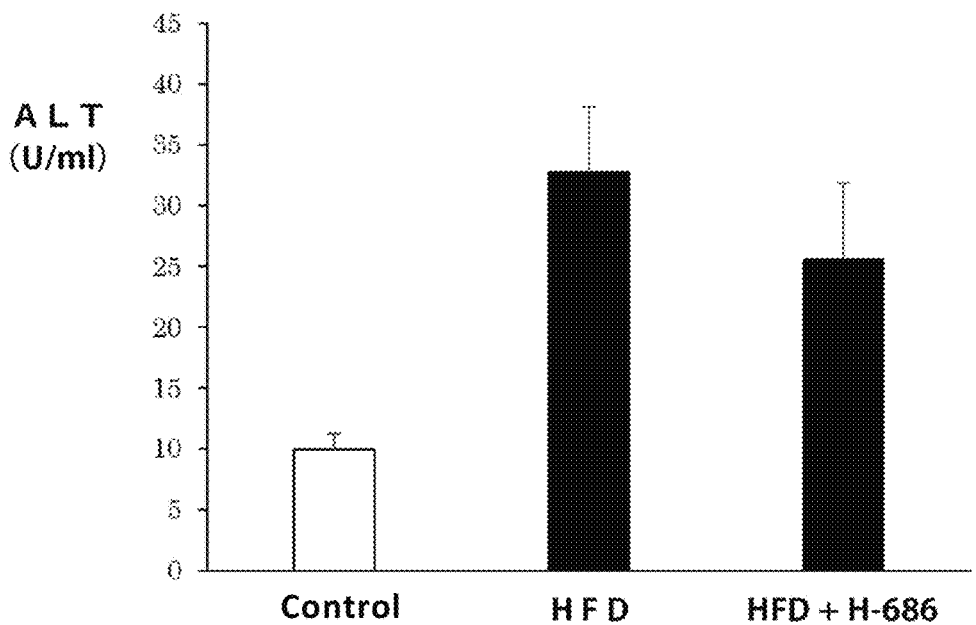

FIGS. 1 (A) and 1 (B) show the results of measurements of body weight and liver weight of these mice respectively. FIGS. 2 (A) and 2 (B) show the results of measurements of blood AST (GOT) concentration and blood ALT (GPT) concentration. respectively. Then FIGS. 3 (A) and 3 (B) show the results of measurements of mRNA expression levels of Colla1 (collagen, type I, alpha 1 chain) and Colla2 (collagen, type I, alpha 2 chain), respectively.

FIG. 1 (A) shows a graph depicting the results of measurements of mouse body weight, with the graph bars representing the measurement results in the control mice, the mice given the HFD, and the mice given the HFD and H-686, from left to right.

FIG. 1 (B) is a graph depicting the result of measurement of mouse liver weight, and graph bars represent the results of measurement of liver weight in the control mice, the mice given the HFD, and the mice given the HFD and H-686, from left to right.

As shown in FIG. 1 (A), the mice given the HFD gained weight, while weight gain in the mice given H-686 was suppressed. In regard to liver weight, as shown in FIG. 1 (B), the liver weight was increased as a result of fat accumulation in the liver in the mice given the HFD, in contrast, the increase in liver weight was significantly suppressed when H-686 was administered.

FIG. 2 (A) is a graph depicting the result of measurement of blood AST (GOT) concentration (IU/ml), and graph bars represent the results of measurement of blood AST in the control mice, the mice given the HFD, and the mice given the HFD and H-686, from left to right.

FIG. 2 (B) is a graph depicting the result of measurement of blood ALT (GPT) concentration (IU/ml), and graph bars represent the results of measurement of blood AST in the control mice, the mice given the HFD, and the mice given the HFD and H-686, from left to right.

As shown in FIG. 2 (A), the AST value, which is an index of liver inflammation, was increased in the mice given the HFD. In contrast, the AST value was decreased and suppression of liver inflammation was observed when H-686 was administered. In addition, with respect to ALT, as shown in FIG. 2 (B), the ALT value, which is an index of liver inflammation, was increased in the mice given the HFD while the ALT value was decreased and suppression of liver inflammation was observed when H-686 was administered.

Figure 3:
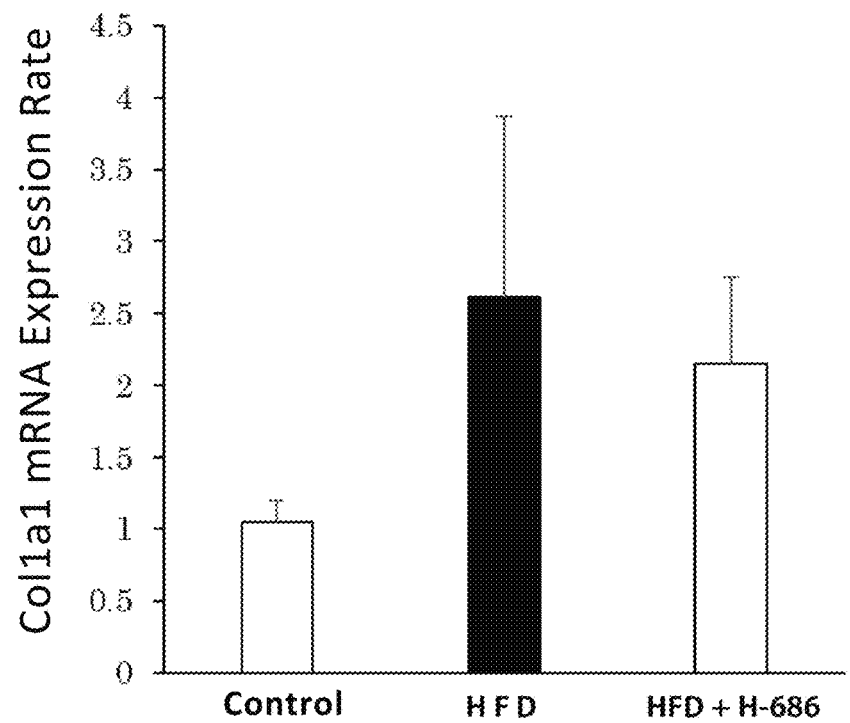
FIG. 3 shows graphs depicting the results of measurements of mRNA expression levels of Col1a1 (collagen, type I, alpha 1 chain) and Col1a2 (collagen, type I, alpha 2 chain) in a NASH treatment study.
Figure 3:
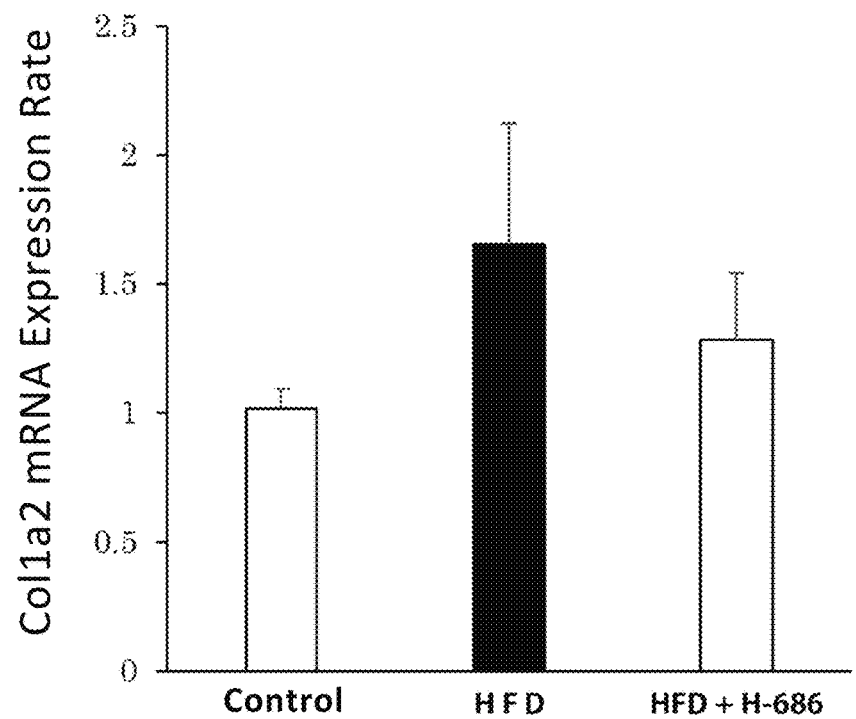

FIG. 3 (A) shows a graph depicting the results of measurements of mRNA expression level of Colla1 (collagen, type I, alpha 1 chain), and graph bars represent the results of measurement in the control mice, the mice given the HFD, and the mice given the HFD and H-686, from left to right. The measurement values represent the ratio of the expression level based on the expression level of control which is set to "1".

FIG. 3 (B) shows a graph depicting the results of measurements of mRNA expression level of Colla2 (collagen, type I, alpha 2 chain), and graph bars represent the results of measurement in the control mice, the mice given the HFD, and the mice given the HFD and H-686, from left to right. The measurement values represent the ratio of the expression level based on the expression level of control which is set to "1".

As shown in FIG. 3 (A), the expression level of Colla1 (collagen, type I, alpha 1 chain) associated with hepatic tissue fibrosis, was increased in the mice given the HFD, while the expression level of Colla1 was suppressed in the mice given H-686. As shown in FIG. 3 (B), the expression level of Colla2 (collagen, type I, alpha 2 chain) was also increased in the mice given the HFD, while the suppression of the expression level was observed in the mice administered H-686.

Example 3-2

Figure 4:
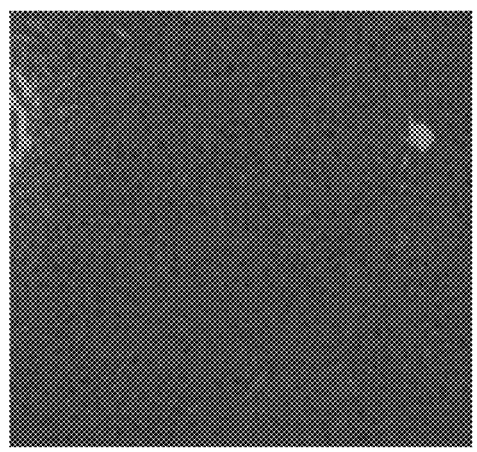
FIG. 4 shows photographs provided instead of drawings depicting the results of microscopic observation of liver tissue sections from mice in a NASH treatment study.
Figure 4:
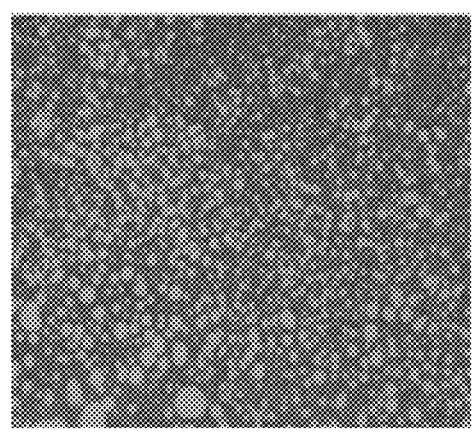
Figure 4:
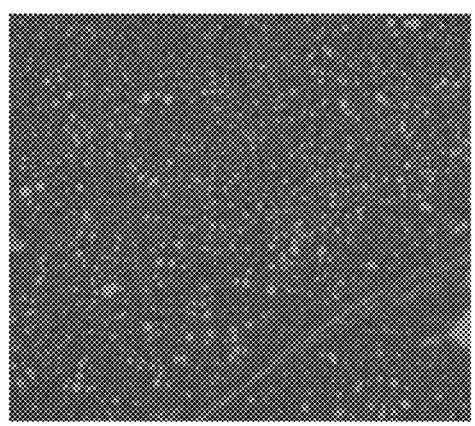
Figure 5:
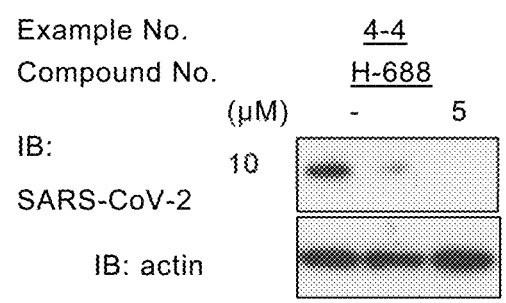
FIG. 5 shows the result of Western blotting of SARS-CoV-2 nucleocapsid and actin in cells when adding a Pin1 inhibitor H-688 to a final concentration of 5 or 10 µM.

Then FIG. 4 shows the results of microscopic observation of liver tissue sections from the control mice, the mice given the HFD, and the mice given the HFD and H-686.

FIG. 4 (A) is a photograph depicting the result of observation of the liver tissue from the control mice, FIG. 4 (B) is a photograph depicting the result of observation of the liver tissue from the mice given the HFD and FIG. 4 (C) is a photograph depicting the result of observation of the liver tissue from the mice given the HFD and H-686.

As shown in FIG. 4 (A), fat accumulation was not observed in the liver tissue from the control mice, while fat accumulation was observed in the liver tissue from the mice given the HFD, as shown in FIGS. 4 (B) and (C). In addition, administration of H-686 suppressed fat accumulation even in the mice given the HFD, as evidenced by the comparison between FIG. 4 (B) and FIG. 4 (C).

Example 4

(SARS-CoV-2 Proliferation Suppression Study)

Examples 4-1 to 4-8

Table 15 shows the result of a confirmation test of a suppressing effect against SARS-CoV-2 proliferation. In the confirmation test, a Pin1 inhibitor was added to VeroE6/TMPRSS2 cells to the final concentration of 20 μM, to which SARS-CoV-2 was infected at multiplicity of infection (MOI) of 10 after two hours, followed by recovering cell lysate 8 hours after the infection and then detecting SARS-CoV-2 nucleocapsid, Pin1 and actin as an internal standard in the cells by Western blotting. An inhibition rate was calculated as a band area ratio of the band area when adding a Pin1 inhibitor based on the band area without a Pin1 inhibitor added in the same test condition which is set to 0% inhibition rate. When a band area is 0 (when no band is observed), the inhibition rate is 100%.

TABLE 15
| Example No. | Compound No. | Inhibition rate | Structural formula of Pin1 inhibitor |
|---|---|---|---|
| 4-1 | H-680 | 53 | 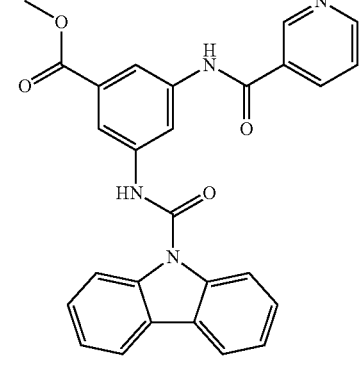 |
| 4-2 | H-684 | 66 | 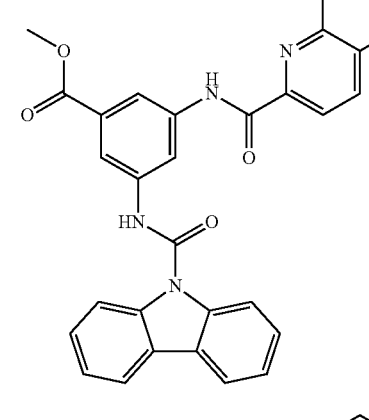 |
| 4-3 | H-685 | 58 | 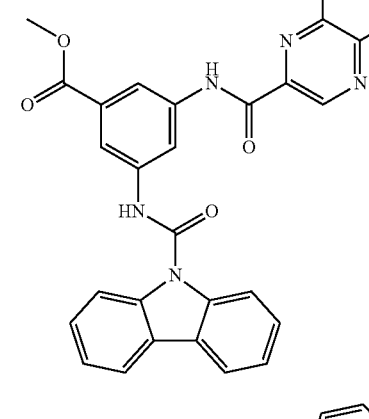 |
| 4-4 | H-688 | 98 | 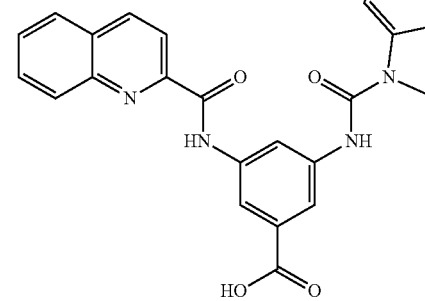 |

TABLE 15-continued
| Example No. | Compound No. | Inhibition rate | Structural formula of Pin1 inhibitor |
|---|---|---|---|
| 4-5 | H-762 | 83 | 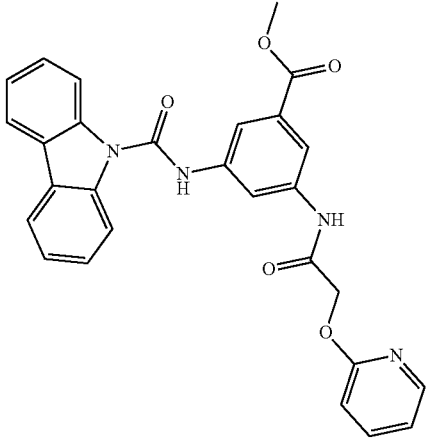 [SMILES: COC(=O)c1cc(NC(=O)COc2ccccn2)cc(NC(=O)n2c3ccccc3c3ccccc32)c1] |
| 4-6 | H-763 | 97 | 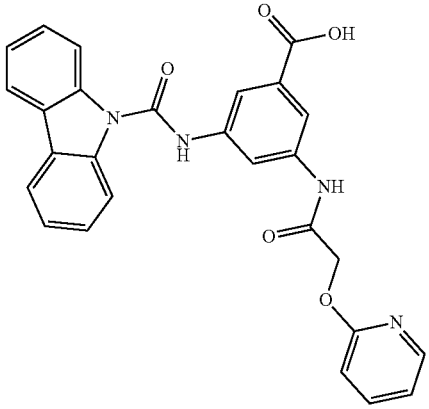 [SMILES: O=C(COc1ccccn1)Nc1cc(NC(=O)n2c3ccccc3c3ccccc32)cc(C(=O)O)c1] |
| 4-7 | H-819 | 95 | 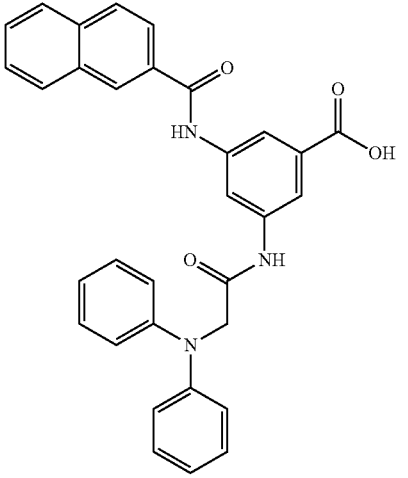 [SMILES: O=C(CN(c1ccccc1)c1ccccc1)Nc1cc(NC(=O)c2ccc3ccccc3c2)cc(C(=O)O)c1] |

TABLE 15-continued

| Example No. | Compound No. | Inhibition rate | Structural formula of Pin1 inhibitor |
| --- | --- | --- | --- |
| 4-8 | H-821 | 95 | 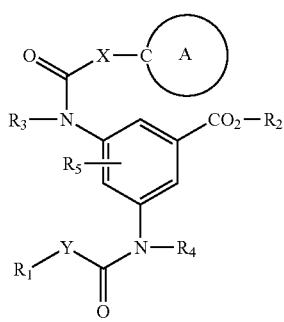 |

In addition, in Table 15, Pin1 inhibitor H-688, which showed high inhibition rate (Example 4-4), was observed to have a suppressing effect against SARS-CoV-2 proliferation when adding 5 μM or 10 μM. To $1\times10^5$ VeroE6/TMPRSS2 cells/well was added a Pin1 inhibitor to a final concentration of 5 or 10 μM, to which SARS-CoV-2 was infected at multiplicity of infection (MOI) of 10 after two hours, followed by recovering cell lysate 8 hours after the infection and then detecting SARS-CoV-2 nucleocapsid and actin as an internal standard in the cells by Western blotting. FIG. 5 shows the result of adding the Pin1 inhibitor H-688.

INDUSTRIAL APPLICABILITY

The compounds or salts thereof, Pin1 inhibitors, pharmaceutical compositions, therapeutic or prophylactic agents for inflammatory diseases, therapeutic or prophylactic agents for fatty liver diseases, therapeutic or prophylactic agents for obesity, and therapeutic or prophylactic agents for COVID-19 according to the present invention are each useful in the pharmaceutical industry.

The invention claimed is:

1. A compound represented by Formula (I), or a salt thereof:

(I)

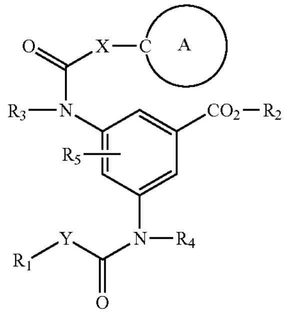

wherein ring A represents an optionally substituted monocyclic or polycyclic aromatic ring or heterocycle;

$R_1$ represents a group represented by any of the following Formulae (II) to (V):

(II)

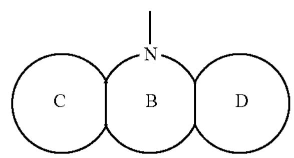

wherein ring B represents an optionally substituted monocyclic heterocycle, Rings C and D independently represent an optionally substituted monocyclic or polycyclic aromatic ring, heterocycle or cyclic hydrocarbon, and the rings B, C and D form a condensed ring (III)

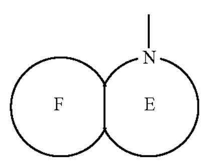

wherein ring E represents an optionally substituted monocyclic heterocycle, ring F represents an optionally substituted monocyclic or polycyclic aromatic ring, heterocycle or cyclic hydrocarbon, and the rings E and F form a condensed ring (IV)

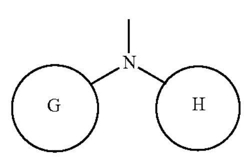

wherein rings G and H independently represent an optionally substituted monocyclic or polycyclic aromatic ring or heterocycle

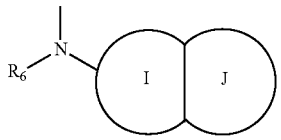

(V)

wherein ring I represents an optionally substituted monocyclic aromatic ring or heterocycle, a ring J represents an optionally substituted monocyclic or polycyclic aromatic ring, heterocycle or cyclic hydrocarbon, the rings I and J form a condensed ring, and R6 represents a hydrogen atom, an optionally substituted hydrocarbon group, or an optionally substituted heterocyclic group;

$R_2$ represents a hydrogen atom, an optionally substituted hydrocarbon group, an optionally substituted heterocyclic group, or an optionally substituted amino group;

$R_3$ represents a hydrogen atom, an optionally substituted hydrocarbon group, or an optionally substituted heterocyclic group;

$R_4$ represents a hydrogen atom, an optionally substituted hydrocarbon group, or an optionally substituted heterocyclic group;

$R_5$ represents 0 to 3 identical or different substituents attached to the benzene ring;

X represents a single bond, $C_{1-2}$ alkylene group, —O— group, —$CH_2$—O group, —$CH_2$—NH—CO— group, or —$CH_2$—NH—CO—O—$CH_2$— group; and Y represents a single bond or $C_{1-2}$ alkylene group.

2. The compound or the salt thereof according to claim 1, wherein the ring A represents an optionally substituted polycyclic aromatic ring or heterocycle.

3. The compound or the salt thereof according to claim 2, wherein ring A represents a ring represented by Formula (VI):

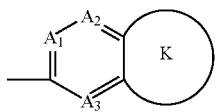

(VI)

wherein $A_1$, $A_2$, and $A_3$ independently represent a carbon atom or a nitrogen atom, and ring K represents an optionally substituted monocyclic or polycyclic aromatic ring, heterocycle or cyclic hydrocarbon.

4. The compound or the salt thereof according to claim 3, wherein all of $A_1$, $A_2$, and $A_3$ represent a carbon atom.

5. The compound or the salt thereof according to claim 1, wherein $R_1$ represents a group represented by Formula (II):

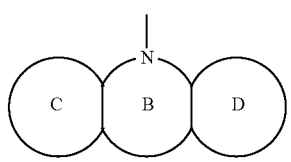

(II)

wherein ring B represents an optionally substituted monocyclic heterocycle, rings C and D independently represent an optionally substituted monocyclic or polycyclic aromatic ring, heterocycle or cyclic hydrocarbon, and the rings B, C and D form a condensed ring.

6. The compound or the salt thereof according to claim 1, wherein $R_2$ represents a hydrogen atom.

7. The compound or the salt thereof according to claim 1, wherein $R_3$ represents a hydrogen atom.

8. The compound or the salt thereof according to claim 1, wherein $R_4$ represents a hydrogen atom.

9. The compound or the salt thereof according to claim 1, wherein X represents a single bond.

10. The compound or the salt thereof according to claim 1, wherein Y represents a single bond.

11. A Pin1 inhibitor comprising the compound or the salt thereof according to claim 1.

12. A pharmaceutical composition comprising the compound or the pharmaceutically acceptable salt thereof according to claim 1 and a pharmaceutically acceptable carrier.

13. A method of treating or preventing an inflammatory disease, comprising administering to a subject in need thereof the compound or the pharmaceutically acceptable salt thereof according to claim 1 as an active ingredient.

14. A method of treating or preventing an inflammatory disease, comprising administering to a subject in need thereof the compound or the pharmaceutically acceptable salt thereof according to claim 1 in combination with active ingredients in at least one or more drugs selected from a group of drugs classified as a therapeutic or prophylactic agent for the inflammatory disease.

15. The method according to claim 13, wherein the inflammatory disease is non-alcoholic steatohepatitis, inflammatory bowel disease, or pulmonary fibrosis.

16. A method of treating or preventing a fatty liver disease comprising administering to a subject in need thereof the compound or the pharmaceutically acceptable salt thereof according to claim 1 as an active ingredient.

17. A method of treating or preventing a fatty liver disease comprising administering to a subject in need thereof the compound or the pharmaceutically acceptable salt thereof according to claim 1 in combination with active ingredients in at least one or more drugs selected from a group of drugs classified as a therapeutic or prophylactic agent for the fatty liver disease.

18. A method of treating or preventing obesity comprising administering to a subject in need thereof the compound or the pharmaceutically acceptable salt thereof according to claim 1 as an active ingredient.

19. A method of treating of preventing obesity comprising administering to a subject in need thereof the compound or the pharmaceutically acceptable salt thereof according to claim 1 in combination with active ingredients in at least one or more drugs selected from a group of drugs classified as a therapeutic or prophylactic agent for obesity.

20. A method of treating or preventing COVID-19 comprising administering to a subject in need thereof the compound or the pharmaceutically acceptable salt thereof according to claim 1 as an active ingredient.

21. A method of treating or preventing COVID-19 comprising administering to a subject in need thereof the compound or the pharmaceutically acceptable salt thereof according to claim 1 in combination with active ingredients in at least one or more drugs selected from a group of drugs classified as a therapeutic or prophylactic agent for coronavirus.

22. The method according to claim 14, wherein the inflammatory disease is non-alcoholic steatohepatitis, inflammatory bowel disease, or pulmonary fibrosis.

* * * * *